United States Patent
Lombardi et al.

(10) Patent No.: US 11,888,675 B2
(45) Date of Patent: *Jan. 30, 2024

(54) SYSTEMS, DEVICES, AND METHODS FOR INTERNET OF THINGS INTEGRATED AUTOMATION AND CONTROL ARCHITECTURES

(71) Applicant: Metafyre Inc., Greenwich, CT (US)

(72) Inventors: Vincenzo Lombardi, Aprilia (IT); Franco Petrucci, Latina (IT)

(73) Assignee: Metafyre Inc., Greenwich, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/650,228

(22) Filed: Feb. 7, 2022

(65) Prior Publication Data
US 2022/0255787 A1    Aug. 11, 2022

Related U.S. Application Data

(63) Continuation of application No. 16/739,633, filed on Jan. 10, 2020, now Pat. No. 11,282,612.

(Continued)

(51) Int. Cl.
*H04L 41/00* (2022.01)
*G16Y 40/35* (2020.01)
(Continued)

(52) U.S. Cl.
CPC .............. *H04L 41/00* (2013.01); *G05B 17/02* (2013.01); *G06N 20/00* (2019.01); *G16Y 10/75* (2020.01); *G16Y 40/35* (2020.01)

(58) Field of Classification Search
CPC .................. H04L 41/00; G05B 17/02; G05B 2219/31186; G05B 2219/32339;
(Continued)

(56) References Cited

U.S. PATENT DOCUMENTS

2015/0347114 A1   12/2015 Yoon
2018/0213077 A1    7/2018 Zheng et al.
(Continued)

FOREIGN PATENT DOCUMENTS

KR   10-2017-0024769    3/2017
KR   10-2018-0119515   11/2018
(Continued)

OTHER PUBLICATIONS

International Search Report and Written Opinion dated May 14, 2020 issued in connection with International Application No. PCT/US2020/013111 in 13 pages.
(Continued)

*Primary Examiner* — Tejal Gami
(74) *Attorney, Agent, or Firm* — Knobbe, Martens, Olson & Bear, LLP

(57) ABSTRACT

In some embodiments, systems, devices, and methods described herein provide digitized ecosystem architectures connecting systems and processes within and among various entities using Internet-of-Things (IoT) to integrate physical assets of the entities. In some embodiments, one or more blockchain applications and/or smart contracts and further define and manage system integration.

20 Claims, 23 Drawing Sheets

Related U.S. Application Data

(60) Provisional application No. 62/791,382, filed on Jan. 11, 2019.

(51) Int. Cl.
    *G06N 20/00*     (2019.01)
    *G05B 17/02*     (2006.01)
    *G16Y 10/75*     (2020.01)

(58) Field of Classification Search
    CPC ............ G05B 19/41885; G06N 20/00; G06N 5/046; G16Y 10/75; G16Y 40/35; Y02P 90/02; Y02P 90/80
    See application file for complete search history.

(56) References Cited

U.S. PATENT DOCUMENTS

2018/0284737 A1    10/2018    Cella et al.
2020/0090391 A1*    3/2020    Presley .................. G06T 11/60

FOREIGN PATENT DOCUMENTS

WO    WO 2014/130568 A1    8/2014
WO    WO 2018/140006 A1    8/2018
WO    WO-2018201009 A1 *    11/2018    ............. G06F 21/00

OTHER PUBLICATIONS

Extended European Search Report issued in application No. 20737947.0 dated Nov. 16, 2022.

* cited by examiner

SYSTEMS, DEVICES, AND METHODS FOR INTERNET OF THINGS INTEGRATED AUTOMATION AND CONTROL ARCHITECTURES

INCORPORATION BY REFERENCE TO ANY PRIORITY APPLICATIONS

The present application is a continuation of U.S. patent application Ser. No. 16/739,633, filed Jan. 10, 2020, which claims the benefit under 35 U.S.C. § 119(e) of U.S. Provisional Patent Application No. 62/791,382, filed Jan. 11, 2019, which is incorporated herein by reference in its entirety under 37 C.F.R. § 1.57. Any and all applications for which a foreign or domestic priority claim is identified in the Application Data Sheet as filed with the present application are hereby incorporated by reference under 37 CFR 1.57.

BACKGROUND

Field

The present application is related to integrated automation and industrial control systems software.

Description

Legacy industrial and commercial automation applications are often developed in isolation with remote vertical systems dedicated to maintenance, logistics, production, and accounting, among others. Novel technology architectures built on microservices and/or Application Programming Interfaces (APIs) are needed to integrate diverse ecosystems and allow unified configuration, management, and operations.

SUMMARY

For purposes of this summary, certain aspects, advantages, and novel features of the invention are described herein. It is to be understood that not all such advantages necessarily may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

Some embodiments herein are directed to a computer implemented method for managing a plurality of Internet of Things (IoT) enabled devices within a specialized software architecture, the computer implemented method comprising: receiving, from one or more input/output data streams, one or more data values; analyzing, by the specialized software architecture, the one or more data values to determine at least one action to be initiated, wherein the specialized software architecture is configured to: model one or more entities of a system, wherein the system comprises a plurality of devices, wherein each of the one or more entities comprises a part of a device, a device, two or more devices, or the system, wherein each of the one or more entities is modeled as an Avatar, and wherein each Avatar comprises a logical representation of an entity of the one or more entities; set one or more field variables corresponding to the one or more data values, wherein the one or more input/output data streams transmit the one or more data values received from hardware coupled to the one or more entities, internal software of the specialized software architecture, or external service installations; define one or more computed variables, wherein each of the one or more computed variables is defined by the one or more field variables, one or more other computed variables, and/or one or more other data variables received from the one or more input/output data streams; define one or more Automatons corresponding to one or more Avatars, wherein each Automaton of the one or more Automatons delineates a state, behavior, or status of at least one of the one or more Avatars and define the at least one action to be initiated by the specialized software architecture in the event of a change in the state, behavior, or status of the at least one Avatar, wherein the state, behavior, or status and the change in the state behavior, or status are determined by at least one field variable or computed variable; and define one or more Shareables, wherein the one or more Shareables comprise one or more Avatars or Automatons to be shared between one or more peers of the specialized software architecture, wherein each peer comprises a single installation of the specialized software architecture on a computer; and initiating the at least one action by transmitting instructions, via the one or more input/output data streams, to hardware coupled to at least one entity, the internal software of the specialized software architecture, or at least one external service installation, wherein the computer comprises a computer processor and a memory.

In some embodiments, the one or more peers comprise an architecture host, wherein the architecture host exposes the one or more Shareables to one or more architecture clients.

In some embodiments, the contents of the one or more Shareables are defined by a digital contract within the specialized software architecture, the digital contract comprising configurable terms between the architecture host and the architecture client.

In some embodiments, the digital contract is sealed with a distributed ledger by a document sealer of the specialized software architecture.

In some embodiments, the instructions are transmitted to an architecture data adapter located on an edge node, fog node, or IoT gateway. In some embodiments, the fog node is configured to initiate the at least one action autonomously from other nodes, a central server, or a global server. In some embodiments, the architecture data adapter comprises a software adapter of one of the following types: Modbus TCP/RTU adapter, OPC UA/DA adapter, S7 adapter, Profinet adapter, ADS adapter, EtherCAT adapter, JDBC adapter, Ethernet/IP adapter, hostLink adapter, REST adapter, or a custom adapter. In some embodiments, the hardware and the architecture data adaptor interact based on one or more of the following protocols: Modbus TCP/RTU, OPC UA/DA, S7, Profinet bus, ADS, EtherCAT, Ethernet/IP, hostLink, JDBC, REST APIs, or a custom protocol.

In some embodiments, the hardware comprises one or more of: remote input/output (I/O) cards, digital acquisition cards (DAQ), PLCs/SCADAs, smart sensors or actuators, sensors, actuators, machine data, machine statuses, or custom interface cards.

In some embodiments, at least one of the one or more field variables comprises a logical representation of a measurement received from hardware coupled to the one or more entities.

In some embodiments, at least one Automaton delineates a state, behavior, or status representing the relationship between two or more Avatars.

In some embodiments, the external service installations comprise functional plug-ins configured to call internal or external libraries, interact with one or more databases, employ artificial intelligence (AI) or machine learning (ML) algorithms, transmit notifications, or provide cloud-computing services.

In some embodiments, the one or more Shareables further comprise one or more Avatars or Automatons to be shared with a computer system of an external software architecture.

In some embodiments, the specialized software architecture is further configured to connect to one or more additional specialized software architectures.

In some embodiments, each of the one or more additional specialized software architectures models one or more entities of an additional system. In some embodiments, at least one Shareable of the one or more Shareables is shared between the specialized software architecture and at least one additional specialized software architecture.

In some embodiments, each installation of the specialized software architecture comprises a local installation, a central installation, or a global installation. In some embodiments, each local installation comprises a local library comprising at least one Avatar or Automaton. In some embodiments, each central installation comprises a central library comprising all of the Avatars and Automatons of one or more corresponding local installations. In some embodiments, each global installation comprises a global library comprising all of the Avatars and Automatons of one or more corresponding central installations.

Some embodiments herein are directed to a system for managing a plurality of Internet of Things (IoT) enabled devices within a specialized software architecture, the system comprising: the specialized software architecture; one or more computer readable storage devices configured to store a plurality of computer executable instructions; and one or more hardware computer processors in communication with the one or more computer readable storage devices and configured to execute the plurality of computer executable instructions in order to cause the system to: receive, from one or more input/output data streams, one or more data values; analyze, by the specialized software architecture, the one or more data values to determine at least one action to be initiated, wherein the specialized software architecture is configured to: model one or more entities of a system, wherein the system comprises a plurality of devices, wherein each of the one or more entities comprises a part of a device, a device, two or more devices, or the system, wherein each of the one or more entities is modeled as an Avatar, and wherein each Avatar comprises a logical representation of an entity of the one or more entities; set one or more field variables corresponding to the one or more data values, wherein the one or more input/output data streams transmit the one or more data values received from hardware coupled to the one or more entities, internal software of the specialized software architecture, or external service installations; define one or more computed variables, wherein each of the one or more computed variables is defined by the one or more field variables, one or more other computed variables, and/or one or more other data variables received from the one or more input/output data streams; define one or more Automatons corresponding to one or more Avatars, wherein each Automaton of the one or more Automatons delineates a state, behavior, or status of at least one of the one or more Avatars and define the at least one action to be initiated by the specialized software architecture in the event of a change in the state, behavior, or status of the at least one Avatar, wherein the state, behavior, or status and the change in the state behavior, or status are determined by at least one field variable or computed variable; and define one or more Shareables, wherein the one or more Shareables comprise one or more Avatars or Automatons to be shared between one or more peers of the specialized software architecture, wherein each peer comprises a single installation of the specialized software architecture; and initiate the at least one action by transmitting instructions, via the one or more input/output data streams, to hardware coupled to at least one entity, the internal software of the specialized software architecture, or at least one external service installation.

Some embodiments herein are directed to a computer implemented method for managing a plurality of Internet of Things (IOT) enabled devices within a specialized software architecture, the computer implemented method comprising: receiving, from one or more input/output data streams, one or more data values; analyzing, by the specialized software architecture, the one or more data values to determine at least one action to be initiated, wherein the specialized software architecture is configured to: model one or more entities of a system, wherein the system comprises a plurality of devices, wherein each of the one or more entities comprises a part of a device, a device, one or more devices of the system, or the system, wherein each of the one or more entities is modelled as an Avatar, and wherein each Avatar comprises a logical representation of an entity of the one or more entities; set one or more field variables corresponding to the one or more data values, wherein the one or more input/output data streams transmit the one or more data values received from hardware coupled to the one or more entities, internal software of the specialized software architecture, or external service installations; define one or more computed variables, wherein each of the one or more computed variables is defined by the one or more field variables, one or more other computed variables, and/or one or more other data variables received from the one or more input/output data streams; define one or more Automatons corresponding to one or more Avatars, wherein each Automaton of the one or more Automatons delineates a state, behavior, or status of at least one of the one or more Avatars and define the at least one action to be initiated by the specialized software architecture in the event of a change in the state, behavior, or status of the at least one Avatar, wherein the state, behavior, or status and the change in the state behavior, or status are determined by at least one field variable or computed variable; and define one or more Shareables, wherein the one or more Shareables comprise one or more Avatars, Avatar Types, Automatons, Automaton Classes, Bundles, Workflow steps, live and deployable Smart Bricks to be shared between one or more peers of the specialized software architecture, wherein each peer comprises a single installation of the specialized software architecture on a computer; and initiating the at least one action by transmitting instructions, via the one or more input/output data streams, to hardware coupled to at least one entity, the internal software of the specialized software architecture, or at least one external service installation, wherein the computer comprises a computer processor and a memory.

In some embodiments, the one or more peers comprise an architecture host, wherein the architecture host exposes the Shareable to one or more architecture clients.

In some embodiments, the contents of the Shareable are defined by a digital contract within the specialized software architecture, the digital contract comprising configurable terms between the architecture host and the architecture client.

In some embodiments, the digital contract is sealed with a distributed ledger by a document sealer of the specialized software architecture.

In some embodiments, the instructions are transmitted to an architecture data adapter located on an edge node, fog node, IoT gateway or any other bare metal or virtual machine located on the field, on-premises or in the cloud.

In some embodiments, the fog node is configured to initiate the at least one action autonomously from other nodes, a central server, or a global server.

In some embodiments, the architecture data adapter comprises a software adapter of one of the following types: Modbus TCP/RTU adapter, OPC UA/DA adapter, S7 adapter, Profinet/Profibus adapter, ADS adapter, EtherCAT adapter, JDBC adapter, Ethernet/IP adapter, hostLink adapter, REST adapter, or a custom adapter.

In some embodiments, the hardware and the architecture data adapter interact based on one or more of the following protocols: Modbus TCP/RTU, OPC UA/DA, S7, Profinet/Profibus, ADS, EtherCAT, Ethernet/IP, hostLink, JDBC, REST APIs, or a custom protocol.

In some embodiments, the hardware comprises one or more of: remote I/O cards, digital acquisition cards (DAQ), PLCs/SCADAs, smart sensors or actuators, sensors, actuators, machine data, machine statuses, or custom interface cards.

In some embodiments, at least one of the one or more field variables comprises a logical representation of a measurement received from hardware coupled to the one or more entities.

In some embodiments, at least one Automaton delineates a state, behavior, rule, network of interconnected rules, or status representing the relationship between two or more Avatars.

In some embodiments, the external service installations comprise functional plug-ins configured to call internal or external libraries, interact with one or more databases, employ artificial intelligence (AI) or machine learning (ML) algorithms, transmit notifications, or provide cloud-computing services.

In some embodiments, the one or more Shareables further comprise one or more Avatars, Avatar Types, Automatons, Automaton Types, Bundles, Workflow steps, live or deployable Smart Bricks to be shared with a computer system of an external software architecture.

In some embodiments, the specialized software architecture is further configured to connect to one or more additional specialized software architectures.

In some embodiments, each of the one or more additional specialized software architectures models one or more entities of an additional system.

In some embodiments, at least one Shareable of the one or more Shareables is shared between the specialized software architecture and at least one additional specialized software architecture.

In some embodiments, each installation of the specialized software architecture comprises a multi-level installation, comprising for instance a local installation, a central installation, or a global installation.

In some embodiments, each installation comprises sharing entities like Adapters, Avatars types, Automaton Classes, live or deployable Smart Bricks, and/or with one or more corresponding distinct installations.

BRIEF DESCRIPTION OF THE DRAWINGS

A better understanding of the devices and methods described herein will be appreciated upon reference to the following description in conjunction with the accompanying drawings. The drawings are provided to illustrate example embodiments and are not intended to limit the scope of the disclosure.

DETAILED DESCRIPTION

Figure 1:
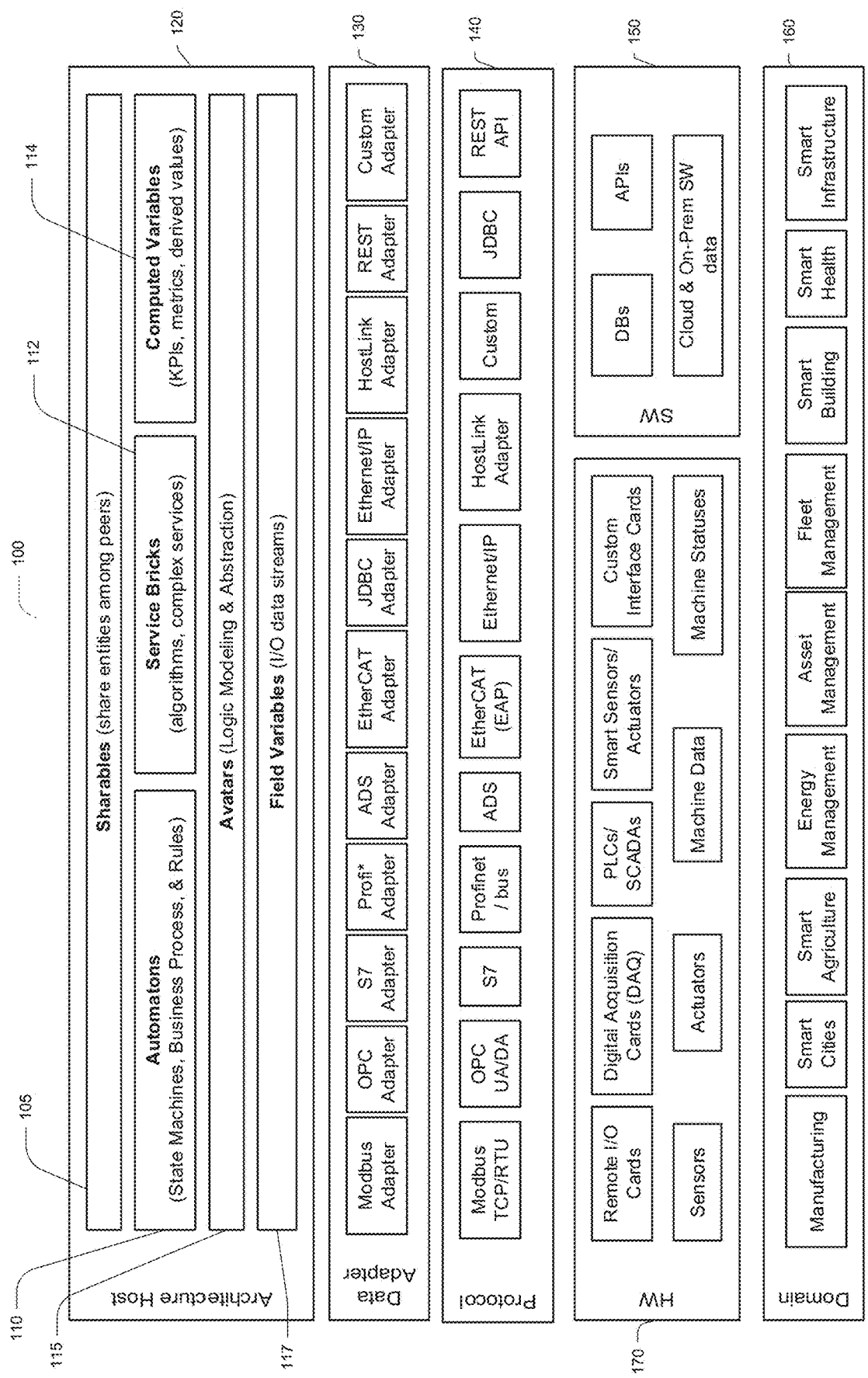
FIG. 1 illustrates features and components of an example IoT integrated automation and control architecture according to some embodiments herein.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Although several embodiments, examples, and illustrations are disclosed below, it will be understood by those of ordinary skill in the art that the inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of some specific embodiments of the inventions. In addition, embodiments of the inventions can comprise several novel features and no single feature is solely responsible for its desirable attributes or is essential to practicing the inventions herein described.

INTRODUCTION

In some embodiments, systems, devices, and methods described herein relate to an autonomic digital organism acting as a digitized ecosystem platform among distinct business and technology entities. In some embodiments, the digitized ecosystem platform may function by connecting digitized processes within and among various entities using one or more IoT integrated automation and control architectures to integrate physical assets of the entities. The IoT integrated automation and control architectures may be deployed in various applications in, for example, industrial and manufacturing systems, city management, agriculture, energy management, asset and fleet management, construction, health systems, pharmaceuticals, chemicals, real estate, and/or infrastructure, among others.

Traditionally, the phases of development, release, testing, and maintenance of software for controlling and managing the physical assets of entities proceed in a non-integrated manner. Applications are often developed for devices without consideration of related devices and the integration of an entire system. As a result, vertical solutions are realized as isolated areas, rather than as connected systems.

To solve existing issues of isolated control and management systems, novel IoT integrated automation and control architectures are introduced herein. IoT integrated automation and control architectures may comprise lightweight technology architectures built on, for example, microservices and APIs, to allow third parties to easily connect legacy systems and create new connected ecosystems. In some embodiments, the interfaces may be open, dynamic, and functional in real time to integrate partners, technologies, and applications on an as-needed basis. In some embodiments, the architectures may utilize a horizontal approach to software design, which may enable dynamic data correlation and connected functionalities among various different systems and machines.

In some embodiments, the architectures may comprise an advanced technology stack serving as a foundation, the stack comprising next generation technology and software development paradigms based on the concept of "smart bricks." Smart bricks may comprise digital components that connect and activate the interoperability between microservices, API ecosystems, legacy systems, aggregators, and machines to build interoperable systems. In some embodiments, architectures utilizing smart bricks may comprise a continuously enriched ecosystem of technologies and solutions, natively integrated through the modular digital components, namely the smart bricks. In some embodiments, the smart bricks may enable horizontal connectivity and interoperability with other systems, such that interoperable systems are not walled off from each other.

In some embodiments, the architectures described herein may comprise a democratic digital market characterized by new opportunities in which independent developers and technological startups can release and sell their applications, algorithms and data as a smart brick, a combination of smart bricks, or conveyed through smart bricks. As such, companies in any sector and of any size, can satisfy, with a continuous open innovation approach, the technological needs of interoperability and sustainability.

In some embodiments, the architectures may allow users and entities to interact by leveraging distributed ledger technologies (DLTs) such as Blockchain systems, to respond to operational and business needs, design new scenarios, and disseminate new and democratic opportunities. The architectures may utilize multi-chain or multi-Blockchain systems, as adopting multiple DLTs may enable maximum operational flexibility, reasonable costs and business and operational continuity.

In some embodiments, to allow dynamic interaction of ecosystems, architectures may dynamically connect parts of the various ecosystems called "nodes." For example, the architectures may provide modular and flexible applications able to correlate variables by automatically linking processes and sub-processes. Furthermore, architectures herein may provide horizontal and distributed applications, and/or allow incremental system development and improvements without massive code development activities whenever new variables are introduced, for instance, when a business process changes.

In some embodiments, the architectures may be structured using small, intelligent bricks, known as smart bricks, which, to facilitate communication and interoperability, may be transferred to any location necessary for the system and consequently for the ecosystem. In some embodiments, the smart bricks can be developed individually, published on a digital market, and downloaded and linked to other smart bricks or simply shared in a peer-to-peer (P2P) mode.

In some embodiments, even existing parts of an ecosystem node, namely a system, application, machine, or part can be transformed into modular components or smart bricks enabling connectivity and interoperability of that specific system part, to create a new generation of horizontal applications.

In other words, by "brickizing", or transforming components of a system into smart bricks, the smart bricks can be dynamically connected to other smart bricks to form an interoperable modular ecosystem. Additionally, entirely new smart bricks not based on existing architecture components can be designed according to a development paradigm, without having to manually connect specific APIs to one or more specific nodes. In some embodiments, once a system component has been converted into a smart brick, the system component can be controlled and managed inter-operably from anywhere using a connected system.

In some embodiments, the architectures described herein comprise an advanced technology stack, altering how systems and their components may be designed, developed, organized, managed, executed, shared, promoted, and marketed. For example, legacy systems may comprise isolated, monolithic, and/or distinct systems, while the architectures herein may transform legacy systems into a set modular, reusable, and/or interoperable components. Thus, in some embodiments, the architectures and its related foundation smart brick technology may facilitate the interoperability between microservices, API ecosystems, legacy systems, aggregators, and machines to build and market interoperable future systems.

In some embodiments, the architectures herein may allow data, processes, systems, and users to seamlessly connect digitally using a zero-code/low-code technology that may provide any/all of the following features: visually connecting distributed entities; logically model domains and the involved local or remote sub-parts; provide logical models with intelligence in the form of declarative actionable data, if available, and engaging artificial intelligence (AI); create new human-machine interfaces to ease visualization and interaction with these new entities; easily share in the form of smart bricks the newly modeled entities to be serially and internally used and/or shared; and/or use DLTs to define rules of a connected distributed ecosystem.

In some embodiments, the architectures may define rule interactions between stakeholders without third-party involvement in order to guarantee security, efficiency, and democratic opportunities and cost reduction benefits. The architectures may enable autonomous interactions between stakeholders involved in a distributed application, including data and/or algorithms, leveraging the new smart brick software development paradigm to bring fundamental novelties in the way these applications, data and algorithms are designed, produced, tested, shared, transferred, sold, and used.

In some embodiments, the architectures may enable interoperability between different systems and technologies. The architectures may be configured to connect to each entity, in some cases acting as a universal translator and interpreter of incoming and outgoing data from and to each entity. The architectures may abstract, model, and/or implement logic and data processing, acting as an orchestrator. In some embodiments, the architectures may enable new level of system abstractions, creating new modeling entities representing new systems that can provide additional operability than the sum of all the interconnected parts. In some embodiments, the architectures and/or components thereof may process huge quantities of data streams, enabled by the scalable, elastic nature of the architectures, the components of which can be arbitrarily or strategically distributed in the field, on-premises and in the public cloud, private cloud, or combination thereof.

In some embodiments, architectures described herein may comprise a plurality of digital models of physical and logical entities, the models comprising intelligent digital organisms provided with the digital equivalent of senses, reasons, actions and cooperation abilities. In some embodiments, the architectures may enable complete horizontal and/or vertical interoperability, offering smart methods for approaching and reducing system complexity by adopting a modeling paradigm offering several levels of abstraction and based on the concept of re-usable smart bricks. Various entities, machines, and hardware can connect to each other and cooperate without the need of any central repository, and may be referred to as architecture peers.

Some embodiments herein may comprise one or more of the following features: a library of smart bricks, peer connectivity, document sealers, modular architectures, and/or development tools. In some embodiments, the architectures can evolve and improve the system model with additional capabilities by adding new smart bricks comprising, for example, pre-integrated technologies. In some embodiments, the architectures may comprise various functionalities for enabling cooperation and communication between users, groups, stakeholders, and entities of the system. For example, in some embodiments, system interactions such as service/product requests, documents exchange, notifications, and participation in shared processes, can enable cooperation among various actors.

In some embodiments, the architecture may comprise an open and agnostic connective network to link and orchestrate digital models of systems and allow those systems to share data, processes and knowledge. In some embodiments, the systems may be not bound to any specific vendor, protocol or computer language. Systems in this context may refer to companies as the combination of people, machines, data, and data processing. For example, an ecosystem may comprise various systems that are largely interdependent and which can be integrated using the architectures herein.

In some embodiments, Sharelets, also called Shareables, are sharable entities that may enable sharing data or services with other architecture installations, named architecture peers. Sharelets may be exposed by an architecture host, Sharelet host, or Sharelet owner, which is an architecture peer that hosts Sharelets. An architecture client or Sharelet client may comprise an architecture peer that benefits from a Sharelet exposed by another architecture peer, such as a Sharelet host.

Some embodiments herein may use the term "Avatars" as a digital representation of elements of a system. For example, parts of a device, a device or machine, two or more device, a system comprising a plurality of devices, or a plurality of systems may be modeled as Avatars. In some embodiments, the architecture may thus model system entities or components as Avatars, wherein these Avatars comprise a "digital twin" model of the entities or components and provide a logical abstraction that may hide and/or simplify some system complexities for users of the architecture.

In some embodiments, architecture peers may share Avatars, parts of Avatars, in a read-only or in a read/write mode, and/or other functionalities hosted on architecture host peers and expose them to architecture client peers (i.e. other architecture installations) using a Sharelet or Shareable paradigm. In some embodiments, peer identification and cooperation can be secured and tracked inside DLTs for example, with a multi-Blockchain approach.

Some embodiments herein may use the term "Automaton" to describe the behaviors, actions, and/or statuses of Avatars or other modeled entities. Avatar and inter-Avatar behavior may be described by "Automatons." Automatons may have internal "statuses." Statuses may change as a reaction to "stimuli." In some embodiments, on any status change, actions may be taken as defined by rules embedded in the Automatons. Such actions may comprise initiating actuation in various parts of the architecture or in external architectures, systems, users, and/or the Avatars of those external parties. For example, Automatons may include actions such as setting off alarms, turning on and off lights, changing Avatar internal statuses, altering inter-Avatar workflows, or altering user/Avatar orchestration workflows, among others. In some embodiments, Automatons may represent the intelligence or logic of Avatars.

In some embodiments, an architecture may model and manage some or all of the activities related to some or all systems. In some embodiments, the architecture may extend the system with new capabilities offered by the architecture platform itself (i.e. abstracting from field complexities, connecting different systems, monitoring, automating, etc.) and by the different ecosystem technologies, including, for example, AI algorithms, an application composer, business intelligence, a conversational interface, and advanced process control, among others. The architecture may also interconnect vertical solutions, model internal and external entities, expose its own services, use external services, and realize super-processes that can involve parties that can be both internal and/or external to an organization. This architecture may apply to, for example, supply chains, buildings, transportation systems, cities and any other organized collective. In some embodiments, all of the interactions of complex systems can function, transparently, in an imperceptible and effective way, optimizing resource usage and removing inefficiencies of system management.

In some embodiments the architecture and all of its parts may be implemented using modular technology. The architecture may be modular, elastic, scalable and technology agnostic, both edge-side and server-side, in order to let developers design the architecture based on their specific needs. Elasticity and scalability may be realized by simple addition of more instances of architectural modules. In some embodiments, a Docker container-based composable granular element design may allow users to design different architectures for any specific case. In some embodiments, it may be possible to start with a small set of architecture nodes and scale-up, adding more and more without limit.

System Modeling

In some embodiments, each architecture installation includes a library of digitally modeled entities which can be listed, searched, instanced, used locally and/or shared with other architecture peers. In some embodiments, the architecture may provide an easy and user-friendly interface to the library for abstracting and re-using modeled entities and services, as smart bricks. In some embodiments, the library may enhance a development paradigm based on concepts such as high modularity, composability, self-consistency, security, and shareability applied to entities like smart bricks, each capable of encapsulating simple to very complex capabilities, behaviors, and logic.

Smart bricks can be composed together and/or combined to create larger macro bricks, which may realize new functionalities as the sum of the composing smart bricks. In some embodiments, a smart brick can be a model of any component running at any level of the defined architecture, such as in the field, on-premises and/or in the cloud. In some embodiments, smart bricks can be used to easily connect with hardware and software, model entities, their internal logic, automatic behaviors, workflows, and/or processes, and/or offer specific capabilities (e.g., integration with 3rd party technologies, notifications, communication, data exchange, and/or machine learning algorithms).

In some embodiments, smart bricks may be usable to quickly and effectively build solutions by composing functionalities. In some embodiments, an outside technology ecosystem, if adapted or natively developed with a smart brick paradigm, may be usable to add additional, special capabilities/functionalities, to the architecture. Furthermore, third party technologies (e.g., dated legacy systems) can be easily transformed into a smart brick architecture with software wrapping technology. In various embodiments, the architecture may provide a "technology glue" and/or integration gateway to enable different technologies to communicate with each other.

In some embodiments, smart bricks may be classified in one or more categories, such as live smart bricks and/or deployable smart bricks and may comprise one or more of the following features. Live smart bricks may comprise data point streamers. In some embodiments, data point streamers may be exposed to an architecture that can be used by clients hosting another architecture and by non-system enabled clients. Data point steamers may retrieve data from a system installation and/or publish data in real-time, following specific defined rules, to external databases, feed channels, web services endpoints, and/or file transfer protocol (FTP) folders, among others. In some embodiments, live smart bricks may comprise batch exporters. Batch exporters may be similar to data point streamers in that they can be exposed to the architecture or other clients, but may be executed as jobs that can be scheduled or be activated by specific rules. In some embodiments, batch exporters may involve massive inserts or updates on external databases or .csv exports on FTP folders. In some embodiments, live smart bricks may comprise Avatar Sharelets. In some embodiments, Avatar Sharelets may be shared by architecture peers and may be automatically updated by their host. In some embodiments, live smart bricks may comprise generic service bricks. Generic service bricks can be hosted on an architecture installation, can be exposed to architecture peers, or to other clients not specifically adapted to interact with the architecture/system. In some embodiments, generic service bricks can wrap and encapsulate complex logic and services that may be exposed as endpoints to clients.

In some embodiments, deployable smart bricks may be developed inside a system development environment, may be downloaded by architecture peers and run on an architecture node or cluster of nodes. In some embodiments, deployable smart bricks may comprise adapters, which may implement custom connectivity with HW or SW systems, Avatar types definitions with embedded logical modeling, Automaton classes definitions, including their behavior and source code, or bundles, which may comprise one or more of the above-defined deployable bricks encapsulated as a complete solution (e.g., Overall Equipment Effectiveness (OEE) solution, predictive maintenance, financial analysis tools, etc.), including field connections, logic and algorithm definitions, and a user interface.

In some embodiments both live and/or deployable smart bricks may be developed inside an architecture server via a customizable, dynamic user interface. In some embodiments live smart bricks often run on an architecture server and can be served internally to the same architecture server, externally to an architecture peer, or "as-a-service" to a non-architecture client. In some embodiments, deployable smart bricks are often deployed inside an architecture server in order to become live services. In some embodiments, the architecture server may include a complete, full-stack development and run-time environment that can be used to develop, deploy and run smart bricks.

In some embodiments, the approach to complex solution implementation can be simplified by layers of abstraction and a modeling paradigm that allows system integrators to face and lower the intrinsic complexities of a specific domain by abstracting key modeling components from unneeded details and complications.

In some embodiments, the architecture may offer one or more layers of abstraction to address technical complexities and to focus the design process during the implementation of a complex architecture solution. In some embodiments, the architecture may comprise specific tools and facilities with the purpose of simplifying new developments, rule interactions, and ease the integration of different technologies. In some embodiments, each layer of abstraction manages and hides the details and the complexities of the underlying layer, allowing developers to work with simplified logical models called Avatars.

Data Collection, Analysis, and System Actuation Loop

In some embodiments, the architectures may comprise a data collection, analysis, and actuation mechanism. For example, in some embodiments, the architectures may triage system events into the categories of plannable, urgent, or immediate. In some embodiments, a data collection, analysis, and system actuation loop may allow the architecture to enable full integration of systems on various levels. In some embodiments, the architecture may comprise a full digital model of the system, which can then be used to collect, analyze, and actuate according to the embodiments herein.

In some embodiments, the architectures may be designed to manage complex systems, for example, manufacturing production lines, company processes, or cities, among others. In some embodiments, the architectures may be able to detect various system states and take the appropriate actions based on one or more predefined and/or artificial intelligence (AI) derived rules, with a proper reaction time. These actions may be completed by potentially dissimilar and dispersed system components, which may be specialized to perform specific classes of tasks. Various embodiments of the system may employ some/all of the following to allow digital organisms or logical models to interact and collaborate in a digital ecosystem: sensors, cameras, microphones, environmental sensors including, for example, thermostats, humidistats, accelerometers, gyroscopes, and/or others. The architecture may additionally, or alternatively, interact with: message reading hardware, data acquisition devices, data gateways, wired or wireless networking, messaging systems, databases, including AI and/or human written rules, pattern detection, historical memory, API calls, messaging, actuators including, for example, relays, and electro-valves, robotic arms, autonomous vehicles, local intelligence, for instance, via intelligent fog nodes, and peer-connectivity, among others.

In some embodiments, the architecture may gather real-time data from any data source, including devices, hardware, software, or databases, such as sensors, programmable logic controllers (PLCs) and/or pre-existing systems, such as manufacturing execution systems (MES), customer relationship management (CRM) software, or legacy databases (DBs), among others. In some embodiments, the architectures may augment these data sources by, for example, aggregating data, computing computed variables, and/or computing key performance indicators (KPIs) and metrics. Additionally, the architectures may perform analysis using pre-modeled or dynamic rules and/or trained AI Algorithms. Using the results of the analysis, the architectures may perform actions using one or more actuators of the systems and/or connecting with other internal and/or external entities, such as system installations, to connect processes. In any/all of these or other steps, the architectures may guarantee data integrity using a reliable securing layer such as digital certificates and/or DLT. In some embodiments the architecture may gather, collect, and/or observe real world physical quantities and events to analyze events, enable evolution of this analysis over time, and ensure that the right information is collected to manually and/or automatically take action in response to events. In some embodiments, data can be collected from previously existing or newly installed sensors, or from hardware and/or software systems (HW/SW systems) like PLCs, DBs, and/or APIs.

In some embodiments, an architecture may comprise a modeled aggregation of data collection mechanisms and the physical devices from which data is collected. In some embodiments, any part, device, system, or collection of systems that provide data may be modeled as part of the architecture. Thus, at any time, a new data collection component can be added to the architecture, simply by adding new smart bricks to the architecture. In some embodiments, advanced remote configuration capabilities permit accelerating and easing the installation and configuration phase of any project, and providing a central web interface to monitor, control, and configure any installation peripheral component.

In some embodiments, the architecture may thus ingest data from a plurality of data collection mechanisms. This data can be analyzed to understand the current state of an individual part, an individual device, a collection of devices, an entire system, or a collection of systems (collectively "components" or "entities"). Based on the determined state, the architectures may be used in a predictive capacity to determine what may occur with respect to the entities and take appropriate action. Furthermore, the architectures may be used to determine how and when to extract additional data when needed to determine a state and/or react to a change in state of an entity. Thus, in some embodiments, the architectures may be configured to determine who or what to interact with to confront any determined state or change in state. In some embodiments, for the architectures to be able to analyze the vast amount of collected data, it may first learn. For example, the architectures may map known expertise into internal system entities. In addition, or alternatively, the architectures may learn from the observation of data and events in order to extract or deduce connections between components and determine actions based on the current or predicted state of components. In some embodiments, AI or ML programs may be used to enhance the learning capabilities of the architectures.

Some embodiments of the architectures may have a time series storage capability that may be necessary to for the architecture to learn from past events and to analyze, predict, and act based on current and future data. In some embodiments, the architecture enables declaratively modeling data and realizing a network of interconnected real-time rules. This capability can be extended by a plurality of AI algorithms for predictive and/or prescriptive maintenance, pattern recognition, and/or classification. These AI algorithms may be made available to the architectures in the form of composed smart bricks, such that data can be imputed and outputted readily. New rules and/or new smart bricks can be added or substituted to replace exiting smart bricks to, for example, upgrade reasoning capabilities and algorithms.

In some embodiments, the architectures may trigger specific actions to address issues and arrive at desired solutions. These specific actions may be triggered by initiating field actuations and/or notifying users, groups, or systems of noteworthy events or data, such that they can be addressed correctly. In some embodiments, internal and/or external stimuli may function as triggers for explicit rules and/or AI algorithm applications, which in turn can execute specific actions such as field actuations (e.g. start/stop a valve, turn on/off a circuit, set the speed of a motor, etc.), notifications and messaging, third-party HW/SW systems, API calls, and workflow activations, among others. In some embodiments, actuations can be executed by specialized smart bricks that can implement a stable and/or a spot connection with HW/SW systems.

In some embodiments, new smart bricks may expose new actions and may be added and/or substituted for existing actions to upgrade the reaction capabilities of the architectures. In some embodiments, the architecture can react instantly when needed. This instantaneous reaction capability may be implemented by providing edge nodes of the architecture the ability to collect data, perform data analysis, and act locally and autonomously, for instance by implementing a Fog node, which are configured to function even without a connection with a central server, global server, or other nodes of the architecture.

In some embodiments, the architectures can perform actions such as sending messages/notifications, calling APIs of external systems, and/or allowing architecture peers, including different architectures installations, to cooperate with each other, share entities and functionalities, and/or potentially secure interactions with DLTs.

Example Architectures and Functionalities

FIG. 1 illustrates features and components of an example IoT integrated automation and control architecture 100 according to some embodiments herein. FIG. 1 illustrates the layers of abstraction that may hide details and complexities of underlying layers, allowing developers and users of the architecture to work with simplified logical models that only expose critical information.

In some embodiments, an architecture host 120 may be installed on a global server, central server, or on one or more nodes of the architecture. In some embodiments, the architecture host 120 may be located in the cloud or hosted on the premises of the system. In some embodiments, the architecture host 120 may be installed in a virtual machine or physical computer system and may allow high availability and/or full scalability through software and/or hardware techniques including, for example, clustering. In some embodiments, an architecture host 120 may comprise Shareables 105, Automatons 110, service bricks 112, computed variables 114, Avatars 115, and/or field variables 117. As discussed above, Shareables 105 may allow data to be shared between peers. In some embodiments, Automatons 110 may comprise state machines, business processes and/or rules, among others. In some embodiments, service bricks 112 comprise algorithms, complex services, and/or other components for needed functionality. In some embodiments, computed variables 114 include KPIs, metrics, derived values, and/or any combination of field variables 117 and/or state descriptions of the system. In some embodiments, field variables 117 are logical representations of underlying hardware measurements from sensors or data adapters 130, or state variables related to actuators within hardware, including for example, hardware 170.

In some embodiments, field variables 117 comprise a first level of abstraction, allowing users to focus on critical data and its significance rather than data sources or collection mechanisms including, for example, wiring, electric signals, networking, and/or protocols. In some embodiments, Avatars 115 form a second level of abstraction, such that the source and destination of data variables, such as, for example, PLCs, DBs, or APIs are hidden. In some embodiments, Automatons 110, service bricks 112, and/or computed variables 114 form a third level of abstraction, which hides the complexities of how actions are executed and allows the architecture models and design loop to follow logical patterns. Finally, Shareables 105 may form a fourth level of abstraction by hiding the integration, authentication, authorization, and/or contracts required for interaction between components, exchanged services, and/or business. In some embodiments, the above abstractions facilitate simpler and more efficient management of entities.

In some embodiments, Avatars 115 may represent a logical modeling of systems, devices, or domains to digitally represent reality and provide ways to interpret sensory input, model the implications and meaning of actuator motion, or represent other modeled aspects of a system. Some embodiments may use the term Avatars 115 as a personification of entities of the system. As such, machines and systems may be modeled as Avatars 115. Avatars 115 may receive inputs from field sensors. Avatars 115 may appear instinctual through execution of declarative rules or AI algorithms, which may comprise for example Automatons 110. Avatars 115 may be empowered to take autonomous actions through Automatons 110. Avatars 115 may connect with other Avatars 115 as well as third party installations, users, and/or systems. Examples of Avatars 115 may include a motor, an HVAC system, a filler, a production line, a power station, a water treatment system, a part of a software, or any other portion of, or the totality of, a system. In some embodiments the actions of Avatars 115 are performed by Automatons 110.

In some embodiments Automatons 110 may comprise system modeling that defines how the Avatars 115 represent the system, interpret stimuli, reason from data or user inputs, processes and categorizes information, makes decisions, and performs actions. Automatons 115 may function in combination with computed variables 114, and/or service bricks 112.

In some embodiments Automatons 110 may represent the intelligence of Avatars 115. Automatons 110 may be realized as finite states automata defined in information technology theory, potentially augmented with facilities that make the Automatons 110 more functional, expressive and/or easier to implement. Automatons 110 can be used to represent a system's internal logical states, rules, interconnected networks of rules, processes definitions, workflows and can involve the use of computed variables 114 and/or service bricks 112.

Some embodiments may use the term Automaton 110 to describe the behaviors or status of Avatars 115. Avatar and inter-Avatar behavior may relate to Automatons 110. Automatons 110 may have internal "statuses." In some embodiments, statuses may change as a reaction to "stimuli." In some embodiments, on any status change, actions may be taken according to rules defined in Automaton 110. For example, such actions may involve other parts of the system, may be directed to external customers and/or suppliers, or to Avatars 115 of those external parties. Examples of actions of Automatons 110 may include setting off alarms (e.g. on/off), changing street lights (e.g. green, yellow, red), changing Avatar internal status, changing Inter-Avatar workflows, or changing user/Avatar orchestration workflows, among others.

In some embodiments, computed variables 114 may be defined by a formula that can take as inputs field variables 117, other computed variables 114, environment variables, and/or data coming from the output of service bricks 112. Computed variables 114 can augment the set of available variables that can be associated with an Avatar 115 and can be used to compute KPIs, metrics, indexes, and any other useful information to represent some logical or numeric property of an Avatar 115.

In some embodiments service bricks 112 may comprise functional plug-ins that can call internal or external systems to ease interaction with DBs, the engagement of advanced algorithms (e.g. AI/ML), notification systems, third party libraries, or on-premises or cloud services, among others.

In some embodiments, data adapters 130 may comprise components that interact directly with field components. In some embodiments, data adapters 130 may reside on edge nodes and/or Fog Nodes of the architecture 100. In some, the data adapters 130 may be industrial PC or miniPC based. In some embodiments, data adapters 130 may comprise legacy servers and/or may be located in a data center. In some embodiments, data adapters 130 may comprise remotely managed lightweight software adapters of the following types: Modbus TCP/RTU adapter, OPC UA/DA adapter, S7 (Siemens) adapter, Profinet adapter, ADS (Beckhoff) adapter, EtherCAT (EAP) adapter, JDBC adapter, Ethernet/IP adapter, hostLink (Omron) adapter, REST adapter, and/or other standard or custom adapters.

In some embodiments, protocols 140 facilitate interaction between components, for example between hardware 170 and adapters 130, and are often standardized based on hardware and/or software. In some embodiments, protocols 140 may include: Modbus TCP/RTU, OPC UA/DA, S7, Profinet/bus, ADS, EtherCAT (EAP), Ethernet/IP, hostLink (Omron), JDBC, REST APIs, and/or other standard or custom protocols.

In some embodiments, hardware 170 may comprise field devices including for example, remote I/O cards, Digital Acquisition Cards (DAQ), PLCs/SCADAs, smart sensors/actuators, sensors, actuators, machine data, machine statuses, and/or custom interface cards. In some embodiments, the architecture 100 may be agnostic towards device age and standardized or custom protocols. In some embodiments, software 150 may be installed in any location and may run on internal or external computer systems. In some embodiments, Software may comprise databases, APIs, cloud software, and/or on-premises software and/or data.

In some embodiments, domains 160 may comprise a non-exhaustive list potentially overlapping categories of industry and/or technology to which the architecture 100 may be applied. In some embodiments, different domains may share some of the same technologies, protocols, needs, and/or constraints. Examples of domains supported in some embodiments may include manufacturing, smart cities, smart agriculture, energy management, asset management, fleet management, smart building, smart health, smart infrastructure, and/or other domains. In some embodiments, approaching an architecture implementation in different domains may require similar implementation issues. In some embodiments, the levels of abstraction the architecture 100 may provide may allow the architecture 100 to read data from the field and to perform actuations regardless of the types of hardware 170 and software 150 or their interfaces.

In some embodiments, the interface against physical devices and hardware 170 represented by data adapters 130, can be generalized by adopting a modular approach in which every class of device/system may be interfaced by a module that may be specialized to interact with a specific protocol or system. In some embodiments, architecture adapters 130 may comprise software modules that may be configured to instruct the architecture 100 how to reach data (e.g. specifying their addresses, how to authenticate), what kind of interaction needs to be realized (e.g. read/write mode, pull/push, I/O frequency), and/or how the adapters 130 may be recognized by the architecture 100. In some embodiments, adapters 130 can be installed on physical or virtual machines, on the field side, or in the cloud. In some embodiments, once configured and activated, the architecture 100 may automatically recognize field variables automatically flowing to/from their source and destination systems (e.g. PLCs, DAQs, DBs, APIs) because of the adapters 130. In some embodiments, the adapters 130 can therefore hide complexities regarding electric signal conditioning, protocols, IPs and ports, wiring, or authentication and authorization, and allow the users of architecture 100 to focus on the abstract logical models of the entities, obscuring unnecessary and confusing details that the architecture 100 manages in the background.

Some embodiments may implement Avatars 115. Avatars 115 may comprise a "digital twin" implementation, providing a logical abstraction of entities that may hide the complexity regarding the source and mechanism for collecting data, including the location of physical connections of sensors and actuators (e.g. DAQs, PLCs, or similar) because adapters 130 abstract field data retrievals and actuations into logical I/O variables. Thus, Avatars 115 may represent abstract, logical representations of real entities like devices, machines, HW and SW systems.

In some embodiments, system abstraction through Avatars 115 may provide the benefit that digital representations of an entity may be used to acquire field data (e.g. PLC, remote I/O devices) instead of requiring the real entity to be modeled. In some embodiments, the Avatars 115 allow a user to consider an entity, not the hardware 170 or the data adapter 130 from which the data was collected. This approach may also be more effective and simpler during entities modeling, since a single machine, e.g. a bottle filler, can be interfaced by more than one hardware 170, and the same hardware 170 can serve more than one machine (e.g. a bottle filler and a fire alarm sensor), each of which may not be logically related to each other. Despite this lack of logical relationship, some or all of the data related to unrelated entities can be managed by the architecture 100, which can be distant and totally disconnected from the hardware 170. In some embodiments, Avatars 115 may therefore allow the architecture 100 to abstract field complexities (e.g. wiring, electric signals, networking, protocols) and simultaneously decouple how data is physically and logically connected.

In some embodiments, Sharelets or Shareables 105 may comprise sharable entities that may enable sharing data, services, Avatars 115, field variables 117, Automatons 110, computed variables 114, and/or service bricks 112 with other architecture installations, named architecture peers. In some embodiments, Sharelets 105 may be exposed by an architecture host (i.e. Sharelet host, Shareable host, Sharelet owner, or Shareable owner), defined as an architecture peer that hosts Sharelets 105 and exposes the Sharelet 105 to an authorized Sharelet client. In some embodiments, a Sharelet client may be defined as an architecture peer that gains access to a Sharelet 105 exposed by another architecture peer, usually a Sharelet host. In some embodiments, a Sharelet 105 may wrap and/or expose an Avatar 115 or another smart brick, if configured as a Sharelet 105, that may be made available by an architecture host as defined inside an architecture contract (sometimes called an mContract), that details the sharing conditions for Sharelet 105.

In some embodiments, architecture contracts, sometimes called mContracts, are an electronic representation of the terms upon which architecture peers agree when a Sharelet 105 is provided by a host and received by a client. An mContract may define which peer is the Sharelet 105 provider and which peer is the Sharelet 105 requester. In some embodiments, an mContract may define the nature of the service or good shared within Sharelet 105 that may be provided. In some embodiments, the mContract may define when the Sharelet 105 may be made available to the client and/or how the Sharelet 106 may be provided, including the possibility of details such as a service-level agreement (SLA), costs, payment methods, and others.

In some embodiments, Sharelet hosts may specify specific sharing policies of each Sharelet 105, for each Sharelet client. In some embodiments, different types of Sharelets 105 may require different sharing policies. In some embodiments, an architecture contract can be sealed inside some distributed ledger, such as a Blockchain, via an architecture document sealer. In some embodiments, when a peer needs to share something with another peer, the architecture may manage tasks including, but not limited to: mutual introduction, handshake, creation of a secure encrypted channel of communication, agreement of a contract defining the properties and the conditions of the share, the share itself, and/or tasks that allow a sharing host to provide the service to a client (e.g. authentication, authorization, data flow).

In some embodiments, the architecture may enable signing of an agreement between two peers, wherein the peers agree on an mContract defining the terms of a relationship between the peers, wherein each peer may subscribe and sign with their own private key. In some embodiments, service execution of the mContract may comprise releasing the service, receiving the service at the client, and tracking the service execution by a trust authority, which may comprise DLT in an on-chain scenario. In some embodiments, the trust authority may comprise the architecture itself in an off-chain scenario. In some embodiments, mContract verification may involve both peers asking the trust authority (i.e. the Blockchain and/or the architecture) to verify that the service has been executed conforming to the terms defined in the mContract. In some embodiments, the trust authority verifies the track (e.g. SLA), provides a response to the peers, and/or performs the consequent actions, if defined (e.g. decrement a counter defining how many tokens are still available or perform a payment).

Some embodiments may include any/all of three types of Sharelets 105: Avatars 115, workflows and/or functional bricks. In some embodiments, Shared Avatars can be used be used whenever peers need to share field and/or computed variables in a read mode, actionable variables in a write mode, and/or internal Automaton states. In some embodiments, shared workflows can be used whenever peers need to share workflows steps. The overall workflow may be defined by its composing steps. In some embodiments, shared smart bricks can be used whenever an architecture peer needs to share a live or a deployable brick to another peer (e.g. another department of the same company, an external sister company, or another actor on the same supply chain).

In some embodiments these sharing elements may form part of an additional level of abstraction offered by the architecture, allowing system integrators and project executors to ignore the complexities involved in data and service sharing (e.g. addressing, authenticating, authorizing, controlling the communication channel and the data flow, etc.), and instead focusing only on the benefit from the exchanged service itself.

In some embodiments the architecture may employ HyPeer Connectivity, a distributed computing paradigm enabled by the architecture. HyPeer Connectivity may be defined as the capability of distinct instances of the architecture to share data, processes, and/or functionalities and/or define automatic cooperation behaviors, allowing architecture bricks to act as self-orchestrated entities while leaving each domain owner full freedom to choose what, how, and with whom to share without renouncing control of owned data, processes and/or functionalities. In some embodiments, distinct architecture installations can communicate with each other but also potentially with outside systems to cooperate and participate in inter-peer processes, including, for instance, supply chain activities.

Some embodiments of the architecture may utilize distributed ledger technologies (DTL) to offer a notary service without involving a central trust authority. Since Blockchain technology is the first and the most known DLT in the world, and its term is more familiar, this specification may employ the word "Blockchain" meaning the more general concept of DTL.

In some embodiments of the system, the Blockchain may be used to store documents in an immutable and indisputable way via an architecture document sealer service. Generally, any functionality that involves the use of Blockchain technologies may also be available when the use of a Blockchain technology is not possible, through internal architecture implementation, both for design choice during project execution and for objective contextual limitations, such as when no Internet connectivity is available (e.g. in totally on-premises installations). In some embodiments, these alternate implementation modes may be referred to as on-chain mode and off-chain mode.

In some embodiments, the document sealer may provide a set of services, which store, in a secure and immutable manner, a set of declarations regarding what a specific actor does within a document. In some embodiments, the document sealer may comprise a capability of the architecture to uniquely identify actors and certify that they made specific declarations about documents inside the architecture and inside one or more Blockchains. In some embodiments, actors may be uniquely identified by a private key that can be used to sign declarations and documents.

Since the storage of large documents inside a Blockchain can be prohibitively expensive and its costs can have a high variability over time, in some embodiments, the architecture may save a hash of the document instead of the document itself.

In some embodiments the architecture implements its distributed ledger solution in a multi-Blockchain approach, allowing the system to switch from one Blockchain to another without losing functionality. In some embodiments, high variability of Blockchains can increase transaction costs of a specific Blockchain (e.g. Bitcoin, Ethereum) in an unpredictable way, such that a multi-Blockchain approach may be preferred.

Multi-Blockchain functionality may be simplified in some embodiments because the architecture may utilize a minimal set of features that can be implemented by all present and future distributed ledger technologies. Distributed ledger technologies typically implement cryptocurrency-based payment systems that include parameters such who is spending, who is receiving, how much is transferred, when the transaction is made, and a short note long enough to contain a SHA256 hash (i.e. 64 bytes). In some embodiments, the architecture only requires the presence of a "note" field for a transaction.

In some embodiments the architecture document sealer may be independent of any specific ledger technology. The architecture may adapt to future changes in Blockchain technology, while keeping features backward compatible.

Figure 2:
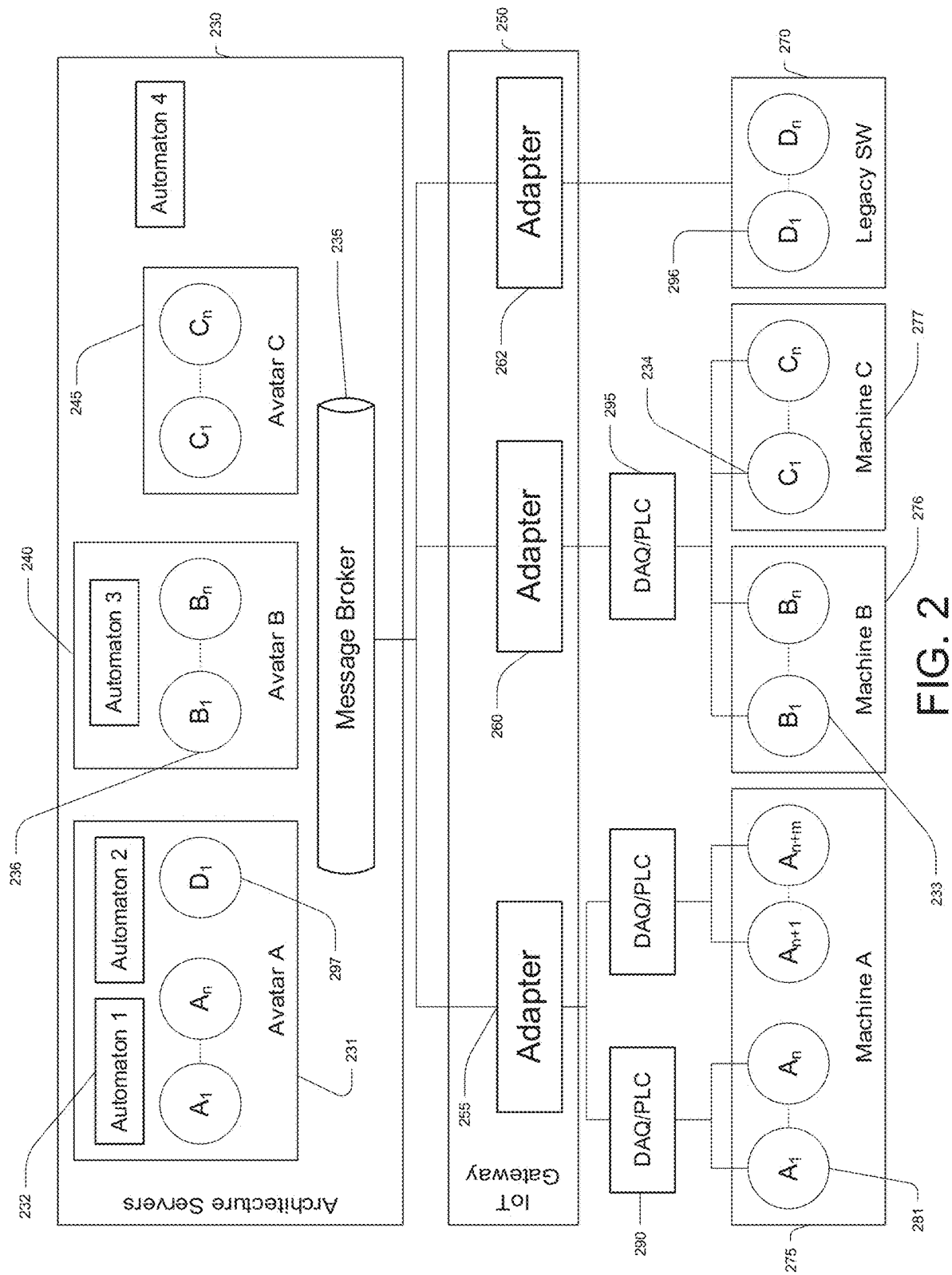
FIG. 2 illustrates example features and components of an IoT integrated automation and control architecture according to some embodiments herein.

FIG. 2 illustrates example abstraction features and components of an IoT integrated automation and control architecture according to some embodiments herein. In some embodiments, entity hardware may comprise machines of any type. For example, Machine A 275 is shown with a number of sensors and/or actuators 281. Sensors and/or actuators 281 may comprise sensor/actuator $A_1$ through sensor/actuator $A_n$ and sensor/actuator $A_{n+1}$ through sensor/actuator $A_{n+m}$. In some embodiments, the sensors and actuators are logically interchangeable, although the architecture 100 may manage each sensor/actuator differently, and any reference to a sensor may be exchanged for a reference to an actuator. In some embodiments, each sensor/actuator may be designated with an identifier. Machine B 276 may also comprise sensors/actuators 233 identified as sensor/actuator $B_1$ through sensor/actuator Bn. Machine C 277 may comprise sensors/actuators 234 identified as sensor/actuator $C_1$ through sensor/actuator Cn.

The architecture 100 may comprise machine sensors or actuators such as $A_1$ through $A_n$, typically connected to either a DAQ or a PLC, jointly designated as DAQ/PLC 290, although the architecture may be agnostic regarding the type of interface. One or more DAQ/PLC devices 290 may connect to an adapter 255 within an IoT Gateway 250. The IoT Gateway 250, which may be acting as an adapter host, may contain one or more adapters for interfacing with various connected DAQ/PLC devices 290, 295 and the underlying machines, such as machine A 275, machine B 276, and machine C 277, and the sensors and actuators within the machines, such as $A_1$ through $A_n$, $A_{n+1}$ through $A_{n+m}$, $B_1$ through $B_n$, and $C_1$ through $C_n$. In some embodiments, some or all of the functionality of IoT Gateway 250 and may be provided by a Fog Node.

Architecture servers 230 may comprise one or more servers of varying types, including, for example, central servers or global servers. In some embodiments, server 230 may comprise a message broker 235, which may interface with one or more IoT Gateway nodes 250. The architecture server 230 may comprise an Avatar 115, such as Avatar A 231, Avatar B 240, or Avatar C 245. Avatar B 240 may comprise one or more variables 236 identified as $B_1$ through $B_n$. In some embodiments, variable $B_n$ corresponds to sensor/actuator $B_n$ of machine B 276. In some embodiments, this abstraction enables one or more Automatons 232 to be defined within architecture server 230. Automatons 232 may receive readings from and initiate actions to sensors/actuators, such as sensors/actuators 281, 233, or 234, while ignoring the complexities of the location or details of the one or more IoT Gateways 250, the adapters 255, 260, 262, the DAQ/PLCs 290, 295, and any other underlying machine or device in the system. Additionally, the underlying sensors and actuators may modeled by the architecture 100 in any desired way without a compulsion to follow the physical layout of the hardware or devices. Referring again to FIG. 2, data received from sensor $D_1$ 296 of legacy software 270 may correspond with variable $D_1$ 297 of architecture server 230, shown as part of Avatar A 231. In some embodiments, sensor $D_1$ 296 is also shown as part of a legacy software 270, which may not connect through a DAQ or PLC, and instead may connect directly to an adapter 262. Any sensor/actuator of any machine may provide data corresponding to a variable of any Avatar 115. For example, sensor $D_1$ 296 corresponds with variable $D_1$ 297 of Avatar A 231, which also comprises variables $A_1$ through $A_n$ corresponding to sensors/actuators 281 $A_1$ through $A_n$ of machine A 275.

In some embodiments, when the functionality of the IoT Gateway 250 is replaced by a Fog Node, the node may contain logic and execution capabilities independent of external systems or the architecture servers 230, such that the Fog Node may function autonomously from the servers 230. In some embodiments, when acting autonomously from servers 230, the Fog Node may also be acting as an architecture host.

Figure 3:
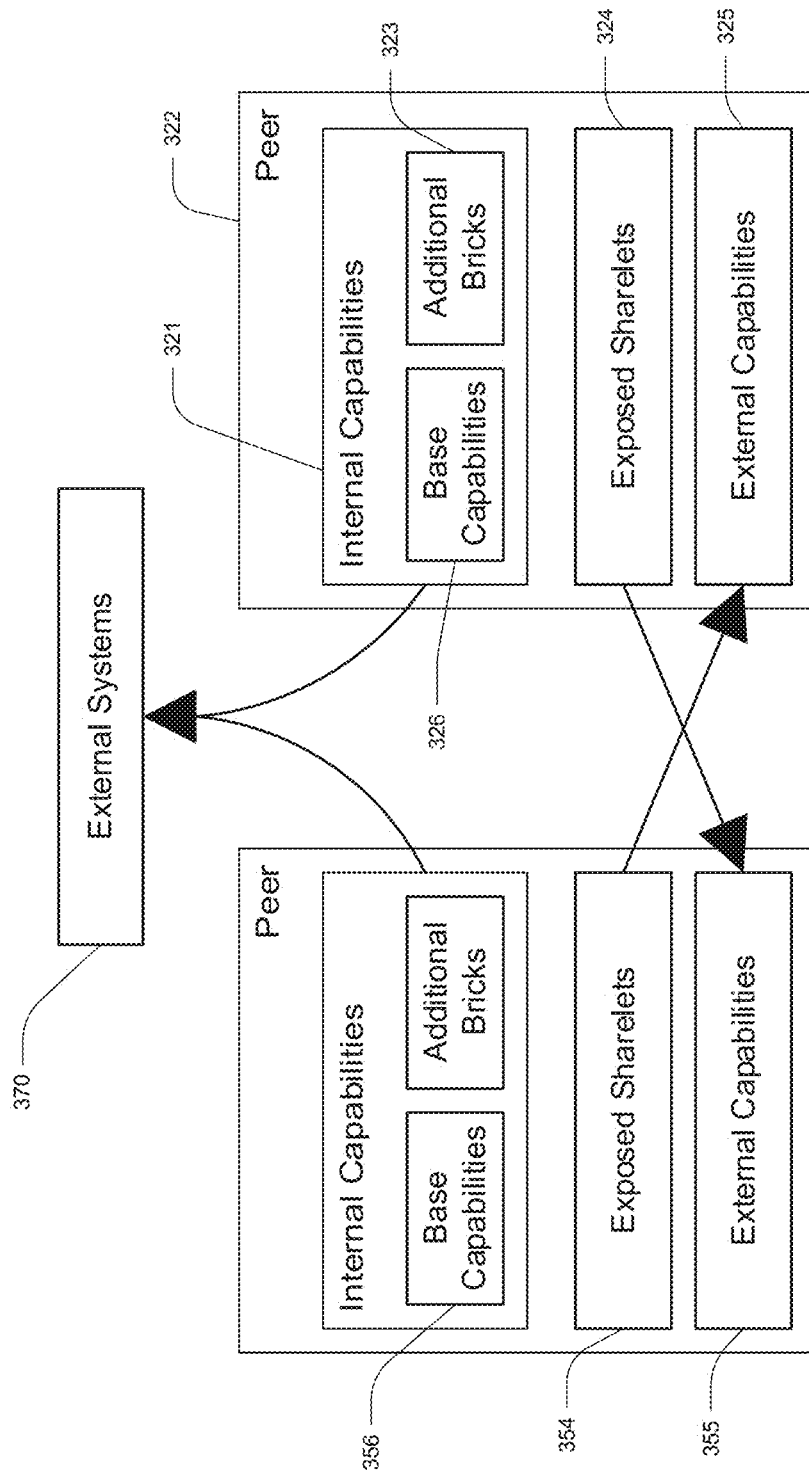
FIG. 3 illustrates example internal and external functionalities of IoT integrated automation and control architectures according to some embodiments herein.

FIG. 3 illustrates example internal and external functionalities of IoT integrated automation and control architectures according to some embodiments herein. For example, FIG. 3 illustrates the interaction between peers according to some embodiments. In some embodiments, a peer 322 comprises a combination of internal capabilities 321, exposed Sharelets 324, and/or external capabilities 325 derived from external peers. The external capabilities 325 of a peer 322 correspond to the exposed Sharelets 354 of one or more other peers. The exposed Sharelets 324 of a peer 322 may be available to one or more other peers. For those one or more other peers, the exposed Sharelets 324 may comprise an external capability 355.

Within peer 322, the internal capabilities 321 may comprise a combination of base capabilities 326, which may be the same among other peer's base capabilities 356, but may also include additional smart bricks 323. In some embodiments, these additional smart bricks 323 may comprise one or more add-on capabilities to enhance the internal capabilities 321 of peer 322. In some embodiments, these additional bricks 323 may be the same or different between any number of other peers. In some embodiments, the internal capabilities 321 of peer 322 may also interact with external systems 370, which may comprise external architectures or third-party systems. In some embodiments, external systems 370 may comprise any external software system exposing information or services that a peer 322 or any other peer may access. In some embodiments, this sharing is possible without any centralized server. In some embodiments, each architecture installation is referred to as an architecture peer and this peer configuration may enable logical hyper connections among peers. In some embodiments, the concept of HyPeer Connectivity allows different architectures to connect to each other to exchange data and services and eventually participate in a super-workflow, potentially leveraging the concepts of vertical and horizontal connectivity described herein.

In some embodiments, vertical connectivity refers to anything connectable inside a vertical solution, allowing integration of physical and software systems (i.e. HW/SW systems, devices, sensors), processes, users, activities and services that are internal to a legacy or new system. In some embodiments, the architecture enables vertical connectivity of these systems and facilitates orchestration of the systems with logic (e.g. rules, automation) and interfaces (e.g. UIs, notifications). In some embodiments, horizontal connectivity refers to the connection of two or more vertical solutions regardless of the number of distinct systems, allowing, for example, interoperable systems run by one or more companies. Horizontal connectivity also allows shared processes, data, services and goods among different domains of the same company, or even with external suppliers, customers, and/or sister companies, treating these business entities as cooperating parts of a large super-digital-organism. Horizontal connectivity may also refer to connections between distinct architecture installations.

Figure 4:
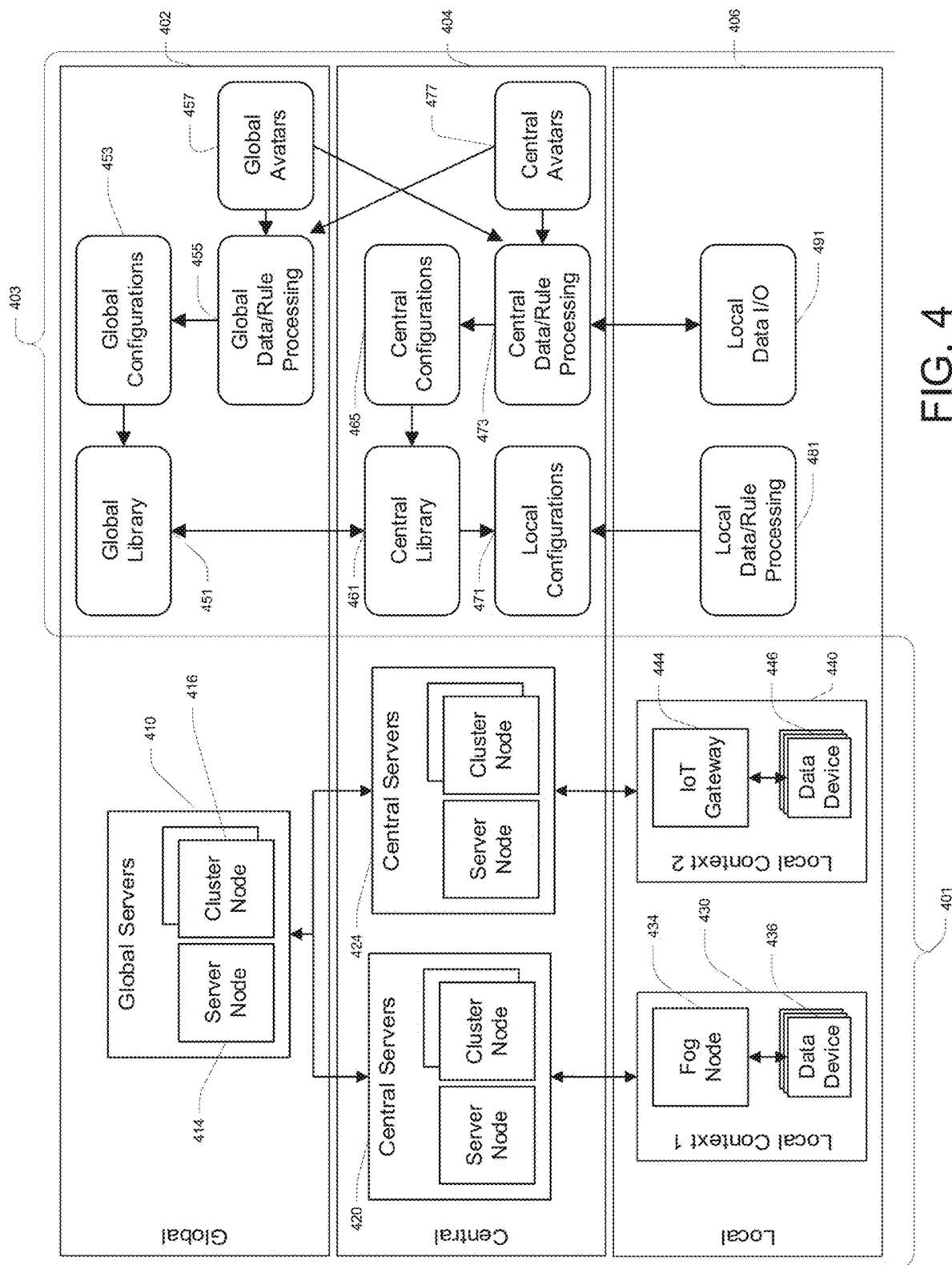
FIG. 4 illustrates example node deployment configurations of IoT integrated automation and control architectures according to some embodiments herein.

FIG. 4 illustrates an example node deployment configuration of IoT integrated automation and control architectures according to some embodiments herein. In particular, FIG. 4 depicts a multilevel architecture according to some embodiments. Both node deployment components 401 and configuration and sharing components 403 are illustrated. The architecture 100 is illustrated with multiple levels, including a global level 402, a central level 404, and a local level 406. Alternate deployments may employ more or fewer levels in any defined hierarchy.

In some embodiments, at the global level 402, node deployment may comprise of global servers 410 comprising any number of server nodes 414 and cluster nodes 416. In some embodiments, the global level may correspond to an organizational hierarchal peak such as a corporation or a hierarchal geographic peak such as the world. In some embodiments, at the central level 404, node deployment may comprise of any number of sets of central servers 420 and 424. In some embodiments, central servers 420 may be the same or different from central servers 424 in hardware, location, configuration, and/or number. In some embodiments, at the local level 406, node deployment may comprise of any number of Fog Nodes 434 and/or IoT Gateways 444. In some embodiments, each Fog Node 434 and/or each IoT Gateway 444 may be connected to one or more data devices 436 and 446, respectively. Data device(s) 436 is shown connected to Fog Node 434. This combination provides a local context 430 that may be further configured so that actions at the central level 404 or global level 402 are abstracted from the details of the hardware and connectivity at the local level. Data device(s) 446 is shown connected to IoT Gateway 444. This combination provides a local context 440 that may be further configured so that actions at the central level 404 or global level 402 are abstracted from the details of the hardware and connectivity at the local level.

A Fog Node 434 and an IoT Gateway 444 may each provide connectivity to local data devices 436 and 446. A Fog Node 434 can run autonomously even without connectivity to nodes at the central level 404 or global level 402, such that the Fog Node would also act as an architecture or engine host. In contrast, in some embodiments, an IoT Gateway 444 acts as an intelligent I/O data proxy but does not host an engine and logic may be executed at other levels. Thus, in some embodiments, an IoT Gateway 444 does not act independently of the central level 404.

FIG. 4 also illustrates the architecture of definitions, configurations, execution, and/or sharing in some embodiments as shown in sharing components 403. In some embodiments, the architecture 100 uses global configurations 453 to define a global library 451. Additionally, in some embodiments, global data/rule processing module 455 uses the global configurations 453. In some embodiments, global Avatars 457 are hosted by the global data/rule processing module 455. In some embodiments, the global Avatars 457 may be shared with external peers. In some embodiments, the above global components are defined at the global level 402.

In some embodiments, at the central level 404, central equivalents of the global components may be present. For example, central configurations 465 are used to define a central library 461. Central data/rule processing module 473 may use central configurations 465. In some embodiments, central Avatars 477 are hosted by the central data/rule processing module 473. In some embodiments, these central components are all defined at the central level 404 in central library 461. In some embodiments, the central level 404 also holds local configurations 471. In some embodiments, the global library 451 shares items with the central library 461. In addition, global Avatars 457 may be shared with the central data/rule processing module 473. In some embodiments, the central Avatars 477 are shared to the global data/rule processing module 455. In some embodiments, central Avatars 477 may also be shared with external peers.

In some embodiments, at the local level 406, local data/rule processing module 481 and/or local data I/O 491 may be located. In some embodiments, local data/rule processing module 481 runs using the local configurations 471 stored at the central level 404 or at the local level 406. In some embodiments, the local data I/O 491 sends and/or receives data to/from central data/rule processing module 473. In some embodiments, local processing may take place on Fog Nodes. In some embodiments, local data I/O may take place between IoT Gateways.

According to some embodiments the architecture's multilevel, modular nature allows connection of data, systems, and/or processes at all the possible points of intervention, whether or not they are near the involved machines and/or systems (HW and/or SW), at the plant level, at a company level or at a centralized global level. Modularity may be provided via granular architectural elements (i.e. smart blocks) that can be singularly developed, installed, and/or configured to bind and/or cooperate with other modules. The capability to be technology agnostic is realized by guaranteeing that every architectural module is not bound to any specific vendor or hardware availability.

In some embodiments, edge-side modules enable connections to any system or machine (e.g., PLC or database), regardless of their technology provider or technological era. For instance, an old machine may be transformed to work with the architecture via a consolidated engineering process. In some embodiments, server-side architectural modules can be installed locally, near the field (i.e., realizing edge/fog computing), in the cloud (public, private or hybrid) or on-premises, on physical hardware and/or on virtual machines.

In some embodiments, the architecture may employ base technologies including Kafka as a data streaming backbone, Java Enterprise Edition for processing data streams. Data streams may comprise multi-thread processes using native Kafka streaming library, with self-healing capabilities, such that if a thread/process goes down for any reason, the processing automatically restarts on another thread/process from where it was interrupted, seamlessly. The architecture may also employ back-end processes comprising load-balanced microservices that can be scaled up and out on the need. In some embodiments, for data persistence, the architecture may use a traditional or clustered relational DB for configuration and administration and may employ a separated live data, multi-master, and/or multi-slave architecture with geo-spatial and queryable JSON capabilities for short-term and/or long-term data storage. Optionally, a third party time series DB (e.g., InfluxDB, OSI-PI Historian) can be used. On the user interface side, some embodiments employ Angular 7 in an administration front-end and/or development environments for logical entities and their user interface.

In some embodiments the architecture tools for developers comprise smart bricks. Smart bricks can be developed, composed, shared, monitored, and/or administered inside a complete web-based development environment with syntax highlighting, code auto-completion, contextual help, logging, run-time monitoring, dependence graph, and other tools needed to face the most complex development scenarios. The architecture tools may allow developers to: create connections with existing hardware and software systems; model logical entities as Avatars 115 and/or Automatons 110, potentially giving Avatars 115 sense, reason, and the capability to act and cooperate. Smart bricks may provide Avatars 115 with custom frontends thanks to a web visual composer that may let developers create user interfaces potentially with a drag and drop based web development environment capable of composing complex human machine interfaces (HMIs) with zero-code and/or create complete, self-consistent bricks and/or solutions that can be instantiated, executed, and/or also shared horizontally. In some embodiments these architecture tools represent a complete full-stack development environment allowing external connections, logically modeled entities (e.g. assets, Avatars, rules, behaviors, actions, cooperation) and/or creation and/or use of frontends for human interactions.

Figure 5:
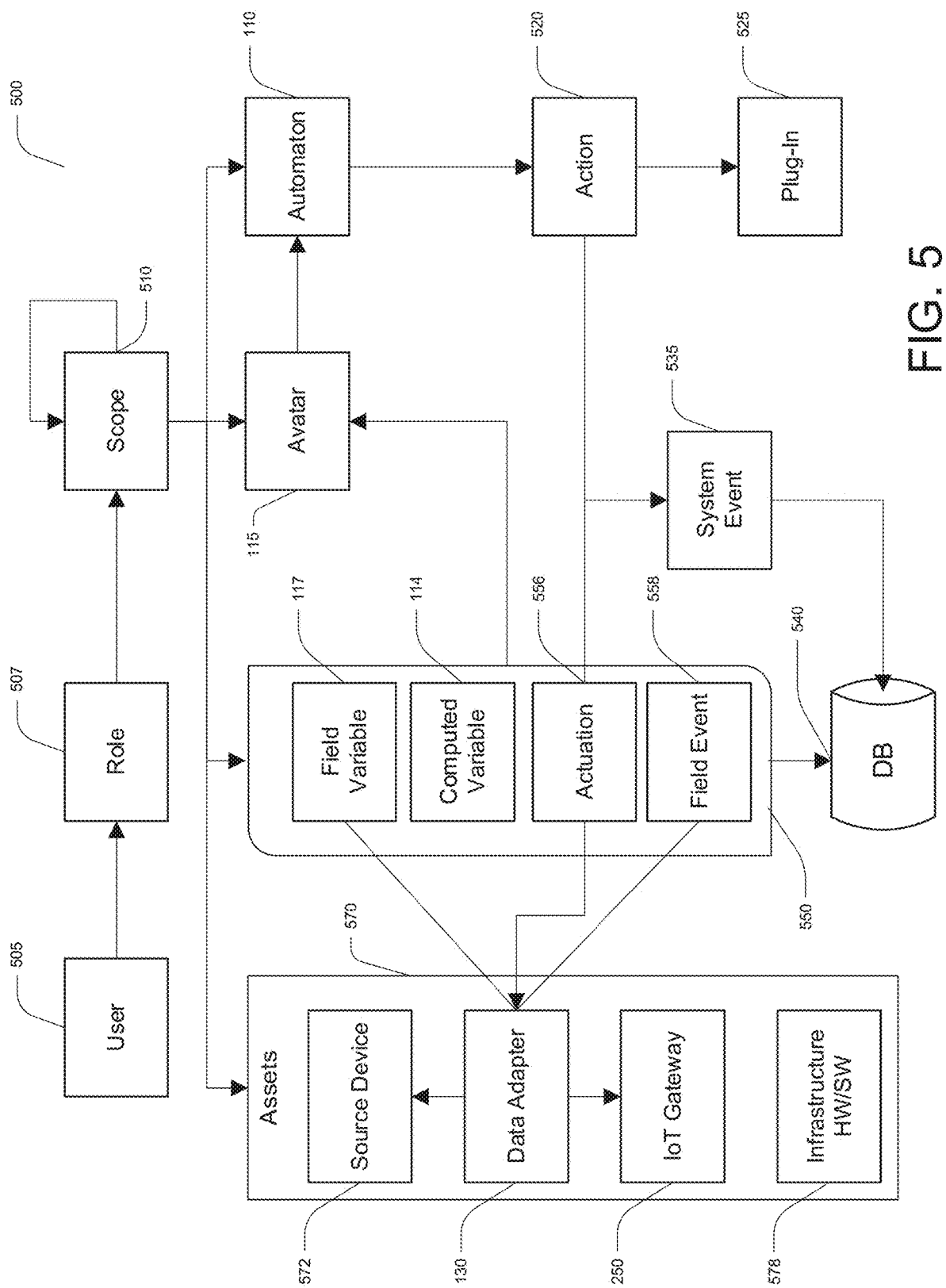
FIG. 5 illustrates components and/or features of an example IoT integrated automation and control architecture according to some embodiments herein.

FIG. 5 illustrates components and/or features of an example IoT integrated automation and control architecture according to some embodiments herein. FIG. 5 illustrates architecture components 500 and their relations according to some embodiments. In some embodiments, a user 505 has a role 507 that may associate that user to a scope 510. A scope 510 may have a parent scope, creating a recursive nesting hierarchy. In some embodiments, each scope 510 may create a partition of assets 570, variables 550, Avatars 115, and/or Automatons 110.

Among assets 570 are source devices 572, data adapters 130, IoT Gateways 250, and/or infrastructure hardware and/or software 578. In some embodiments, data adapters 130 may facilitate communication with source devices 572 and/or IoT Gateways 250. In some embodiments, the data adapter 130 may also set variables 550, including field variables 117 and/or field events 558. In some embodiments, variables 550 of type actuation 556 may communicate changes to a data adapter 130, which may propagate changes in parameters to a source device 572. In some embodiments, assets 570 may interact with hardware or software related as shown in infrastructure HW/SW 578. In some embodiments, variables 550 may be stored in a database 540. In some embodiments, any action 520 may effect an actuation 556 and/or a system event 535, which may be reflected in changes to the database 540. The database 540 may contain time series data. In some embodiments, a source device 572 may instead be called a data device 630. In some embodiments, a data adapter 130 may be referred to as a host adapter, or just an adapter.

In some embodiments, an Avatar 115 may include variables 550 including field variables 117, computed variables 114, field events 558, or actuations 556, that represent underlying system state information including values and/or states of source devices 572 which may include one or more sensors or actuators. Avatars 115 may also link to Automatons 110 that allow actions 520 that affect the same and/or different variables 550 and/or assets 570.

In addition to affecting variables 550, actions 520 may connect to plug-ins 525 that may involve actions including but not limited to notifications, database interactions, Rest API calls, interactions with external systems, generation of messages including emails and/or SMS, and/or report generation. In some embodiments, plug-ins are referred to as service bricks 112.

According to some embodiments, a user may comprise an account definition inside the architecture that can be granted access to some functionality. A user can be a human, in which case the human may have an associated username and password, plus optional personal data, or a system, in which case the system may have an associated API Key. In some embodiments, a user can have one role for any scope. In some embodiments, if a user U has a role R for scope S, then user U, on scope S, has all the permissions defined in the role R. According to some embodiments, to have permissions within the architecture, a user must be assigned a role for at least one scope 510. A role may comprise a set of permissions on the system. A role may be defined in terms of one or more of a code, which may comprise the name of the role, a description, which may comprise a user-friendly free text that describes what a user with that role can do, and a set of permissions, which may comprise properties that can be associated with one or more roles in order to specify what a user is permitted to do when assigned that role. In some embodiments, a role may include, for example, an administrator, installer/configurator, manager, line supervisor, line operator, analytic system, or third party system, among others.

In some embodiments, a scope 510 may comprise a logical space in which the system entities can be partitioned. In some embodiments, a scope 510 may be defined in terms of one or more of a name, which may comprise the name of the scope, and a description, which may comprise a user-friendly free text that describes the logical space. In some embodiments a scope 510 may include, for example, global, EMEA, plant, filling, maintenance, or facility, among others.

In some embodiments, a library may be defined by a set of asset types, Avatar types, Automaton classes, bundles, attachments and/or tags 660 and may be a centralized mechanism for sharing definitions. In some embodiments, every element of the library can be shared among scopes, forming the defined scope 510 visibility.

An entity with upward visibility may be visible from the scope 510 where it is defined and from all the scopes above scope 510 (i.e. ancestors). Upward visibility may be used to define entities in a scope 510 and let that definition be visible from all the ancestors' scopes. Upward visibility may be useful to share with upper scopes to allow users in upper scopes (e.g. supervisors and managers) see what is defined in this scope 510. In some embodiments, every non-library entity has upward visibility. In some embodiments, an entity with downward visibility may be visible from the scope 510 where the entity is defined into and from all scope lower than scope 510 of the scope hierarchy (i.e. descendants). Downward visibility may be used to define entities in a scope 510 and allow that definition to be visible from all the descendants' scopes. Downward visibility may be useful to share with descendants' scopes to allow an entity to be defined in scope 510 and shared with all sub-scopes of the scope hierarchy.

According to some embodiments, a tag 660 may comprise a property associated with an entity. Tags 660 may be defined centrally in the architecture to allow sharing among different scopes. In some embodiments a tag may be defined by one or more of the scope, which may comprise the scope 510 to which the tag 660 belongs, the type, which may comprise the context/class/usage of the tag 660 (e.g. "search filter"), the name, which may comprise the property to be valorized (e.g. "installed by", "managed by", etc.), the value, which may comprise the value of the tag 660 (e.g. "John Smith", "facility", etc.), the associated variables, which may comprise the list of variables with which the tag 660 is associated, the associated assets, which may comprise the list of assets with which the tag 660 is associated, the associated asset types, which may comprise the list of asset types with which the tag 660 is associated, the associated Avatars, which may comprise a list of Avatars 115 with which the tag 660 is associated, associated Avatar types, which may comprise a list of Avatar types with which the tag 660 is associated, and the associated attachment, which may comprise a list of attachments with which the tag 660 is associated.

According to some embodiments, an attachment 670 may comprise an arbitrary file or file reference that may be associated with an entity. Attachments 670 may be defined centrally in the architecture to allow the attachments 670 be shared among different contexts. An attachment 670 may comprise a scope, a title, and a type, which may define where the attachment 670 is stored. An attachment 670 storage location may be local, for example, if the file is stored locally inside the internal DB, or remote, for example, if the file is stored remotely. If the attachment 670 is stored remotely the HREF property may point to a remote location, such as a path on a remote server. An attachment 670 may comprise a MIME type in some embodiments. An attachment 670 may comprise an HREF, such as for example, "http://path/sub-path/Motor XYZ—Maintenance Manual.pdf", "file://videos/How to tune device ABC.avi", or others. An attachment 670 may comprise associated variables, which may be a list of variables with which the attachment 670 is associated. An attachment 670 may comprise associated assets, associated asset types, associated Avatars, associated Avatar types, and Tags 660.

According to some embodiments, assets or entities represent devices, HW and/or SW modules, and in general every element that the system and/or architecture may connect. In some embodiments, an entity or asset can represent parts of the system and how they are structured. Entity or Asset modeling may be used to represent how stimuli come from the peripheral environment and reach the reasoning sub-systems for local and/or remote processing.

According to some embodiments, the peripheral environment may represents the external boundary of the system including, for instance, sensors, actuators, and in general every element that can produce stimuli including, for example, sensor data, third party system databases or APIs, or receive actuations from, for example, actuators, third party system databases or APIs.

In some embodiments, for assets mapped in the architecture, it may be possible to remotely manage software installation and configuration, logically associate attachments 670 (e.g. configurations, manuals, photos, video tutorials), and/or logically associate tags 660 that can be used later to apply filters on searches, classify the assets, or associate properties that can be used for project customizations. In some embodiments, an asset may comprise an entity that may represented in the system and may be defined by one or more of s scope, which may define the scope 510 to which the asset belongs, a parent, which may represent the asset to which the entity may be connected (e.g. if a DAQ is connected to a network switch, then the switch may comprise the parent of the DAQ) or installed on (e.g. if a Modbus adapter is connected to an adapter host, then the adapter host is the parent of the Modbus adapter), and a type, which may comprise the asset type class to which the asset belongs and from which the entity inherits properties. In object oriented programming (OOP) terms, the type may represent the "class" to which the asset "object" belongs. In some embodiments, asset characteristics may include one or more of the following. A code may be comprise a unique name for the asset. The code property may be called "code" and not "name" to highlight the fact that the string may be used as a key for internationalization (i.e. a "code" may be used as a key to get the internationalized string for a specific language). In some embodiments, an SN may comprise the serial number of the asset. Unlike asset type, an asset typically may comprise a serial number. In some embodiments, associated variables may comprise a list of variables associated with the asset. Associated attachments may comprise a list of attachments 670 associated with the asset (e.g. manuals, videos, photos, configuration files, etc.). Associated tags may comprise a list of tags 660 associated with the asset. Tags 660 may be used to add arbitrary additional properties (e.g. EAN code, filterable properties to use in searches, etc.). Associated Loggables may comprise a list of Loggables associated with the asset. Loggables may comprise a type of event generated for this asset.

According to some embodiments, asset types may define classes of assets and may include common properties that may be inherited by all the assets belonging to that class (i.e. having that asset type as their type). Asset type may comprise an abstract definition of an entire class of assets. An asset type may have one or more of the following properties: a scope defining the scope 510 to which the asset belongs, a parent representing the class to which the asset type belongs (e.g. Siemens S7 1200 belongs to the class Siemens S7 that belongs to the class PLC), a series to which the asset belongs (e.g. Moxa IoLogik E1200), a model of the asset type (e.g. Moxa IoLogik E1212 of Series Moxa IoLogik E1200), a manufacturer of the asset (e.g. Moxa), an image that depicts the asset type, and an icon that may be used to represent the asset type in visualizations. Asset types may define classes of assets and/or the common properties that may be inherited by all the assets belonging to that class (i.e. having that asset type as their type). Stating this in OOP terms, the asset type may represent a "class" of asset "objects" and the parent of an asset type may represent its "super-class" (i.e. the "class" from which the asset type "extends").

According to some embodiments, given asset types A and B such that B=parent (A), and asset C such that type(C)=A, then C inherits: from asset type A, every not-NULL value for property series, model, manufacturer, image or icon; from asset type B, every not-NULL value for property series, model, manufacturer, image or icon from B, that is NULL for A; from both A and B, every defined tag if present. In some embodiments, if more than one tag is defined in the asset type hierarchy with the same tag type and tag name, then the inherited tag value may be the one associated with the nearest in the asset type hierarchy; from both A and B, every defined attachment 670 if present. According to some embodiments, every asset inherits not-NULL properties from the whole hierarchy of the associated asset type, giving precedence to the nearest asset type in the hierarchy. Asset types may be defined inside the system library and their visibility follows the library policies.

According to some embodiments, asset types may include data devices 630, adapters 130, architecture hosts, and/or other assets. Data devices 630 may represent anything that can provide and/or receive variables values, both in read (input) or write (output/actuation) mode. Data devices 630 may include but are not limited to sensors, remote I/Os, PLCs, and/or HW/SW Legacy systems reached via DBs, or APIs, among others. Adapters 130 may represent software modules specialized in reading and/or writing values from and to the peripheral environment. Adapters 130 may include but are not limited to Modbus adapter, S7 adapter, OPC (UA/DA) adapter, Ethernet/IP adapter, REST adapter, or DB adapter, among others.

Architecture hosts may represent any system or device that can host adapters or engines and are typically computers running a Linux distribution. Architecture hosts 120 may often manage edge side software installation and configuration (i.e. the hosts directly interact with the server side of a system installation) and the architecture host 120 can host local processing capabilities. In some embodiments, the architecture hosts 120 may include but are not limited PC/Servers, Fog/Edge Nodes, IoT Gateways, Mini PCs, and/or Virtual machines (on-premises or in cloud).

Other assets may represent any other systems or device, whether physical or virtual. These assets may, or may not, have a direct relation in stimuli, actuation reading, execution, and/or data flow. Other assets may include but are not limited to network appliances (e.g. switches, routers, firewalls), signals adapters and converters, relays, power supplies, cabinets, or boxes, among others. In some embodiments, a data device 630 may comprise a special asset able to send and/or receive data to and/or from the architecture through an adapter 130. A data device 630 may have any/all the properties defined for any other asset, but a data device 630 may further comprise a stream code, a unique ID (e.g. unique for every platform installation) that identifies all data coming from for this asset, and a list of I/O field variables, representing all the stimuli and possible actuations that are directly connected to that device.

According to some embodiments, data devices 630 may not be strictly associated with Avatars 115, since an Avatar 115 can be served by more than one data device 630, and one data device 630 can serve more than one Avatar 115. A data device 630 may comprise part of the system and may be connected physically to the real world, but the modeling of Avatars 115 or other representations in the architecture may represent logical abstractions of the underlying system, and may be modeled and designed in various ways.

According to some embodiments, a data device input variable can be used as a trigger for an Automaton 110, by associating the input variable received from the data device 630 to an Avatar 115 and reading the value of the variable inside the code of an Automaton 110 transition condition evaluation. Data devices output variables can be used to execute an Actuation by associating the output variable to an Avatar 115 and/or changing the variable value inside the code of an Automaton 110 transition actions. Any HW or SW device may be configured as a data device 630 if it represents an input and/or an output coming from, or going to, the "field" and, in general, interacting in any way with the system.

According to some embodiments, an adapter 130 may comprise a software component installed on the field side whose purpose may be to realize a stable connection between some field system (e.g. PLC, HW/SW, DAQ, etc.) and the system. An adapter 130 may comprise a configuration file that defines how to reach the data device 630 (e.g. IP and port) and/or the stream code of the data device 630, used to uniquely identify the data device 630 in the system. Each variable may comprise one or more of a a stream code of the variable, used to uniquely identify the variable in the scope of the data device 630, an identification of how to reach the variable (e.g. an address on the data device 630), a type of variable (e.g. Boolean, float, integer, etc.), a status as a read, write or read/write variable, a refresh period, which defines the read cycles followed by the adapter for that variable (i.e. how often read from the field and send to the platform), and/or a triggering condition that defines that the variable may be managed in event mode and may specify the event related to the variable's value update on the system.

Depending on the type of adapter 130, variable values on the platform are said to be managed in stream mode or event mode. In stream mode, the variable may be constantly read from the field and sent to the architecture on a timed basis comprising a refresh period. In some embodiments, in event mode, the variable may be sent to the architecture only if some event occurs, defined by a triggering condition. For example, consider a DB adapter that reads the value of a cell in a table. A triggering condition could be that the value of another cell changes (i.e. the value of the cell is different from the value during a read in the previous check cycle). For instance, a "version" or a "timestamp" related to the cell actually containing the variable's value could change. In some embodiments, the architecture 100 may provide an adapter for every protocol or custom system to connect to the platform. An adapter 130 can manage one or more data devices 630 of the same type (i.e. implementing the same protocol) at the same time. The number of managed data devices 630 managed by a single adapter instance depends on the characteristic of the HW on which the adapter may run, on the number variables to be managed, their refresh periods and the complexity of triggering condition execution, if any. In some embodiments, the architecture 100 has adapters available out-of-the-box, which may only need to be installed and configured. However, a partial implementation of a generic adapter can be used as a starting point to develop new adapters for new protocols and custom needs.

An architecture host 120 may comprise computer equipment in the form of a physical or virtual machine that may be able to execute the code of one or more adapters and/or host an architecture engine. The architecture hosts 120 can include IoT gateways 250, PCs, on-premises hosts, cloud hosts, or other computer hardware. IoT gateways 250 may link the field environment (e.g. the production line LAN), where machines, sensors, and data devices 630 (e.g. PLCs, Remote I/O) are located, and the architecture server components (i.e. message broker 235, DBs, processes) on an Information Technology Local Area Network (IT LAN). PCs (i.e. raspberry PI-like devices, mini PC, PC, server) may be connected to the IT LAN and realizing a stable connection with Legacy HW/SW reachable from the IT LAN. In some embodiments, on-premises hosts may comprise server machines in the form of physical hardware or virtual machines. In some embodiments, cloud hosts may be installed in the cloud as physical or virtual machines, reachable from the Internet, realizing a stable connection with SW systems reachable from the Internet. In some embodiments, the architecture hosts 120 may represent a hardware or software component that may be stably connected to at least one architecture central server.

According to some embodiments, the architecture 100 comprise functionality to add new asset configuration definitions without the need to wait for a new version of the architecture that includes new assets as native objects. Architecture integrators may define new asset types without requiring writing any code in some embodiments. Some embodiments herein implement a recursive algorithm able to interpret configuration file templates and/or additional metadata that specify how to build configuration files starting from data that may be already present inside a pre-existing architecture (i.e. variables and asset definitions plus asset hierarchy). For example, the architecture 100 may utilize one or more of a configuration file template, containing the file structure and a placeholder for each configuration field, and data potentially stored inside a configuration DB that may specify from where configuration field data comes (e.g. user input, fixed value, value coming from the configuration DB, a value coming from a formula) and/or how the configuration file structure may be related to the asset hierarchy already present inside the configuration DB.

According to some embodiments, the following elements may be defined to provide remote configuration capability for a standard and/or custom adapter. A ConfigFileDefinition may involve DB records defining Assettype (e.g. Modbus-adapter) configuration file structure/hierarchy and how to valorize configuration parameters. A ConfigFileDefinition may also define how to parse the ConfigFileTemplate in order to generate a correct ConfigFile. A ConfigFileTemplate may define the text, the shape, and/or the placeholders of the configuration file of each asset of the specified Assettype. Each Assettype may comprise more than one ConfigFileTemplate file, with different timestamps. ConfigParameters may comprise DB records comprising partial (i.e. the definition of how to evaluate) or complete (i.e. the actual value) configuration parameters for an asset. A ConfigFile may comprise a file to be uploaded on the field side. Each asset may have multiple associated ConfigFiles, with different timestamps.

In some embodiments, the system may compose a configuration file for a specific asset X by: selecting the ConfigFileTemplate associated with the Assettype of the asset X, selecting from ConfigFileDefinition all the records related to the Assettype of the asset X, and/or generating elements defined in the ConfigFileTemplate as specified in the ConfigFileDefinition, in accordance to the SubElements associated with asset X. This may enforce the concept of "peripheral brick", since system integrators may add new assets without writing new code or recompiling the system.

According to some embodiments, variables comprise an atomic modeling logical element. In some embodiments, variables may represent stimuli, values for actuations, or metrics/KPIs. Variable values can be transmitted to and from the peripheral environment or be internally generated by the architecture as the result of real-time computations and rules execution.

Some embodiments may comprise one or more of the following types of variables. Field variables 117 may be generated from and be transmitted to the peripheral environment. Field variables 117 can be configured as inputs whose values come from peripheral sensors or systems connected to data devices 630, are read by data adapters 130 installed on data gateways and/or reach the architecture 100 to be processed. Field variables 117 may also be configured as outputs whose values are computed inside the architecture 100 and sent to data adapters 130 to be applied on data devices 630 for actuations or data transmission. In some embodiments, field variables may be configured as both inputs and outputs, in which case the same variable can be read (e.g. from a sensor, like a temperature probe) and written (e.g. to an actuator, like a target temperature of a smart thermostat). In some embodiments, computed variables 114 may be automatically computed by the architecture using complex formulas. Computed variables 114 are typically computed using field variables values, which are often the inputs to the formula. In some embodiments, environment variables may comprise static variables potentially used as configuration parameters, fixed thresholds, or connection strings, among others. In some embodiments a data adapter 130 may be referred to as an adapter host, or sometimes as an adapter.

Figure 6:
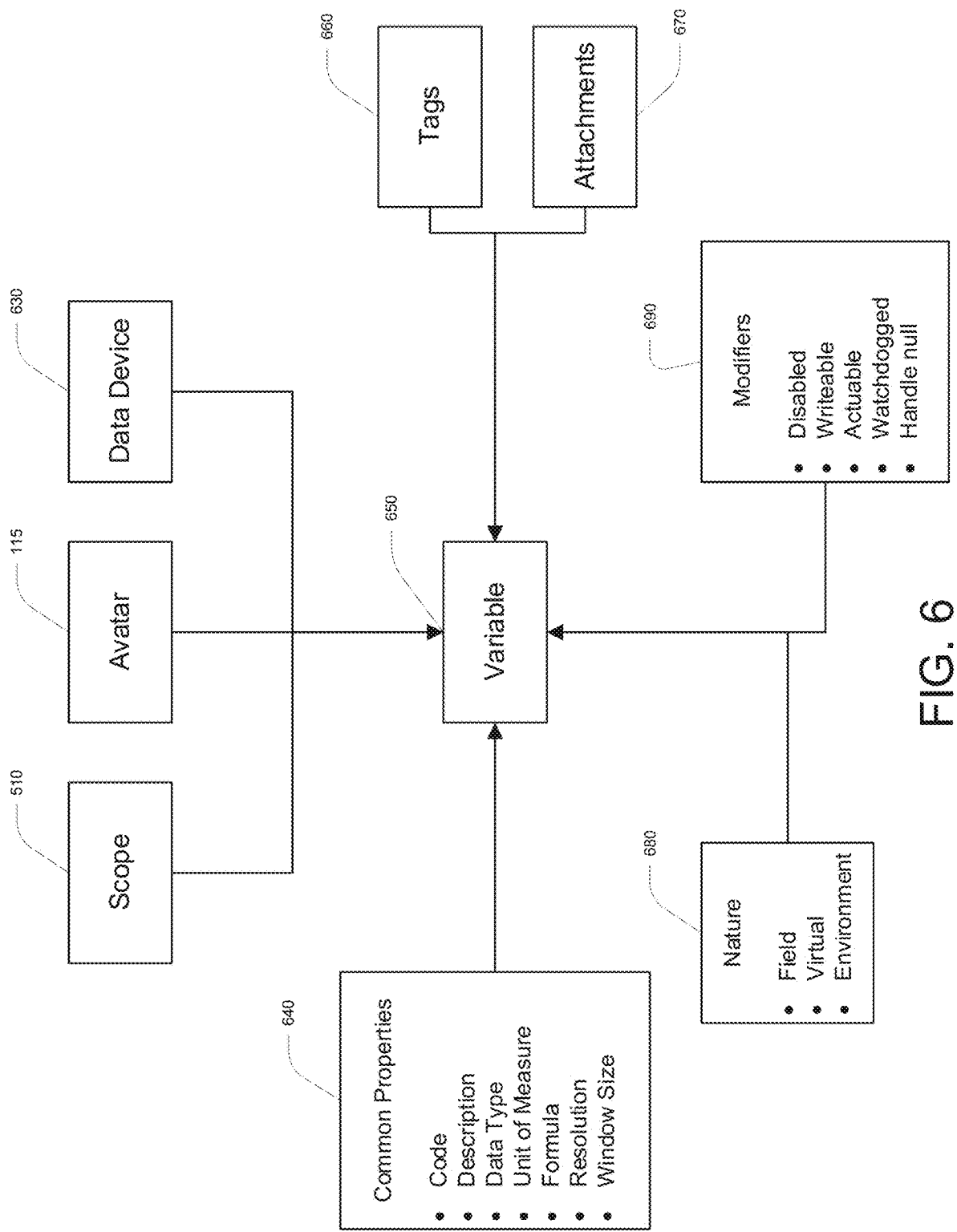
FIG. 6 illustrates example variable interactions of IoT integrated automation and control architectures according to some embodiments herein.

FIG. 6 illustrates example variable interactions of IoT integrated automation and control architectures according to some embodiments herein. FIG. 6 illustrates variable 650 interactions according to some embodiments. A scope 510 may define a variable 650 visibility. In some embodiments, an Avatar 115 may be considered the logical owner of a variable 650. In some embodiments, a data device 630 may define the source and/or destination of a variable 650 within the architecture and/or system.

Tags 660 may define additional properties to associate with a variable 650 for customization. Attachments 670 may associate files and/or documents with variables 650. According to some embodiments, attachments 670 may include documentation, photos, or videos, among others. A variable 650 may possess one or more of a set of common properties 640. According to some embodiments, common properties may include, but are not limited to, code, description, data type, unit of measure, formula, resolution, window size, or others. In some embodiments, a formula may be available for computed variables 114 and/or environment variables. Resolution may apply to field variables 117 and/or computed variables 114. Window size may apply to field variables 117 and/or computed variables 114. A variable 650 may have its nature 680 described using one or more of field, virtual, and/or environment.

A variable 650 may comprise modifiers 690 to alter variable behavior and/or treatment. Modifiers may include, but are not limited to, disabled, writeable, actuable, watchdogged, handle null, or others. A writeable modifier may apply to field variables 117 and/or computed variables 114. An actuable modifier may apply to a field variable 117. A watchdogged modifier may apply to a field variable 117. A handle null modifier may apply to a computed variable 114.

According to some embodiments, variables 650 may comprise entities that represent data managed by the architecture. Variables 650 may be logically associated with Avatars 115, throughout which variables 650 are referenced (i.e. Avatars 115 may partition variables 650). A variable type and behavior may be defined by its data type, nature, and/or the value of its modifiers. A variable data type may define what type of values the variable can assume. A variable may comprise one or more following possible data types: Boolean, numeric, string, record (i.e. a JSON based data type that can be used to store structured data representing single or arrays of simple or complex objects), or another data type.

According to some embodiments, a variable nature may define where the variable values come from and how the variable may be used. Variable nature can include: FIELD (e.g. read from the field and pushed on the message broker 235), COMPUTED, ENV (e.g. a configuration variable that is not updated after the first definition). A computed variable 114 may use a formula as a programmatic definition of the calculation to be done by the architecture to compute the variable's new value. Formulas may have input variables, including for instance the variables referenced in the formula, and/or output variables, which may comprise the content of the "return" statement if explicit, or the only value expressed by the formula. In some embodiments, formula computation may be executed in real-time.

According to some embodiments, variable modifiers 690 may be flags that may activate additional variable 650 behaviors. Possible modifiers 690 may include: disabled (e.g. may be used to disable the variable 650), writable (e.g. may be used to permit to change the value of the variable 650 programmatically or via UI), actuable (e.g. may be used to define a variable 650 as an Actuation), watchdog (e.g. may be used to check if the variable 650 has been updated from the field and check whether the connection between field and engine is active), and/or handle null (e.g. may allow the system to calculate a formula even when some variables 650 are null). In some embodiments, the option to activate a modifier 690 on a variable 650 may depend on the nature of the variable.

In some embodiments, disabling a variable 650 may effectively temporarily delete the variable 650 from the architecture. References in formulas or Automatons 110 to a disabled variable 650 may produce an error. The architecture may identify such circumstances in variable 650 and Automaton 110 monitoring functionality within the admin UI.

In some embodiments, if a watchdog modifier is activated on a variable 650, then all the formulas and Automatons 110 that reference that variable 650 may be evaluated continuously. In some embodiments, if a watchdog is activated for a variable 650, additional functionalities may be exposed for that variable 650, which may include checking if the variable 650 has been updated and potentially triggering an alarm if there is no connection to the field.

In some embodiments, a field variable value may be updated by the data adapter 130 when the data adapter 130 detects that a new value must be sent to the system. In some embodiments, this may be done in stream mode at a configured time interval, defined by the refresh period set in the data adapter 130 configuration, and/or in event mode, depending on a logical event detected by the data adapter 130 (e.g. "send new value for X if variable Y, containing a timestamp, changes").

In some embodiments, a field variable value may be updated by an Automaton action during a state transition. In some embodiments, such changes are allowed only if the field variable is writable and/or actuable. When the field variable 117 is writable, then the value may be treated as if changed by the data adapter 130, and computed variables 114 and Automatons 110 may be updated/activated depending on the variable. When the field variable 117 is actuable, then the value may be sent to the data adapter 130 to complete a corresponding actuation and computed variables 114 and Automatons 110 may be updated/activated depending on the variable. In some embodiments, the variable's value may not be changed on the server side, but instead sent to the edge. In some embodiments, the value may be updated on the server side as soon as a new value is read by the data adapter 130 and sent to the server. In some embodiments, the updated variable value may be sent to the engine and some or all computed variables 114 and Automatons 110 may be updated/activated depending on the variable.

According to some embodiments, a computed variable 114 value may be updated by the architecture 100, for example, when a variable 650 which the computed variable 114 depends on (i.e. the ones used inside its formula) is updated. An environment variable value may be evaluated by the system in a lazy mode, for instance, every time the environment variable is referenced, such as inside a computed variable's formula or a transition's condition evaluation of action execution.

According to some embodiments, the computed variable's context may comprise an object that wraps the execution context of a computed variable 114. In some embodiments, the computed variable's context may expose the storage used to store data hosted by the variable's context and/or a set of utility methods that help variable development. The computed variable's storage may comprise a memory area used to store variables that are local to the variable 650 itself and can be accessed during the evaluation of the computed variable's formula. The local storage may comprise a set of <Key, Value> pairs. A Key may represent the "name" of the variable 650 and may be unique for each computed variable 114. A Value may comprise the value of the variable 650 with that Key.

According to some embodiments, computed variable snapshots may reference the context at the end of the evaluation of a computed variable formula. Snapshots may have an immutable representation of a variable's storage and/or values at the moment the snapshot was taken. The architecture 100 may refer to "variable snapshot" meaning "computed variable snapshot". Variable snapshots may be accessible through the old( ) method exposed by the computed variable's context and may be accessible from the formula code. In some embodiments, the old( ) method may give access to the variable snapshot from the end of the previous variable evaluation.

Some embodiments may employ windowed variables. A windowed variable may comprise a field variable 117 or computed variable 114 with numeric data type for which the window size property is set with a value greater than 0. Windowed variables may be used to aggregate data points before saving them inside a time series DB. In some embodiments, when a time window closes, the system may store in the DB one or more of the values of the windowed variables collected during the time window, the timestamp at the end of the time window, the minimum among the collected values, the mean of the collected values, the maximum among the collected values, and/or the standard deviation of the collected values, among others.

Figure 7A:
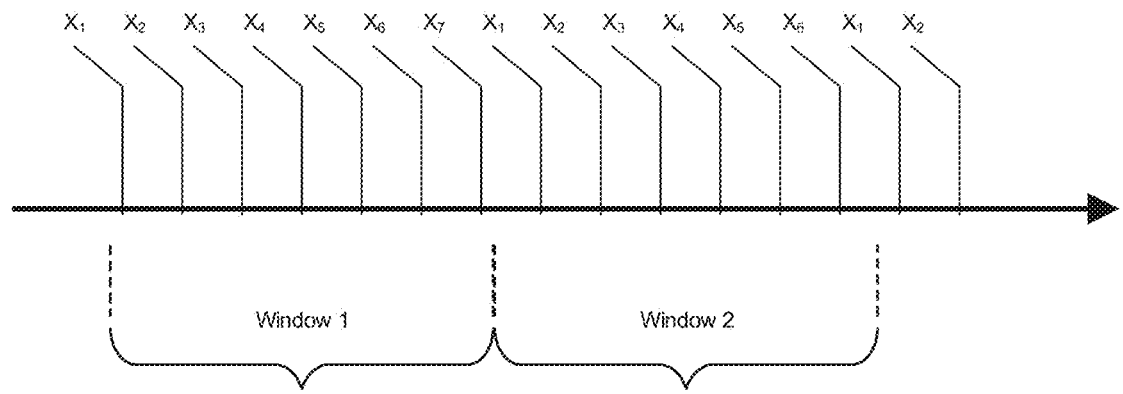
FIG. 7A illustrates an example of Windowed variables for IoT integrated automation and control architectures according to some embodiments herein.

FIG. 7A shows an example of two windows for a windowed variable according to some embodiments. The horizontal arrow represents time and X, are the samples of the variable inside a Window. As illustrated in FIG. 7A, Window 1 contains values from times $X_1$ through $X_7$ and Window 2 contains values from times Xi through $X_6$. Windows may contain any number of samples depending on the size of the window and frequency of samples within that window.

According to some embodiments, the windows size may be set to zero. If the windows size is set to zero (i.e. non-windowed variable), then any time a new value arrives to the architecture 100, the architecture 100 may store the value of the variable and/or a timestamp. Field variables 117 may apply a timestamp recorded from the adapter side before the value is sent to the message broker 235, according to some embodiments. For computed variables 114, the timestamp may coincide with the timestamp of the most recent input variable referenced inside the computed variable formula (which variable may or may not be used for determining the new computed value), according to some embodiments. For non-windowed variables, the architecture 100 may record the minimum, the mean, and the maximum value equal to the variable value with the standard deviation equal to zero in some embodiments.

Figure 7B:
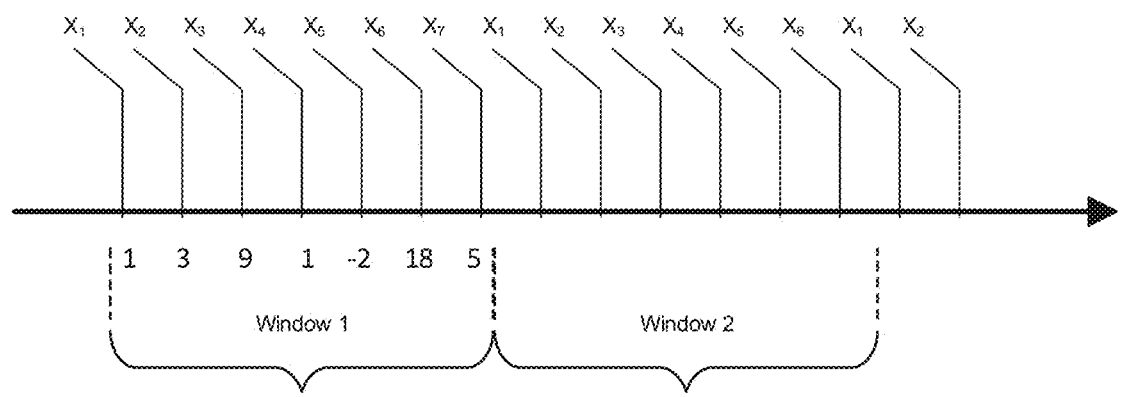
FIG. 7B illustrates another example of Windowed variables with example values for IoT integrated automation and control architectures according to some embodiments herein.

An example windowed variable recording according to some embodiments is illustrated in FIG. 7B. In FIG. 7B, for the time between $T_1$ and $T_7$, the values 1, 3, 9, 1, −2, 18, and 5 of variable X are collected from the field by an adapter 130 and sent to the message broker 235. In this case, the following calculations could result: window size=$T_7-T_1$; mean µ could be defined by (1+3+9+1−2+18+5)/7=35/7=5; standard deviation could be calculated as the square root of $((1-\mu)^2+(3-\mu)^2+(9-\mu)^2+(1-\mu)^2+(-2-\mu)^2+(18-\mu)^2+(5-\mu)^2)$ which equals approximately 6.21. According to some embodiments, when time $T_7$ passes, the Window 1 is closed and the following values may be written to the DB: values (1, 3, 9, 1, −2, 18, 5), timestamp ($T_7$), min (−2), mean (5), max (18), and standard deviation (6.21).

Figure 8:
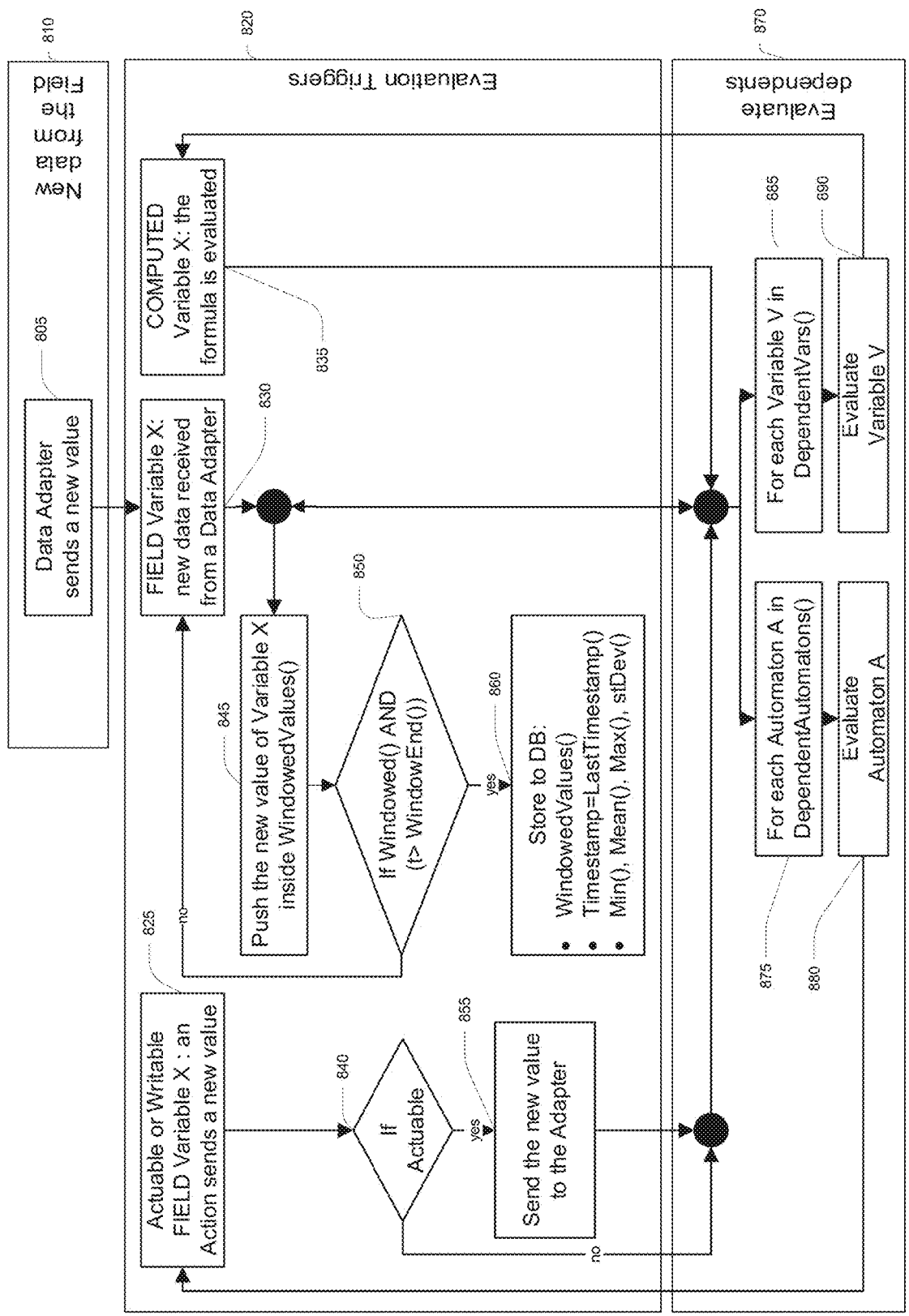
FIG. 8 illustrates an example flowchart for a component actuation process according to some embodiments herein.

FIG. 8 illustrates an example flowchart for a component actuation process according to some embodiments herein. FIG. 8 illustrates variable features according to some embodiments. New data may come from the field 810. A data adapter 130 may send a new value corresponding to a sensor/actuator at 805.

In some embodiments, variables 650 may change based on evaluation triggers 820. New data, from data adapter 130, may update a field variable 117 at box 830. Computed variables 114 may depend on formulas, which may be evaluated at 835. Field variables 117 that are actuable or writeable may receive a new value based on an action at 825. New data, may be added to an array, WindowedValues( ) at 845. In some embodiments, the architecture 100 may evaluate if the variable is windowed and if the time is beyond the end of the window at 850. If the variable is windowed and the time is beyond the end of the window, the data may be stored to a database at 860. Data stored to the database may include the WindowedValues( ), a timestamp, which may be LastTimestamp( ), as well as computed values including minimum, maximum, mean, and/or standard deviation. For actions that alter values, if those variables are actuable, the new value may be sent to the appropriate adapter at 855.

Other variables or objects in the architecture may depend on variables 650. A set of procedures may evaluate dependents 870. Possible sources of change may include new data at 830, altered computed variables 114 at 835, writeable field variables 117 triggered by actions at 840, and/or actuable field variables 117 triggered by actions at 855. The above, and possibly other inputs, may necessitate checking dependent Automatons 110 at 875, and then evaluating the Automatons 110 at 880. Alternatively, or in addition, the above, and possibly other inputs, may necessitate checking dependent variables at 885, and then evaluating the variables at 890. The evaluation of dependent variables at 890, may result in changes to computed variables 114 at 835. Recursive evaluations may therefore result from the above connections.

Some embodiments may use any of the following terms and/or definitions: DependentVars$_x$( ) as a list of computed variables that have X as an input value, DependentAutomatons$_x$( ) as a list of Automatons that use X in the condition evaluation, T as a current timestamp, Windowed$_x$( ) as true if the window size of variable X is >0, WindowedValues$_x$( ) as a temporary buffer to store values before DB persistence, WindowEnd$_x$( ) as a current window end time for X. Min$_x$( ) as a minimum value of X inside the current time window, Mean$_x$( ) as the mean value of X inside the current time window, Max$_x$( ) as the maximum value of X inside the current time window, and stdDev$_x$( ) as the standard deviation of X inside the current time window.

According to some embodiments, a variable resolution represents the maximum admitted variation wherein a variable is considered to be fixed. For example, a real valued measurement may begin with a value of 5 and have a resolution set to 4. As long as the measurement remains within 4 of the initial value, the value may be considered not to have changed. If, at some time, the measurement is outside the "current" value plus/minus the resolution, in this case 5±4=(9,1), then a new value may be set and new boundaries of change defined. As long as the variation associated with this field variable 117 is between the upper and lower thresholds set by the variable resolution from the current value, the variable may be considered as "fixed". If a measurement of, for instance, 9 were taken, that number is outside the allowed range to be considered fixed and the new value of the variable would be 9. In some embodiments, the new upper and lower thresholds for variation that would be allowable without changing the variable would be 13 and 5 respectively, computed based on 9±4=(13,5).

Figure 9:
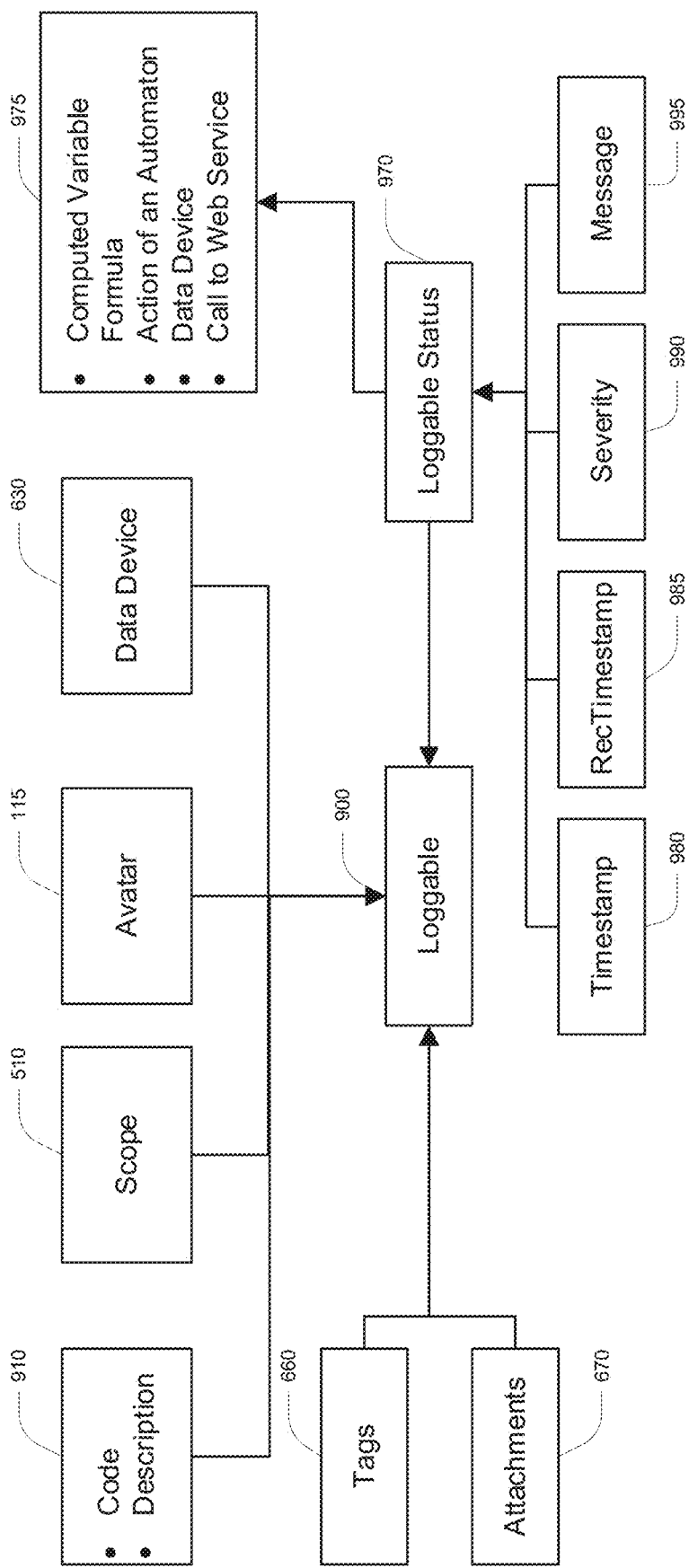
FIG. 9 illustrates example Loggables interactions of IoT integrated automation and control architectures according to some embodiments herein.

FIG. 9 illustrates example Loggables interactions of IoT integrated automation and control architectures according to some embodiments herein. FIG. 9 illustrates Loggables according to some embodiments. A Loggable 900 may be visible according to its scope 510, have an Avatar 115 as a logical owner, have a data device 630 where the Loggable 900 is received from or is transmitted, and may have properties 910 which may include a code and/or description. Tags 660 may define additional properties to associate with a Loggable 900 for customization. Attachments 670 may associate files with a Loggable 900, such files potentially including documents, photos, or videos, among others. A Loggable status 970 may be generated by events 975 such as a computed variable formula, an action of an Automaton 110, a data device 630, a call to a web service, or some other action and/or event. The Loggable status 970 also may comprise a creation time of timestamp 980, an event time of RecTimestamp 985, a classification or other label severity 990, and/or any notes or description as part of a message 995. The Loggable status 970 provides a status for Loggable 900.

According to some embodiments, a Loggable 900 may define a type of data that must be logged in the architecture 100. In some embodiments, a Loggable 900 may be defined by the scope 510 to which the Loggable 900 belongs, an international name (it could be used as the Loggable's name) sometimes called code, a description, which may comprise the source of the Loggable's values, if they come from the field, which could be an asset, the associated Avatar 115, any associated tags 660, and/or any associated attachments 670.

According to some embodiments, a Loggable status 970 may define a single value of a Loggable 900. A Loggable status 970 may be defined by the associated Loggable 900 that defines the Loggable "class" to which the Loggable status 970 belongs, the timestamp for the creation of this Loggable status 970, the timestamp when the event the Loggable status 970 refers to occurred, sometimes called RecTimestamp, text describing this event, sometimes called a message 995, and a value, sometimes an integer, to classify the severity of the event this Loggable status 970 refers to, sometimes called severity.

According to some embodiments, an Avatar 115 may be a digital representation of a physical remote entity, including for instance a device, a machine, and/or a system. Users and systems can interact with an Avatar 115 as they would with the related entity. When the remote entity is disconnected, its Avatar may provide a representation of its last known status. In some embodiments, an Avatar 115 may be defined by one or more of the following properties. An Avatar 115 may be defined by the scope 510 to which the Avatar 115 belongs. An Avatar 115 may be defined by a parent, which may represent the parent Avatar 115 in which the Avatar 115 is contained within an Avatar hierarchy, to permit representation of systems and sub-systems. An Avatar 115 may be defined by type, as an abstract definition of an entire class of Avatars that inherit its properties. An Avatar 115 may be defined by code as an international name and which could also be used as the Avatar's name. An Avatar 115 may be defined by a description. An Avatar 115 may be defined by a list of variables 650 associated with this Avatar. An Avatar 115 may be defined by a list of attachments 670 associated with this Avatar, including items such as manuals, videos, photos, configuration files, or others. An Avatar 115 may be defined by a list of tags 660 associated with this Avatar. An Avatar's 115 defined tags 660 may be used to add arbitrary additional properties, for instance EAN code, filterable properties to use in searches, or others. An Avatar 115 may be defined by a list of Loggable 900s associated with this Avatar. Loggable 900s are a sort of events generated for this Avatar. An Avatar 115 may be defined by a list of Automatons 110 associated with this Avatar. Associated Automatons 110 can be used to represent logic states, such as, for example, Ok/Warning/Error, On/Standby/Off, detailed production phase, or others, for the Avatar.

According to some embodiments, an Avatar type may represent an entire class of Avatars 115 from which belonging Avatars may inherit common properties. An Avatar type may be defined by any of the following characteristics. An Avatar type may be defined by its scope, which may define the scope 510 to which the Avatar type belongs. An Avatar type may be defined by its parent, which may represent the superclass of this Avatar type. Properties not explicitly defined (e.g. image, icon, tags 660, attachments 670 and/or skin) in an Avatar type may be inherited by its parent. An Avatar type may be defined by the Avatar type's name. An Avatar type may be defined by a description. An Avatar type may be defined by a list of attachments associated with the Avatar 115, including for instance manuals, videos, photos, configuration files, or others. An Avatar type may be defined by a list of tags 660 associated with this Avatar. Tags 660 may be used to add additional properties, including for instance EAN code, filterable properties to use in searches, or others. A skin may represent the UI representation of the Avatar.

According to some embodiments, a finite-state machine (FSM) or finite-state automaton (FSA, plural: automata), finite Automaton, or simply a state machine, may be a mathematical model of computation. The FSM can change from one state to another in response to external inputs. The change from one state to another may be called a transition. An FSM may be defined by a list of its states, its initial state, and/or the conditions for each transition.

Figure 10:
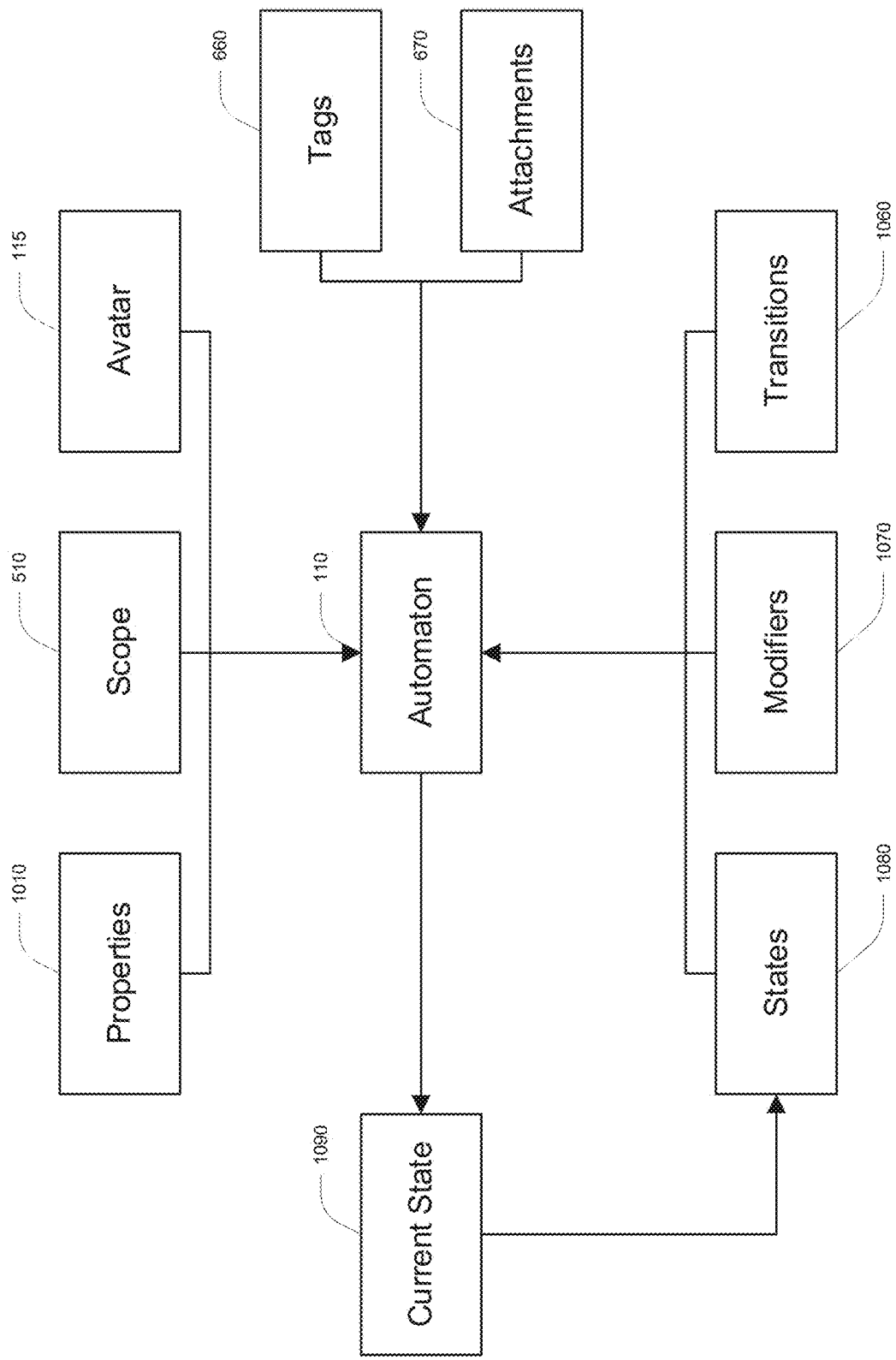
FIG. 10 illustrates example features of Automatons of IoT integrated automation and control architectures according to some embodiments herein.

FIG. 10 illustrates example features of Automatons of IoT integrated automation and control architectures according to some embodiments herein. An Automaton 110 may have its visibility defined by the scope 510 and may logically owned by an Avatar 115. An Automaton 110 may have properties that may include code, and/or a description. Tags 660 may define additional properties to associate with an Automaton 110 for customization. Attachments 670 may associate files with an Automaton 110, such files potentially including documents, photos, or videos, among others. Transitions 1060 may define how an Automaton 110 can transit from one state to another and details regarding such a change. Modifiers 1070 may define value change behavior, one such possible modifier being "disabled." An Automaton 110 may have a current state 1090 which is one of the possible states 1080.

According to some embodiments, an Automaton 110 may be a finite state machine defined by states 1080, a finite set of possible states that the entity can assume, the current state 1090 of the Automaton 110, and/or transitions, a finite set of ways to pass from a state to another. A transition may be defined by the initial state of the transition, the final state of the transition, the condition that must be true to make the Automaton 110 pass from start state to end states, and/or a list of actions that must be executed when the Automaton 110 passes from start state to end states.

According to some embodiments, an architecture Automaton 110 may be a Finite state machine defined by the scope 510 to which the Automaton 110 belongs, the current state 1090 of Automaton 110, the Avatar 115 to which an Automaton 110 belongs, for instance the Automaton 110 can represent one of the Avatar's internal statuses; an international name, sometimes called code, and which could also be used as the Automaton's name; a description; states; and/or transitions. An automaton's states 1080 may represent a finite set of possible states that the machine can assume. A state may be defined by its: Id; code; color, which may be the color to use for state visualization; and/or a description of the state. Transitions may be a finite set of ways to pass from a state to another. A transition may be defined by: the initial state of the transition; the final state of the transition; the condition that must be true to make the Automaton 110 pass from the "from state" to the "to states;" and/or transition actions which may specify programmatic actions to be taken when transitioning.

Figure 11:
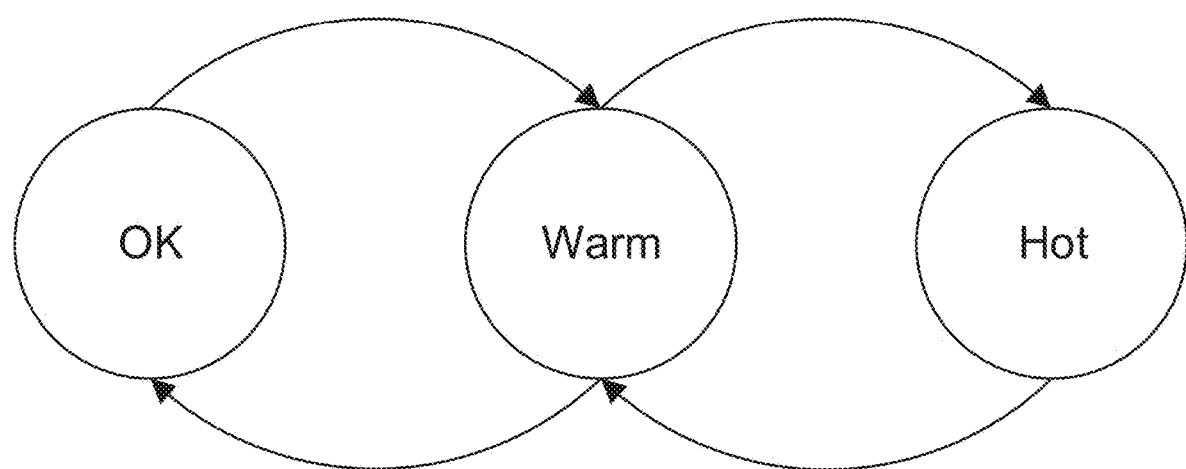
FIG. 11 illustrates an example of component states and transitions of components of IoT integrated automation and control architectures according to some embodiments herein.

As an example of a simple Automaton 110, according to some embodiments, consider FIG. 11 which illustrates an Automaton's states that represent the temperature status of a system. The Automaton 110 can be any of three states: Ok, Warm, or Hot. A table of transition definitions could be defined to move from/to any pair of states. For instance, states may change from "OK" to "Warm" if the temperature is greater than 50 but less than 100. States may move from "Warm" to "OK" if temperature is less than 50. State may change from "Warm" to "Hot" if the temperature is greater than 100.

For any transition between states, an Automaton 110 may execute actions. For instance, in some embodiments, the Automaton 110 illustrated in FIG. 11 may issue a notification when transitioning from OK to "Warm" indicating "temperature rising." When transitioning from "Warm" to "Hot" the system may notify an alarm and/or start an anti-fire system. When transitioning in the opposite directions the system may notify that the temperature is lowering, or may disable anti-fire measures.

According to some embodiments an Automaton 110 may be said to be disabled when the Automaton has the disabled flag selected. In some embodiments the effect of disabling an Automaton 110 may be the same as deleting the Automaton 110 from the architecture with the difference that the disabled flag may be removed and the architecture may re-enable a disabled Automaton 110.

According to some embodiments, the Automaton's context may be an object that wraps the execution context of an Automaton 110. The Automaton's context may expose the local storage, used to store data that are hosted by the Automaton's context, and/or a set of utility methods that facilitate Automaton development.

According to some embodiments, the Automaton's storage may be a memory area used to store variables that are local to the Automaton 110 itself and can be accessed during the whole lifecycle of an Automaton 110. The Automaton's storage may be defined as a set of <Key, Value> couples, where Key represent the "name" of the variable and the key may be unique for each Automaton 110, and Value contains the value of the variable with that Key. Values can be: Booleans, single numeric values, sets of numbers, and/or strings.

According to some embodiments, the Automaton's plug-ins may be software services that augment the integration capabilities of the architecture. Plug-ins can be hot deployed (i.e. while the system is running). Once deployed they may be available as new plug-ins in the Automaton's editor. In some embodiments, plug-ins may be referred to as services, and/or service bricks.

According to some embodiments, a transition condition may be defined as repeatable if its repeatable modifier is set to True. According to some embodiments, the repeatable modifier is used to force the architecture to repeat the evaluation of the condition even if the transition condition has already been evaluated and the Automaton 110 remained in the same state.

According to some embodiments, a transition condition may be defined as loose, or loosely triggered, if its loose-trigger modifier is set to true. According to some embodiments, the loose-trigger modifier may be used to force the architecture to evaluate the condition whenever a new value arrives for a variable that an Automaton 110 may depend on, even when not explicitly referenced inside the condition. When the loose-trigger modifier is false, then the condition may be evaluated if at least one of the variables or the Automatons referenced inside the condition definition is updated.

According to some embodiments, a transition action may be defined as abortable if its abortable modifier is set to true. The abortable modifier may be used to specify that the transaction must not be executed if some exception is generated and not managed inside the action. In some embodiments, the abortable modifier may not be used for operations executed inside a runAsync code fragment since that code may be executed asynchronously and the Automaton 110 may change its state before the execution of the asynchronous operations.

According to some embodiments, a transition action may be defined as remote if its remote modifier is set to true. The remote modifier may be used to specify that the action execution must be asynchronous. In some embodiments, remote actions may be scheduled, which may mean they are sent to a queue of actions to be executed asynchronously. The time that may pass before a remote action executes may vary. In a clustered installation, according to some embodiments, the broker 235 processes executing the actions could be located in different servers. Remote action execution in that scenario would likely be asynchronous. In some embodiments of a single node installation, sometimes called a one host installation, the remote modifier may force the architecture to execute the action asynchronous on the same, and only, host.

According to some embodiments, Automaton actions may not be transactional. Some embodiments may include roll-back functionality.

According to some embodiments, Automaton actions can prompt the architecture to asynchronously change the value of variables using special send methods. Value change requests can be done on: Actuable variables, which may change a variable's value on the field side, by asking the related adapter to perform the Actuation; and/or writable variables which may change only the variable's value on the host side without any direct effect on the field side. In some embodiments these methods may not be executed immediately, but asynchronously as soon as the "value change request" is processed by the system and/or architecture.

According to some embodiments, the variable's value change request can be done in at least one of the following two modes, or others. Single mode may change the value of a single Actuable/writable variable. Group mode may allow two or more variables value change requests together. According to some embodiments, multivariable changes may follow these steps: create a group of value change requests (i.e. create an object in the Automaton's context); add a change request to the group (i.e. calling a prepare method on each variable to change, passing the group created at step 1); call the send method on the group. In some embodiments, multivariable changes may be atomic.

According to some embodiments, when sending new values for actuable variables in group mode, at the moment of the processing of the value change request, the architecture may select from the group, all the variables that are managed by the same data device (i.e. all the variables that have the same data device stream code) and may send to the related adapter this sub-group of actuations.

According to some embodiments, the adapter 130 may possibly initiate actuations of variables managed by the same source device together. This may be possible depending on the specific adapter implementation and the technology of the source device with which the adapter 130 interacts. For instance, for a Modbus adapter, this may not be possible since Modbus does not have the concept of a transaction, whilst DB adapter could possibly implement a transaction policy since DBs do implement the concept of transactions.

According to some embodiments, transition snapshots may comprise snapshots taken during the execution of transitions including at the end of condition evaluation, and/or at the end of action execution. Transition snapshots may be useful to have a view of past intermediate states. Transition snapshots may be an immutable representation of all the pairs <key, value> that were present in the storage at the moment the snapshot was taken, sometimes called Automaton's storage, the current state at the moment the snapshot was taken, sometimes called state, and the previous state at the moment the snapshot was taken, sometimes called prevState. Transition snapshots may be accessible through specific methods exposed by the Automaton's context. In some embodiments, these methods may be accessible from the action definition code, which may give access to the transition snapshot taken at the end of the condition evaluation of the same transition, sometimes called trigger, or may be accessible from the condition evaluation code, which may give access to the transition snapshot taken at the end of the action execution of the previous transition, sometimes called old. In some embodiments, the architecture may implement a transition that allows retroactive reconstruction of past states and past storage contents.

User Interface

In some embodiments, the architecture comprises an admin user interface (UI) that may allow configuration of any and all components (e.g. field and/or cloud assets) and entities (e.g. scopes, roles, users, variables, Avatars, Automatons, peers, library smart bricks, Sharelets) present in the architecture. The admin UI may comprise a web-based UI and may offer: CRUD (Create, Read, Update, Delete) capabilities for each entity; and/or a complete development environment for computed variables 114 and Automatons 110, with code syntax coloring and auto-complete features, accelerators, monitoring/debugging tools. These capabilities may be offered in a visual, zero-code, or low-code, approach.

In some embodiments the system may offer a full-stack development environment, and/or an architecture custom web application, by composing UI widgets. The tools offered by the architecture for custom web applications may include a board composer, a web application that may allow system integrators to visually design frontends by composing UI widgets (i.e. UI bricks). The artifacts realized with the board composer may be saved in an architecture board DB. The tools offered by the architecture for custom web application may also include a board player, a web application able to read data from the architecture board DB to dynamically build, at run-time, each custom web application realized with the architecture board composer. Tools may also enable the creation of non-web based interfaces in some embodiments.

In some embodiments, UI widgets, also known as UI bricks, may be available in the form of standard widgets, and/or custom widgets. Custom widgets can be implemented as standard web components, for example, as defined by the HTML5 standard definition, and be wrapped inside boards to realize new architecture UI bricks. Custom widgets can possibly implement project/technology specific business logic and data models and at the same time may involve standard widgets to interact with architecture entities.

In some embodiments, the architecture uses widespread composability as a key to realize even complex custom web applications with relatively little user input, obtaining turn-key solutions that may be natively compatible with other architecture implementations. The architecture may employ any/all of the following features: a drag and drop visual composer, a publish/subscribe design-pattern based communication system among GUI widgets, OAuth2.0 authentication/authorization, web/mobile responsiveness, forms, dashboards, a Docker based deployment model, and/or skins.

In some embodiments the board composer can be used to create UIs strictly bound to Avatars 115 and Avatar types in the form of skins. A skin may be a board that may be associated with one Avatar 115 or Avatar type, in order to realize one or more UIs specialized to visually interact with them, with the possibility to visualize updated values of associated variables, Automatons 110, attachments 670 and/or tags 660 and to set new values of writable variables or actuations. The board composer can be used to create skins. In some embodiments one difference between a general-purpose board and a skin may be that a skin may refer to a single Avatar 115 while a general-purpose board can interact with more than one Avatar 115.

In some embodiments, when using the architecture board composer to create a skin, UI developers may first set a referencing Avatar 115 to associate with the skin. The skin may be saved and associated with an Avatar type, making the skin one of the default skins that may be inherited by all the Avatars of that type, or an Avatar 115, making the skin available as one of many skins that can be associated with that Avatar 115. Skins associated with an Avatar 115 or to an Avatar type can be freely used by the owner of the library containing that entity to create boards involving the associated Avatars 115, modify (i.e. copy, extend, customize) that skin, share that skin together with an Avatar 115, an Avatar type, or a deployable Sharelet, after potentially defining an mContract.

Document Sealer

According to some embodiments, a document may represent any kind of file, including for instance a word document, pdf, video, picture, log file, or any other file. A statement may represent a digital representation of a statement, in some embodiments represented as <owner> affirms <declarations> about <document>. The statement hash may be saved in the Note field of a Blockchain transaction. In some embodiments, a seal represents an attestation that a statement has been saved in a list of Blockchains. The architecture may use a seal as a kind of receipt that can be used to verify/prove that a statement has been recorded in a list of Blockchains. In some embodiments, an object hash represent a standard hash of an object. An object may be the same as a blob, or document, but may be used in bundles. Objects may be used by the system to save on a list of Blockchains the proof of existence of an object. In some embodiments, object hashes are not directly used as blobs inside statements. In some embodiments, an object hash bundle represents a group of object hashes that may be used as a Blob inside statements that are indeed saved in a list of Blockchains.

Figure 12A:
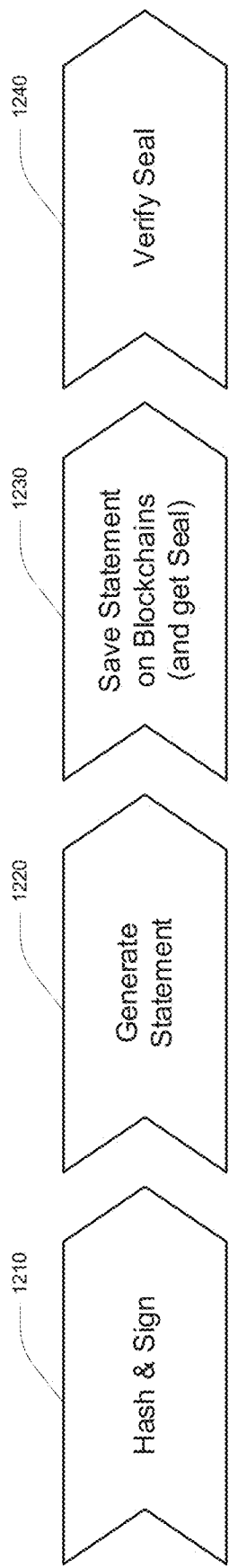
FIG. 12A illustrates an example flowchart for a document sealing process in IoT integrated automation and control architectures according to some embodiments herein.

FIG. 12A illustrates features of document sealing according to some embodiments. The first step may be to hash and sign 1210. This step may include computing a blob standard hash and/or computing a digital signature of a blobhash plus declarations. The next step may be to generate statement 1220. At this step the system may compose a statement, which may be JSON or some other suitable format. The next step may be to save statement on Blockchain 1230. This step may include verifying the statement, computing a statement hash, register the statement hash on one or more Blockchains that may be listed within the system or within an alternate off-chain option, and/or composing a seal, which may be JSON or some other suitable format. The next step may be to verify the seal 1240. This step may include checking if transactions listed inside the seal have been registered and/or composing a response, which may be in JSON or some other suitable format.

Figure 12B:
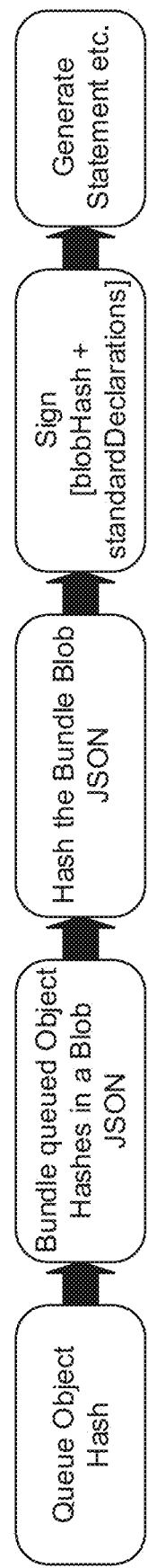
FIG. 12B illustrates an example flowchart for document processing method in IoT integrated automation and control architectures according to some embodiments herein.

FIG. 12B illustrates features of document processing according to some embodiments. Document processing may include any/all of the following steps, not necessarily performed in the listed order. The system queues an object hash, bundles queued object hashes in a blob (in JSON or some other format), hashes a bundle blob (in JSON or some other format), signs a set of blobhashes potentially with standard declarations, and/or generates a statement or some other record of the system's actions.

According to some embodiments, a hash and sign service may be released in multiple forms. One form may be as a command line tool to be used by the owner. When this tool is used, the owner has a Blockchain wallet private key that stays on the owner domain, without being shared with the system. The owner may use this command line tool to sign the document and declarations using their private key. When the command line tool is used, the document file may not be sent to the system, but its standard hash may be calculated together with the digital signature of the composition of the blob standard hash plus the declarations. A second form of hash and sign service may be an online service hosted and served by an architecture peer. In this case the owner uses an account on the architecture peer and their private key may be stored on the architecture peer, potentially in a database. When the online service is accessed, the document file, sometimes called a blob, must be uploaded to the architecture peer and stored for future retrieval.

Figure 13A:
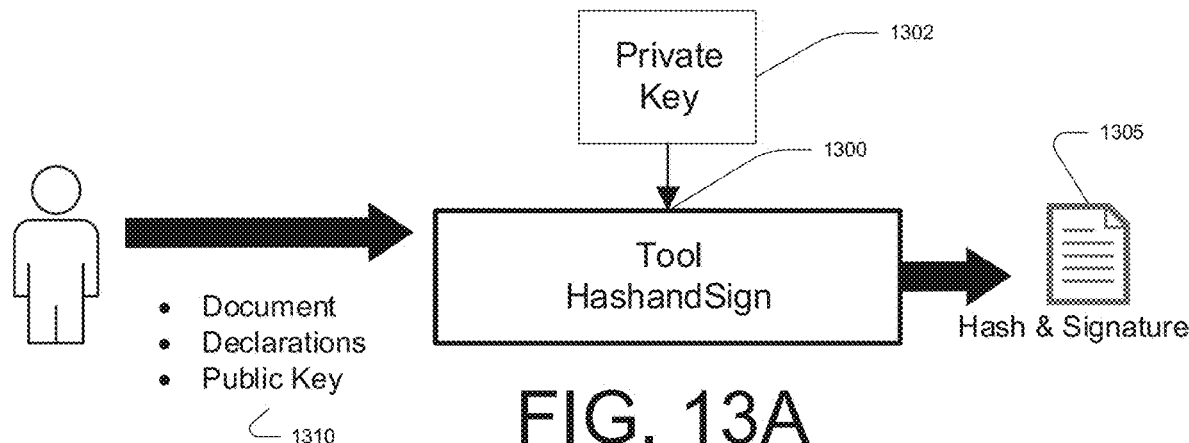
FIG. 13A illustrates an example flowchart for a document sealer creating a hash and signature for IoT integrated automation and control architectures according to some embodiments herein.

FIG. 13A illustrates features of the document sealer creating a hash and signature according to some embodiments. The architecture 100 may have a tool 1300 that may create a hash and signature 1305. The tool 1300 may use elements 1310 which may comprise one or more documents, declarations, and/or a public key. The tool 1300 may also incorporate a private key 1302.

According to some embodiments, a hash and signature file may contain: a blob hash (hash SHA-256 of the blob); text, which may be called declarations; a digital signature of the blobhash+declarations (signed with user's private key); and/or the owner's public key. In some embodiments the hash and signature file may be a JSON file.

Figure 13B:
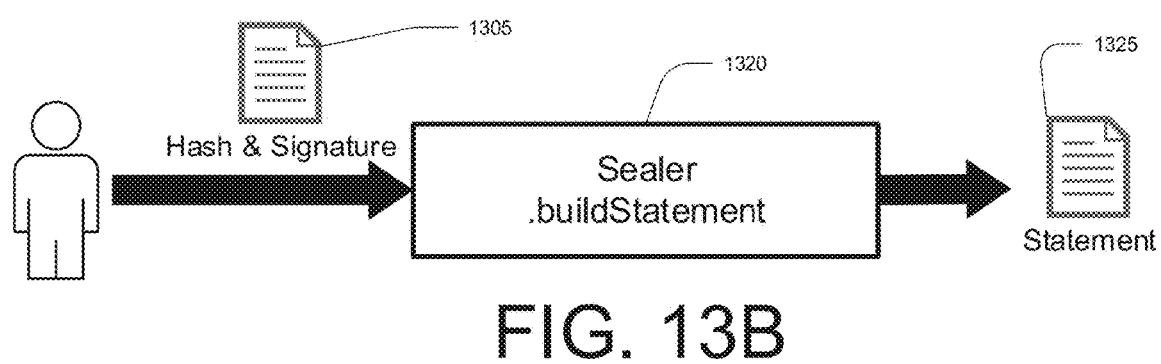
FIG. 13B illustrates an example flowchart of a statement creation process according to some embodiments herein.

FIG. 13B illustrates features of the document sealer creating a statement according to some embodiments. The architecture 100 may have a tool 1320 that builds a statement 1325 using a hash and signature 1305. The hash and signature 1305 may include one or more of references, contacts, and/or blobs. Also, the hash and signature 1305 used by the tool 1320 may be a hash and signature 1305 previously created by the tool 1300, or from some other source.

According to some embodiments, a statement file may define: who is building the statement, who may be called the owner and who may have a public key/address; what are the declarations about the document, such as for example "The document is the log file of system X for day ddmmyyyy"; the standard hash SHA-256 of the blob, sometimes called the blobhash; a digital signature of the blobhash+declarations, the collection signed with user's private key; one or more references to retrieve blob and related statements; and/or owner contact information. According to some embodiments, references may be composed by: a source locator, such as a URL or a DB connection string; authentication information; and/or a query to retrieve the resource if required. In some embodiments the statement file may be a JSON file.

Figure 13C:
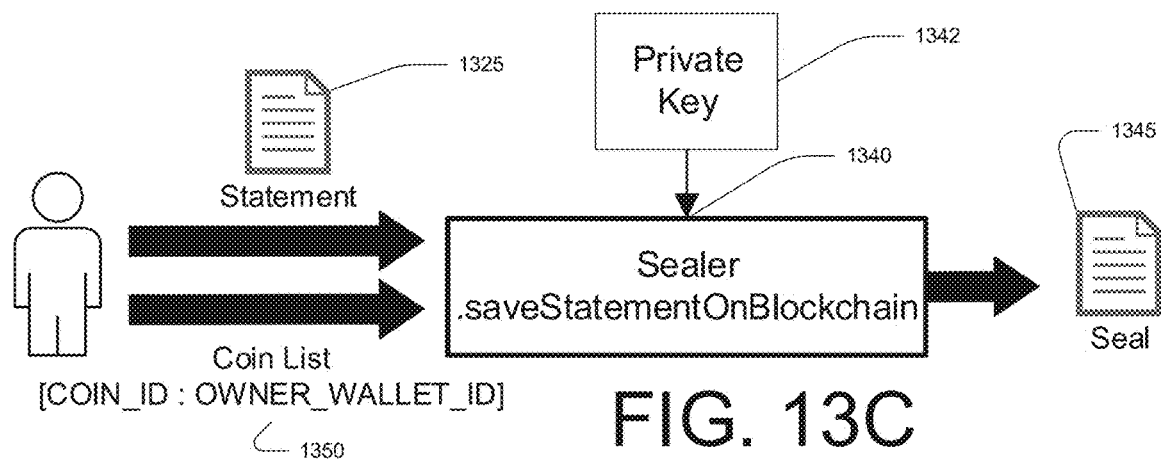
FIG. 13C illustrates an example flowchart of a seal creation process according to some embodiments herein.

FIG. 13C illustrates features of the document sealer creating a seal according to some embodiments. The architecture may have a tool 1340 that creates a seal 1345 using a statement 1325, which may be a statement 1325 previously created by the system 1320, or from some other source. In addition to a statement 1325, the tool 1340 may use a coin list 1350 which may include an identifier to use with the Blockchain destination. The tool 1340 may also incorporate a private key 1342. The private key 1342 may relate to the address in the coin list 1350 or to a Blockchain destination.

According to some embodiments, a seal file may contain: the statement file; the standard hash (for instance SHA-256) of the statement, potentially contained in the note field of the transactions; the architecture peer address used as "recipient" of the transaction; and/or for a multi Blockchain approach, for each coin, the coin ID/reference, owner address to be used as the "sender" of the transaction, and/or TxHashs of the transaction recording request made on the specific Blockchain. In some embodiments the seal file may be a JSON file.

Figure 13D:
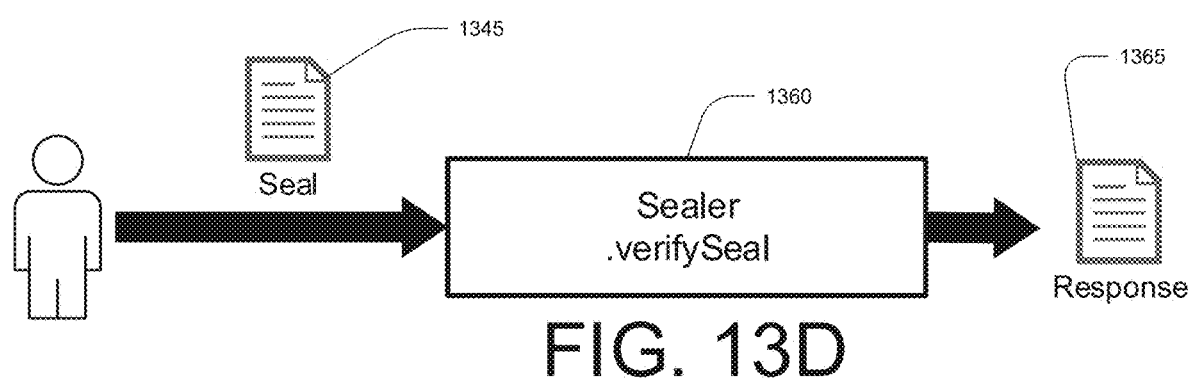
FIG. 13D illustrates an example flowchart of a seal verification process according to some embodiments herein.

FIG. 13D illustrates features of the document sealer creating a response according to some embodiments. The architecture 100 may have a tool 1360 that creates a response 1365 using a seal 1345, which may be a seal 1345 previously created by the tool 1340, or from some other source.

According to some embodiments, the architecture 100 may provide a document sealer functionality. The content of the sealer, sometimes called a blob, can be anything, including for instance a word doc, pdf, video, picture, log file, or something else. A statement may represent a digital representation of a statement, such as <owner> affirms <declarations> about <blob>. A standard hash may be saved in the note field of a Blockchain transaction.

According to some embodiments, a seal 1345 may represent an attestation that a statement has been saved, or in some cases asked to be saved, in a list of Blockchains. A seal 1345 may be considered a kind of receipt that can be used to verify/prove that a statement 1325 has been recorded in a list of Blockchains. An object hash may represent a standard hash of an object, which may be similar in concept to a blob, but used in bundles. An object hash may be used to ask the architecture to save on a list of Blockchains the proof of existence of an object. Generally, object hashes are not directly used as blobs inside statements, but they may be. An object hash bundle may represent a group of object hashes used as a blob inside statements 1325 that may be saved in a list of Blockchains.

According to some embodiments, the architecture functionality offered by the document sealer may be available inside and outside a architecture enabled peer in the form of: a RESTful API, and/or a live brick exposing the same APIs. Potentially every architecture peer can expose the document sealer capability and that can be offered to other peers against payment or any other policy agreed between document sealer host (i.e. the architecture peer that exposes the service) and document sealer client (the architecture peer requesting the service). A fee specified inside a system contract may define the service usage costs for single documents and/or bundles of documents. Architecture peers can avoid the cost of maintaining an active document sealer host by subscribing the service exposed by external providers of system services.

According to some embodiments, a response 1365 may contain for each coin appearing in the seal in a multi Blockchain approach: the coin ID/reference; a status, which can be: not found; waiting; registered; or some other status.

According to some embodiments, the architecture 100 may provide custom web applications implemented by composing UI widgets into boards. System boards may be the composition of architecture UI widgets. System UI widgets may be widgets that can be visually composed inside boards. The architecture UI widgets can expose, or not, a user Interface. An architecture UI widget may be defined as: its user interface, if any; a set of properties defining a UI widget's graphical aspects and behaviors; a set of inputs defining what data must be get from other UI widgets; and/or a set of outputs defining what data can be sent to other UI widgets.

In some embodiments a mechanism based on a publisher/subscriber design pattern may let data flow from one UI widget to another in terms of inputs and outputs. When a UI widget's output changes, linked UI widgets that have that output connected as an input may be notified to update the input value with the output new value. With this methodology the architecture can compose UI widgets, and the board architecture can keep UI widgets synchronized, without worrying about underlying complexities.

According to some embodiments, each triple (user U, role R, scope S) can have an associated board, potentially called a landing board, which may define which board the board player may propose to user U when she/he logs-in with role R for scope S. A board can possibly have a menu allowing the logged-in user to directly or indirectly access all the parts of the custom web application.

According to some embodiments, the architecture can digitalize, processes, analyze, and/or optimize all connected components. The digitalization may be executed using a brick concept: small digital pieces can be dynamically connected in a "brick chain". The architecture may create decentralized applications to support the "decentralized autonomous organization." HyPeer Connectivity makes sharing data and services built in to the architecture without requiring additional integration projects.

According to some embodiments, the architecture may connect bricks belonging to different organizations bridging multiple business ecosystems. When using the Blockchain, the architecture enables intercompany connectivity in a secure way, without the need of a centralized trust authority. No third party intermediation may be needed. The Blockchain itself automatically applies smart contract service definitions potentially defined within the architecture.

According to some embodiments, the architecture can integrate and manage any aspects of the ecosystem. The architecture's aspects may include any/all of data stream processing, industrial standards, machine learning, predictive maintenance, augmented reality, conversational interfaces, etc. The architecture may integrate different technologies without necessitating low level development. The architecture may do any/all of the following: adapt old systems to work in an IoT world while maintaining the original underlying technologies; process data streams in a scalable way with tools to facilitate and ease management; quickly implement new solutions; work in multiple deployment models, including on-premises, vendor cloud, and/or local high and take advantage of native industrial protocols and standards where available; allow data acquisition and telemetry in spite of potentially scarce data processing capabilities and no simple way to connect systems; provide simple customization/management tools accessible to the final customer who may autonomously change and evolve their own systems; work either "all in the field" or "all in the cloud" or anywhere in between; allow peer installations to communicate with each other; and/or simplify contract terms and contractual implementation of agreements that may be electronically standardized.

According to some implementations, the architecture may employ a Blockchain connected ecosystem of technologies. The architecture may pre-integrate technologies and/or provide a turn-key product to potentially reduce time and risks. Deployment may be on-premises or on public/private/hybrid cloud potentially using native industrial protocols, standards, hardware, sensors, etc. The architecture may seamlessly add capabilities and integrate 3rd party systems with API based or message based integration. By integrating smart contracts and Blockchain, the architecture may let service/goods contracts terms be unambiguously electronically defined and applied.

According to some embodiments, the architecture may provide a complete user friendly GUI to manage the architecture, including assets, inventory, and or monitoring and customize the architecture. The architecture and/or the user interface may allow final customers to change and evolve their own system autonomously.

According to some embodiments, the architecture may contain any/all of the following or other components in any combination: fog nodes, edge nodes, conversational interfaces, augmented assistance, document repositories, edge deployment, on premises deployment, cloud deployment, integrated security, intelligent audio analysis, machine learning, predictive maintenance, codeless mobile UI development, workflow management, 3rd party API integration, monitoring and alerting, codeless dashboarding, remote configuration, rule management, device management, Blockchain integration, epower, and/or other technologies.

According to some embodiments the architecture may implement any/all of the following features: real-time ingestion, augmentation and/or exposition that may ingest raw data coming from any number of hardware/software sources, augment them with real-time computed variables 114 and/or computed logical internal states and expose them for dashboarding and custom user interfaces; complex rules execution to apply declarative rules and AI algorithms to automate tasks and processes, such as transforming manual procedures into automatic following specific workflows, and to discover hidden or unknown behaviors, states and/or risks; real-time data fusion allowing integration and/or fusing of data coming from and going to internal and external system potentially utilizing a modern, real-time, stream processing based approach; a brick architecture allowing flexible initial implementation and allowing extended functionalities and application perimeters by adding new bricks to the architecture; abstraction layers to allow obscuring unnecessary technical details, including connectivity, signals, protocols, firewalls etc., and allowing the architecture to model entities, behaviors, and/or agreements; a fog computing model allowing a centrally configured cluster distributed on the edge side to autonomously implement local computation, even when no connection is available with the rest of the cluster; scalability and high availability to allow adding new nodes and realizing a high availability cluster of machines; Blockchain records to identify entities and/or records inside the Blockchain (with a multi-Blockchain approach) any document (e.g. PDF, MS-Word, logs, images, videos, etc.) and any interaction between peers.

According to some embodiments, the architecture employs a brick-based open architecture that may be extended with new bricks, and allows the architecture to extend the base capabilities of the architecture to customized needs. The architecture may on demand add or substitute bricks to upgrade capabilities. Different brick types are used to extend the architecture capabilities to connect, reason and actuate and realize tailored user interfaces. Peripheral bricks allow extending the architecture sensing and actuating capabilities by embedding 3rd party hardware/software system interfaces into pre-finished adapter bricks. The architecture may be agnostic to protocol the language of the underlying components.

According to some embodiments, the architecture may connect to old technologies to incorporate them into a modern integrated architecture. Plug-in bricks may allow the architecture to extend Automatons reason and action capabilities to interact with the internal and the external world enhancing interaction with 3rd party systems including actions invoke=able during Automaton transitions. The architecture may interact with 3rd party systems by embedding their interfaces (i.e. APIs, SDK, web services) inside plug-in bricks, making external resources integrated capabilities of the architecture. The architecture may implement and/or execute new AI algorithms, such as for predictive and prescriptive maintenance, pattern recognition, image, audio and/or text processing, etc. UI bricks may extend the architecture's UI composition capabilities with new UI bricks directly connected to internal entities, including for instance Avatars, variables and Automatons, or to external 3rd party systems. The architecture may implement tailored UIs to address customers' needs to realize custom Dashboards and UIs by composing native widgets with new UI bricks. The architecture may use external technologies as if they were integral parts and give users a unified user experience.

According to some embodiments, the architecture may share parts of the architecture with other systems. Shared components may include devices, hardware, software, data, and/or functionalities in the form of Sharelets 105 (i.e. sharable elements) with configurable policies and permissions.

Sharelets 105 may be used in multiple ways according to various possible embodiments.

Avatar Sharelets may allow sharing with business partners in order to expose views and controls of specific devices and machines. Such sharing may allow new business models with payment by usage of a device/machine (e.g. HVAC, motors, fillers etc.) that is installed on site but is still owned by the device/machine supplier. Avatar Sharelets may allow the supplier remote visibility over the device/machine installed and hosted on the system, perform maintenance, remotely manage, and/or to provide improved service.

Brick Sharelets may expose functionalities implemented by the architecture to a peer to generate revenue. Shareables 105 may allow sales of services hosted on the architecture to a peer installation. Composing internal and external brick functionalities may allow the architecture to realize "super-bricks" with enhanced functionality.

Workflow Sharelets may allow sharing parts of a process, such as a supply chain, production line, etc., with peers to offer visibility over internal processes. For example such sharing may allow extending the concept of a "tracking number" from shipping to all other business sectors. The architecture may transform inter-peer workflow steps from manual to automatic, by applying pre-defined automation rules that are pre-agreed by all actors and that automatically manage workflow state transitions.

UI Sharelets may share UI widgets that peers can integrate inside user Interfaces to embed elements exposed by the architecture. The architecture may employ touch panel applications to provide on-board production line custom UIs to ease line operators' tasks. Other custom UIs may integrate several hardware/software systems offering a unified user interface exposing data specific to any component plus brand-new data generated in real-time by the system.

Some embodiments may create an open and agnostic connective tissue to link and orchestrate autonomic digital organisms and let them share data, processes and knowledge. Agnostic refers to not being bound to any specific vendor, technology, protocol, or computer language. Autonomic orchestration can involve entities or companies, potentially involving a combination of people, machines, data, and/or processes According to some embodiments, the architecture may by a cluster of nodes that grants: high availability, load balancing, and/or scalability. Self-healing capabilities may ensure that if a service inside a node (or the whole node itself) stops working, its work is automatically moved to another node able to do that work. When possible, the service, or the whole node itself, may be reset and potentially automatically re-join the cluster.

According to some embodiments, architecture peer capabilities can be extended by: using declarative rules, such as when domain knowledge is directly modelable; using AI algorithms, such as when knowledge is discovered by machine learning; using capabilities shared by other peers; and/or adding new bricks. The architecture may also peers to communicates with each other and also with external systems to cooperate and participate to inter-peer processes like supply chain activities.

According to some embodiments, the architecture may employ multiple elements including the following examples. Assets may include data source devices, sensors, remote I/OS, PLCS, HW/SW legacy systems, Fog Nodes, edge nodes, IoT gateways, network appliances, cabinets, boxes, and/or other assets.

Variables may include input (e.g. sensor values), output (e.g. Actuations), field variables 117 (including source device FOS through data adapters 130), and/or computed variables 114 potentially computed from field variables 117. Avatars may be digital twins automatically updated by the architecture to potentially represent real field entities and derived, logical entities like machines, systems/sub-systems, production lines etc. Automatons may be considered as finite state machines defined by their states, transitions and actions and which can model logical internal states, workflows, simple rules, complex rules, API orchestration, workflows, etc. scopes may map entities on a geographical, organizational, logical base and/or assign users specific roles on scopes, and/or share and limit paradigm based on scopes. Tags 660 may enable zero-code 3rd party system integration that may define elements with tags 660 such as name, type and value to a group and valorize properties. Attachments 670 may be extendable files, such as documents, videos, text files, etc., and/or URLs. Such attachments may be useful to document, assist or integrate in working processes. A library may be a set of ready-to-use definitions of source devices, automatons and computed variables 114. Every definition can be documented with links.

According to some embodiments, adapter bricks may hide field/systems I/O communication complexities and/or connect sensors, machines, HW/SW systems, etc. Functional bricks may: be triggered by Automaton state transitions; do field actuations, notifications, 3rd parties APIs calls, logs, etc.; activate other Automatons; wrap external systems capabilities; enable easy development of custom semi-finished bricks.

According to some embodiments, UI bricks may: represent internal entity skins (UI); wrap external systems UIs; enable easy development of custom bricks through semi-finished wrapping UI bricks. Sharelets 105 may: wrap Avatars and available bricks; be shared among peers; use Blockchain to grant authorization; be related to HyPeer-connectivity.

According to some embodiments, the architecture may employ one or more tools. Participants, including users, devices and systems, may be identified based on Blockchain wallet ID, and/or standard authentication technologies available (including Oauth 2.0, OpenID, LDAP, AD, etc.). Peer contracts may include agreements among participant potentially defined by system contracts, including mContracts, which can be recorded on Blockchains. A document sealer may records any document (MSWord, PDF, logs, video, audio, image, etc.) on multiple Blockchains. Asymmetric keys may be used for author recognition with the possibility to record single or bundles of documents. Dashboarding and app composer capabilities may allow dashboarding, including possibly using Grafana. An architecture UI designer/App builder may allow composition of UI bricks. Custom code may be added as needed. Dev Tools may be a set of tools to accelerate bulk input of source devices, variables etc. Monitoring and debugging tools may enable development and/or alteration of computed variables 114 and Automaton 110 logic. Remote configuration may allow remote configuration for native managed assets and/or zero-development addition of unknown assets configuration, which may be employed for instance for Peripheral bricks.

According to some embodiments the architecture may connect to any or all of the following: legacy systems, such as IVIES, SCADA, etc., via standard interfaces such as Modbus, OPC, etc.; legacy systems via custom adapters developed ad-hoc for the target system; new sensors; external data streaming internal and/or external data flows.

Some embodiments may abstract from field physical complexities. This so called first level of abstraction may include: creation of users and scopes, such as plants, departments, production lines, etc.; defining user roles on scopes; configuring field variables 117 for each source device and put them in scopes.

Some embodiments may abstract from data source complexities and represent the domain entities. This so called second level of abstraction may include: creating Avatars and putting them in scopes; associating variables to Avatars; creating mashed-up Avatars, Automations, and/or dashboards.

Some embodiments abstract from implementing complexities, augment data and do automations. This so called third level of abstraction may include: creating computed variables 114 from field variables 117, eventually interacting with 3rd party systems; creating Automatons which may include triggering conditions and consequent actions, and eventually interacting with 3rd party systems.

Some embodiments may define what and how components give and/or get from the external world. This so called fourth level of abstraction may include: defining Shareables 105 (i.e. what Avatars, Automatons/processes, functional bricks to share); defining smart contract templates for each shareable; adding new capabilities as needed by signing smart contracts with other shareable providers; connecting with other plants or partners systems signing smart contracts; composing functional bricks to create new macro-functionalities; creating inter and intra system workflows.

In some embodiments, actions can be: replying to questions ("This is my last hour report"); calling to notify about something ("my bearing is going to break"); doing field actuations (lower the production speed); interacting with other Avatars (raise the rotation speed); interacting with 3rd party systems (save this record on SAP); playing a part on a workflow (warn and wait for action, then escalate to supervisor); or some other action.

According to some embodiments, an Avatar 115 may: sense something new (motor vibration is rising); respond to human interactions (tapping on a mobile app button); respond to third party system interactions (message sent, API called); respond to inter-Avatar pattern recognition; or any other stimulus.

According to some embodiments, Automatons can interact with internal and external entities. Automaton's transitions may be triggered by changes of Avatar variables values, but may also, or alternatively, involve evaluation of other Automatons and external variables. When going from one state to another, an Automaton 110 can execute internal and external actions, including for instance a call to 3rd party web services and/or inserts and/or upserts on external databases.

In some embodiments, layers of abstraction may simplify the organization and management of components in a system. This may allow focusing on the right point of view to address a problems. The first level of abstraction ignores details regarding wiring, electric signals, networking, and protocols, allowing users of the architecture 100 to focus on field variables 117 and source devices. The second level of abstraction allows ignoring where sensors/actuators are connected (i.e. source devices), shifting the focus to logical entities and their I/O variables. The third level of abstraction allows ignoring how actions need to be executed and focuses on more abstract rules, processes, and Automatons 110. The fourth level of abstraction allows ignoring integration, authentication, authorization and paper (i.e. contracts, invoice etc.), to shift the focus to exchanged services and business.

In some embodiments, GUI activities take place in a user interface in contrast to field activities which may occur closer to the devices and people being managed.

In some embodiments, field activities may include any or all of the following. A field activities may be to install and configure data adapters 130 to connect new and legacy data (even from SWs, DBs, etc.) as stream or event based I/O variables. These data adapters 130 convert field data into "field variables" 117 and are related to the first level of abstraction. A field activities may be to install and configure the IoT GW to connect to the field LAN. The IoT gateway may be hosts for software data adapters 130. A field activity may be to install new sensors and actuators, for instance smart sensors or wired DAQ/PLC. These installations may relate to data acquisition or actuators (DAQ/PLC).

In some embodiments, GUI activities may involve any or all of the following. The GUI may configure users. The users and their scopes may define the organizational hierarchy. The GUI may be used to configure hierarchical scopes to represent the organization (its geography, business units, etc.). The GUI may also associate users to scopes and configure source devices and all related field variables. The source devices may declare field variables inside the architecture. The GUI may define Avatars 115 as logical representations of field reality (parts, machines, systems, subsystems, etc.) and associate field variables 117 to Avatars 115. These Avatars 115 may define "digital twins" that may represent systems in a computed definition. This level may relate to the second level of abstraction. The GUI may define computed variables 114 and their formulas and associate computed variables 114 to Avatars 115. Computed variables are associated with Avatars 115. The GUI may define finite state machines in terms of states, transitions and actions to be executed during transitions. These may relate to Automatons 110 and actions. These elements may relate to the third level of abstraction. The GUI may define smart contracts among architecture peers to exchange Sharelets 105. This may relate to HyPeer connectivity and may relate to the fourth level of abstraction.

EXAMPLES

Figure 14:
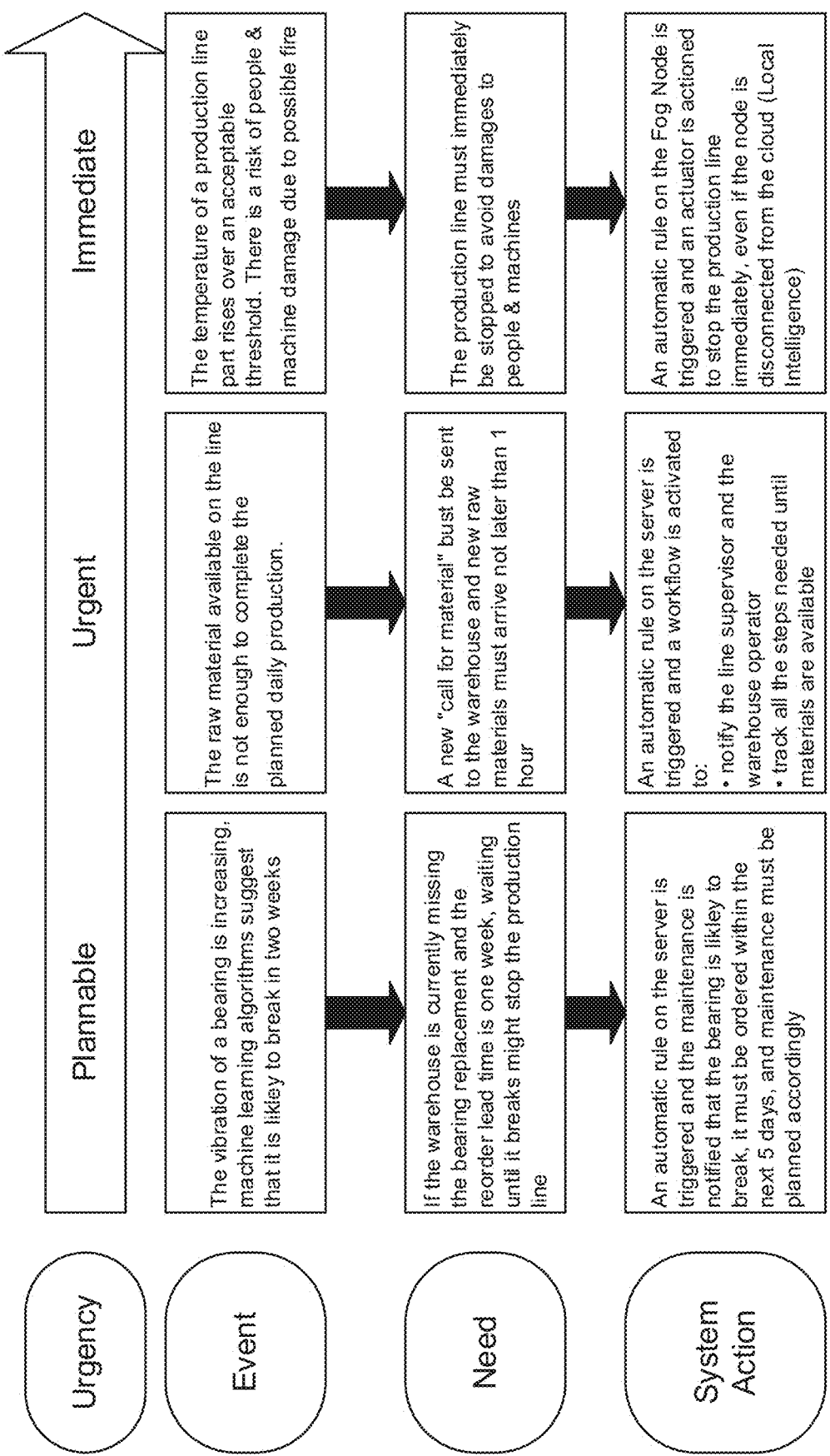
FIG. 14 illustrates example functionality flows of example IoT integrated automation and control architectures according to some embodiments herein.

FIG. 14 illustrates example data collection, analysis, and action functionality flows for IoT integrated automation and control architectures according to some embodiments herein. In some embodiments, the architectures may collect data from architecture components, assess urgency, identify an event, determine a need, and calculate an architecture action. The following examples are representative in nature.

As an example of a plannable situation, the vibration of a bearing on a factory floor may be determined to be increasing based on data received from one or more sensors coupled to the bearing. In some embodiments, machine learning (ML) or other algorithms of a control server may be used to determine that the bearing will break in two weeks. In some embodiments, the control server may also be connected to warehouse systems, such that the availability of bearing replacements and associated warehouse data can be retrieved within the architecture. For example, if, based on warehouse data, no bearing replacement inventory is available and a reorder lead time is determined to be one week, the architecture may determine an action to be taken to avoid production stoppage and/or delay. For example, as a system action, an automatic rule on the server may be defined and triggered such that a maintenance team is electronically notified that the bearing will break, that a new bearing must be ordered within the next five days, and maintenance must be planned accordingly. Thus, the architecture may be configured to complete prediction and planning mechanisms.

As an example of an urgent situation, an amount of raw material may be measured by one or more sensors of a production line. In some embodiments, based on a defined system rule, the architecture may determine that the amount of raw material available on the line is not enough to complete the planned daily production. In some embodiments, based on a defined rule governing the situation in which the architecture determines a deficiency of raw material, a system call may be transmitted to the warehouse to communicate that new raw materials must arrive at the production line within a specified period of time to avoid production stoppages or delays. Additionally, in some embodiments, as a system action, an automatic rule on a server of the architecture may be defined and triggered and a workflow may be activated to electronically notify a line supervisor and a warehouse operator, as well monitor and control all the intervening steps until additional raw materials are made available.

As an example of an immediate situation, the temperature of a production line part may be monitored by a temperature system. In some embodiments, the temperature may rise over an acceptable threshold based on a pre-defined rule of the architecture. For example, at a certain temperature, there may be a risk for workers and machinery damage due to possible fire. In some embodiments, the architecture may determine, based on a predefined rule, that the production line must immediately be stopped to avoid damage as a result of the temperature rise. Furthermore, as a system action, an automatic rule on a Fog Node may be triggered and an actuator may be activated to stop the production line immediately, even if the node is disconnected from the cloud. In some embodiments, this action may require local intelligence that may complete even when disconnected from central server control.

Figure 15:
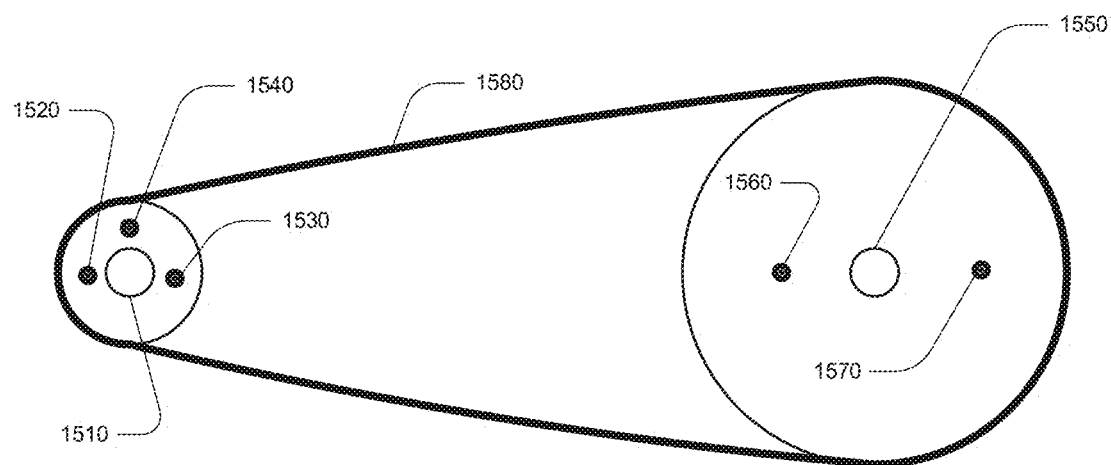
FIG. 15 illustrates an example integrated device forming part of IoT integrated automation and control architectures according to some embodiments herein.

According to some embodiments, a fan and its associated motor could be an example of a system modeled by Avatars 115 and Automatons 110 and managed by the architecture 100. FIG. 15 illustrates an example system of a motor modeled in the architecture 100 according to some embodiments. A motor 1510 and a fan 1550 may be connected by a pulley 1580. Sensors connected to the motor 1530 may include an RPM sensor 1520, a vibration sensor 1530, and a current meter 1540. The fan 1550 may have sensors including an RPM sensor 1560 and a vibration sensor 1570. The example system could be described in terms of field data ingestion, variables, Avatars 115, Automatons 110, and connections.

Field data ingestion could take place at the field side. Motor sensors could record RPM 1520, Vibration 1530, Current 1540, and Tension 1580 in the pulley. Fan sensors could record RPM 1560 and vibration 1570. For data acquisition: all sensors could be wired to a DAQ; the DAQ could be read/write by a field adapter; the field adapter could be running inside an IoT Gateway.

Variables may comprise field variables 117 and/or computed variables 114. Field variables could include Motor_RPM, Motor_Vibrations, Motor_Current, Motor_Tension, Fan_RPM, and/or Fan_Vibrations. Variable values could be analogs of the corresponding sensor: Motor_RPM could represent RPM 1520, Motor_Vibrations could represent Vibration 1530, Motor_Current could represent Current 1540, Motor_Tension could represent Tension 1580, Fan_RPM could represent RPM 1560, and Fan_Vibrations could represent vibration 1570. Computed variables could include Belt Efficiency, defined to equal the ratio of Motor_RPM to Fan_RPM, may represent the ratio of motor RPM 1520 to fan RPM 1560.

The Avatar 115 component could comprise an HVAC Avatar, HVAC Avatar computed variables, motor variables, and fan variables. The HVAC system Avatar could be related to a motor Avatar, a fan Avatar, and a belt Avatar. The HVAC computed variables could include System_Health. The motor variables could include Motor_RPM, Motor_Vibrations, Motor_Current, and/or Motor_Tension. Fan variables could include Fan_RPM and/or Fan_Vibrations.

Figure 16:
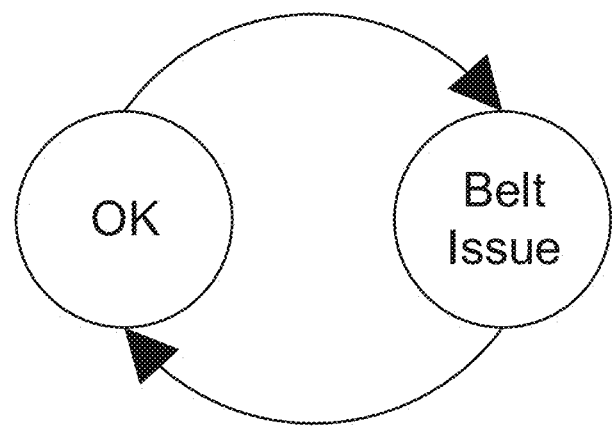
FIG. 16 illustrates example device states and transitions for an integrated device according to some embodiments herein.

An Automaton 110 could be named "belt status." The Automaton 110 could have possible states of "OK" and "Belt Issues." FIG. 16 illustrates the states and the transitions for the motor fan example according to some embodiments. Transitions could be based on the comparison of the Belt Efficiency to an expected ratio. Possible actions could include: send alert—to notify via SMS and/or email; stop and backup—to stop the motor and start a backup HVAC system; send maintenance—to request a maintainer provide service.

To connect, the architecture may employ a smart contract. A partner maintainer may have signed a smart contract that states that a maintenance service is available on demand, with a defined SLA and pricing. According to some embodiments, the architecture may present different layers of abstraction. For example, an architecture might comprise field activities and GUI activities. Field activities could include one or more of the following actions (and their respective components): installing and configuring data adapters 130 to connect to new and/or legacy data, including from software or databases, as stream or event based I/O variables (data adapters 130); installing and configuring the IoT Gateway to connect to the field LAN (IoT Gateways); installing new sensors and/or actuators, including smart sensors and/or components wired to a DAQ/PLC (data acquisition, sensors, and actuators). Installing new sensors and/or actuators on devices and/or machines (devices and machines).

GUI activities could comprise one or more of the following: defining users, for example Admin, Smith; defining scopes, for example Acme EMEA, Acme Italy, Acme Rome, Plant X, and/or Maintenance; defining roles, for example Admin (with scope Acme EMEA), Smith (with a defined scope); defining source devices, such as PLC S7 Xl. Defining field variables 117 relating to source devices, such as MotorRPM, PulleyRPM, and MotorOnOff; defining an Avatar "HVAC System" to include a motor, with variable 1 (MotorRPM) and variable 2 (MotorOnOff), and a pulley, with variable 3 (PullyRPM); defining a computed variable "BeltEfficiency" as the ratio of MotorRPM/PulleyRPM; extending the Avatar "HVAC SYSTEM" to include a belt, with variable 4 (BeltEfficiency); defining an Automaton "BeltStatus" as one of state 0 (OK) or state 1 (BELT ISSUE); As a transition, if BeltEfficiency < > expected THEN "Notify Maintenance" and go to state 1; defining a smart contract from actor A (HVAC user) to actor B (HVAC Maintainer) with a SLA, cost, etc.; share the HVAC Avatar as a Sharelet with specific R/W permissions.

According to some embodiments, the architecture may support base telemetry. The architecture 100 could support real time monitoring of field data, 3rd party systems including DB and REST data sources, and/or dashboarding, according to some embodiments. An example could be production line machine monitoring. Advanced telemetry could include the base telemetry plus computed variables, including for example KPIs or metrics. Examples could be OEE or other KPIs. Automation could include advanced telemetry plus field actuations, real-time data (including sharing and/or exporting), and/or complex automatons/rules. An example could be production line automation. Predictive/prescriptive maintenance could include advanced telemetry plus machine learning and/or automation.

Figure 17:
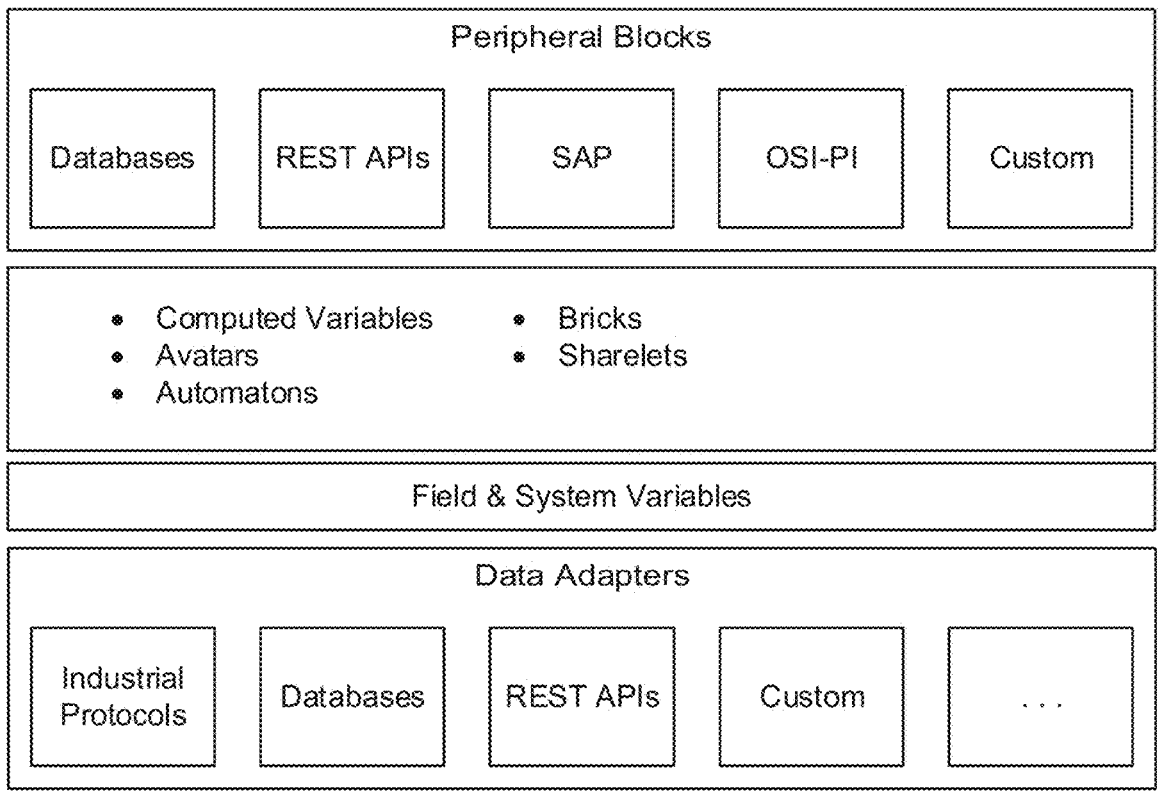
FIG. 17 illustrates example integration features of IoT integrated automation and control architectures according to some embodiments herein.

FIG. 17 illustrates integration features according to some embodiments. Peripheral Blocks may include elements such as: databases, REST APIs, SAP, OSI-PI, or other potentially custom elements. In some embodiments peripheral bricks may run on gateway devices, edge nodes, and/or fog nodes. System elements may include computed variables 114, Avatars 115, Automatons 110, bricks, and/or Sharelets 105. The architecture 100 may also connect to field and/or system variables. Data adapters 130 may allow interaction with external devices and may allow the architecture to "speak" to any of a multitude of external devices. External devices may include, but are not limited to: industrial protocol devices, such as Modbus, S7, OPC, etc.; databases; REST APIs; custom adapters; or other systems.

In some embodiments the architecture 100 includes many native bricks available out-of-the-box. In other embodiments the architecture 100 may interact with custom developed code that may wrap a piece of software, or an entire external system, inside a brick, thereby allowing the architecture to compose solutions with that custom brick and its functionality.

According to some embodiments, an Avatar 115 (and accordingly its variables and Automatons 110), and/or special types of bricks, can potentially be exposed as a Sharelet 105, potentially allowing the sharing of data, functionalities and processes among peers. Such sharing may result in a HyPeer connection. In some embodiments Sharelets 105 are a way to integrate running systems and share data and functionalities with other portions of the same process, which may include supply chain, plants, departments, and/or others.

According to some embodiments, the architecture may integrate many bricks types. In some embodiments, the architecture may contain peripheral bricks. Peripheral bricks, which may be adapters, may extend the input and output peer capabilities. They may also create a stable, always-on connection between the architecture and peripheral entities, including for instance PLCs, DAQs, DBs, devices, sensors, actuators, SWs, HWs. These peripheral bricks may be used to: provide variables values that can trigger Automatons 110 and computed variables 114 updates, and/or accept actuation requests made by Automatons 110 actions.

In some embodiments, the architecture may contain functional bricks, sometimes called plug-ins. Functional bricks may extend the architecture's actionable, learning/reasoning and connecting capabilities. They may also create a way to add new functionalities offered by internal, for instance deployed inside the peer perimeter, and/or external, for instance running somewhere outside the peer perimeter, sub-systems. These functional bricks may be used to: interact with external systems in a non-stable, when-needed, and/or on-demand fashion; and/or add/integrate other system components or 3rd party technologies, such as machine learning, or AI.

In some embodiments, the architecture may contain UI bricks, sometimes called UI widgets. UI bricks may extend the user interface toolbox by adding new elements to the set of available UI widgets. They may also create a way of integrating other system components or 3rd party technologies inside UIs. UI bricks may be used to: mesh functionalities/capabilities inside UIs; integrate within the architecture parts of UIs specific to external technologies; and/or compose UIs tailored on customers, projects, and/or other verticals needs.

In some embodiments there are two ways to release a brick: as a live brick, exposed by the technology owner as a service, for instance in a SaaS model; or as a deployable brick, exposed as a containerized self-consistent component that may be installed and configured for use. Some embodiments include multiple Sharelets 105 types, including those related to Avatars, workflows, and/or live bricks. In some embodiments, Shared Avatars can be used whenever peers need to share: field and computed variables 114 in read mode; Actuable variables in write mode; or internal Automaton statuses.

In some embodiments, Shared workflows can be used whenever peers need to share workflows steps. The overall workflow may be defined by its composing steps, each step belonging to an architecture host.

In some embodiments, shared functions and functional bricks are related to live bricks. Shared functions can be used whenever peers need to share functionalities implemented by a functional brick hosted on an architecture host 120 or on a 3rd party system/technology.

In some embodiments, the sharing host may specify the sharing policies for each Sharelet, for each Sharelet client. Different types of Sharelets 105 may request different sharing policies. Sharelet hosts may define what to share, and how, with Sharelet which clients.

Some embodiments may have general brick sharing policies. In such cases the following might apply: a unique workflow ID could be a code value; a peer ID, potentially defined in a peers list of the Sharelet host, might be the sharing client; the share may have a start time; and/or the share may have an end time.

Some embodiments may have brick sharing policies. In such cases the following might apply: a unique workflow Step ID could be a code value; if the brick can read, the Sharelet client can read the variable current value; if the brick can write the Sharelet client can write the variable current value; if the brick can Actuate the Sharelet client can Actuate the variable; if the brick is pushed the Sharelet host may push values update to the Sharelet client as specified by the "push refresh time" property; a push refresh time may define how often the Sharelet host may push values to the client, with options including that the Sharelet host may send values updates as soon as they are available, or that the Sharelet host may send values at intervals.

Some embodiments may have Automaton 110 sharing policies. In some embodiments: an Automaton 110 may allow a Sharelet client to read the Automaton's 110 current state; an Automaton 110 may allow a Sharelet host to push state updates to a Sharelet client, potentially as specified by a "push refresh time" property; a push refresh time may specify how often the Sharelet host may push states to the client, where the Sharelet host may send state updates as soon as they occur, or the Sharelet host may send state updates at intervals.

Some embodiments may have general Avatar 115 sharing policies. In some embodiments a peer host, potentially defined in a peers list of the Sharelet host, may be a sharing client and may specify a start time and/or an end time of the share.

Some embodiments may have variable sharing policies. In some embodiments there may be a policy a Sharelet client can read and/or a variable's value. There may be a policy that a Sharelet client may Actuate the variable. There may be a policy that a Sharelet host may push values to the Sharelet client, potentially as specified by a "push refresh time" property, which may allow pushing values to the client as soon as they are available, at intervals, or in some other way.

Some embodiments may have Automaton 110 sharing policies. In some embodiments there could be a policy that a Sharelet client can read the Automaton's 110 current state. There could be a policy that a Sharelet host may push a state update to a Sharelet client, potentially as specified by a "push refresh time" property, which may specify how often the Sharelet host may push states to the client, potentially ranging from as soon as updates occur to at intervals, or in some other timeframe.

Some embodiments may have general workflow sharing policies. In some embodiments a Sharelet host may be the sharing client, potentially defining a start time and/or an end time for the share. Some embodiments may have workflow step sharing policies. In some embodiments a Sharelet client can read and/or a variable's value. Some policies may allow Actuation, or pushing of values in the same patter as other policies, or in other ways. Some embodiments may have Automatons sharing policies, in a similar fashion as Automaton 110 or workflow sharing policies.

According to some embodiments, an example could be taken from a factory production line comparing the advantages of having the architecture 100. In an example scenario, factory Z produces items with a production line that has a defective part X supplied by supplier Y. Part X is old and starts to vibrate, suggesting part X may be going to break. Had the architecture been active, a vibration sensor and resulting predictive maintenance could have detected the problem at day 0. However, without the architecture working in this example, the problem may be not initially detected and part X heats up, lowering product quality. Had the architecture been active, a temperature sensor and/or automatic rules may have detected the problem at day 3. As a consequence of the failure to mitigate 50,000 parts are produced with low quality. Such a reduction in quality may result in overall reduced product quality standards. QA tests may detect the issue and as a result may stop production. However, without any integration of systems or management although the issue may be detected by QA tests, further similar problems may not be prevented in any way. Without sensors and rules, only a face-emergency approach may be possible. Without prescriptive, predictive or even preventive maintenance no planning may be possible. Maintenance may eventually place an order for part X and wait for the missing part X to arrive from a warehouse, resulting in production delays. The overall delay until the production line returns to normal operation in this example could be as long as two weeks.

According to some embodiments, the example situation in the previous scenario could have a much different outcome with an active architecture to mitigate it. Part X may be old and starts to vibrate, suggesting part X may be going to break. A vibration sensor and predictive maintenance in the architecture 100 may detect the problem at day 0 and send an alert to maintenance. Maintenance may learn automatically that part X must be replaced, but discovers the part is missing from the warehouse. Integrated procurement provided by the architecture connects with supplier Y and speeds up the overall time from 3 to 2 days. When part X arrives the production line must be stopped for maintenance to substitutes it, however the additional planning and lead time may have allowed production to be moved to another line. The architecture 100 could reduce the lost parts to as low as zero and potentially save may days of unplanned down time.

According to some embodiments, architecture bricks can be arbitrarily composed inside an architecture host 120 whenever they are composable. The architecture 100 can check for composability in at least two ways: by looking for technology owners' explicit composability declaration with other bricks; and/or by automatically checking their services requests and/or responses compatibility inside their brick definition. According to some embodiments, a basic example could be that if functional brick A has an output of service X as an integer and functional brick B request input as an Integer the two services could be composable.

Figure 18:
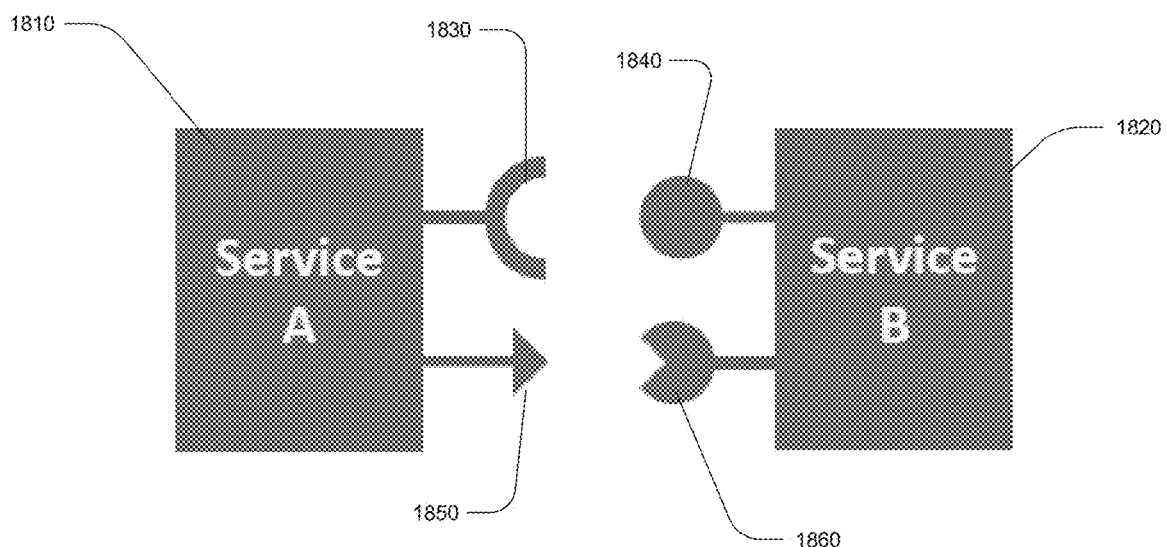
FIG. 18 illustrates an example service interoperability diagram of IoT integrated automation and control architectures according to some embodiments.

FIG. 18 symbolically illustrates the abstraction that allows interoperable components in some embodiments. A service A 1810 provides inputs 1830 and outputs 1850. Another service, service B 1820 contains output 1840 and input 1860. In order for service A 1810 and service B 1820 to interact with each other their inputs and outputs must be compatible with each other. In this case they are compatible as shown graphically by input 1830 mating with output 1840 and output 1850 mating with input 1860. If services are not natively designed to work with each other custom code must bridge the disparate inputs and outputs to allow interaction. The modular bricks described as part of the current architecture provide such an interface in some embodiments.

According to some embodiments, the architecture's authorization/authentication functionality may be based on any single one of or combination of the following concepts: actors, including humans, hardware and/or software may interact with the architecture; architecture Sharelets 105 may define entities/services/technologies that can be exchanged by actors; system contracts may define the way Sharelets 105 may be used by actors.

According to some embodiments, HyPeer Connectivity features of the architecture may allow actors to interact more closely and avoiding slower, more traditional business models that must be done manually such as hand signed NDAs, definition meetings, documents signed by hand and exchanged via email, offers, orders, bank payments etc.). The architecture can allow such slow methods to be replaced by architecture functionality including unique Identity definition, electronically defined services, and/or smart contracts.

According to some embodiments, system contracts, sometimes called mContracts, may define how architecture actors and/or users, may interact in terms of: WHO is the provider (for instance actor A) and who is the demander (for instance actor B); WHAT is the service (or good) that may be provided; WHEN the service may be available (for instance from one specified time to another); HOW the service may be provided (including for example SLA, costs, payments method, etc.). According to some embodiments, the architecture may provide a trust authority to tracks service provisioning and manage payment from A to B, if any.

According to some embodiments, the architecture may employ either on-chain or off-chain services. When the architecture implements smart contracts on-chain, actor identification, system contracts and/or transactions may be implemented inside a Blockchain, according to some embodiments. When the architecture implements smart contracts off-chain, everything may be implemented within the architecture as platform services potentially based on asymmetric key authentication/authorization, according to some embodiments. In such a case the architecture could act as trust authorities in place of the Blockchain systems.

According to some embodiments, when on-chain smart contracts are enabled, a Blockchain abstraction module may be used. A Blockchain abstraction module may be a software component of the architecture that may act as an interface/proxy to one Blockchain or another.

According to some embodiments, system actors that need to be uniquely identified may be: architecture peers, such as distinct architecture host 120 cluster installations; data adapters 130, such as system software that interacts with field devices or systems; devices, such as remote I/Os, smart sensors, smart phones/tablets, PCs, or others; mobile application installations; APIs, which may be hosted on 3rd party systems; tenants, which can be hosted on the same architecture peer; users, which may belong to a tenant; humans, who may considered internal or external to the system; and/or others.

According to some embodiments, different actors may have different ways of interacting with the architecture: architecture peers may ask other peers for Sharelets 105 or bricks; data adapters 130 can or cannot send to and receive data from a architecture peer; devices, mobile app installations can or cannot be authorized to use services hosted on a system; APIs can or cannot use or be used by architecture peers, including for instance its automatons and plug-ins; tenants and their users can or cannot be authorized to use services hosted on the hosting installation or on a peer architecture installation; and/or humans who can or cannot be authorized to use services on a architecture installation.

According to some embodiments, architecture services can be whatever service a company offers to other companies, including for example software services, transportation, raw materials, end products or services, human resources, maintenance tasks, or others.

According to some embodiments, when a system contract is signed by actors, the system contract may be respected and/or automatically guaranteed potentially resulting in the architecture: tracking every service request among actors; tracking proofs of good/bad requests resulting from any request; executing and tracking payments and/or logging payment outcome.

According to some embodiments, architecture services are realized as Sharelets 105, such as shared live bricks. According to some embodiments, when a system contract so arranges, actors can pay and be payed for goods or services using tokens, which may also be referred to as utility tokens, and or system tokens. In some embodiments, such a payment option may only be available only if the system contract between actors has been realized in an on-chain modality.

According to some embodiments, payments with tokens can be stimulated by specific discounts offered by actors, creating debit/credit buckets not necessarily linked to FIAT transactions.

Some embodiments offer a full-stack development environment. In such cases, custom web applications may be realized by composing UI widgets. In some embodiments the architecture may offer tools including the following. A board composer may be a web application that allows architecture integrators to visually design frontends by composing UI widgets (aka UI bricks). The artifacts realized with the board composer may be saved into the architecture board DB. A board player may be a web application able to reads data from the architecture board DB to dynamically build at run-time each custom web application, potentially having been developed with the board composer.

According to some embodiments, UI widgets (aka UI bricks) may be available in the form of standard widgets, offered out-of-the-box, and/or custom widgets. Custom widgets can be implemented as standard web components (potentially as defined by the HTML5 standard definition) and may be wrapped inside boards to realize new architecture UI bricks. Custom widgets can possibly implement project/technology specific business logic and data models and at the same time be integrated with standard widgets able to natively interact with architecture entities.

Widespread composability found in some embodiments may allow creation of complex custom web applications with just a few clicks, obtaining turn-key solutions that are natively compatible with the architecture, potentially inheriting advanced capabilities including: a drag and drop visual composer, a publish/subscribe design-pattern based communication system among GUI widgets, an OAuth2.0 authentication/authorization capability, web/mobile responsiveness, forms, dashboards, a Docker-based deployment model, and/or skins.

According to some embodiments, the board composer may be a web application allowing system integrators and developers to create web applications without writing code. In some embodiments, a project may be a set of boards and a board may be a web page that can be linked to other boards in order to allow user navigation. A board may be a set of widgets that are logically connected to each other. The architecture's brick paradigm may be used in some embodiments of the board composer. The logical modeling in the web admin UI, in which assets, adapters, Avatars, Automatons, and/or service bricks may be treated as bricks that can be composed and connected to each other, and in the board composer, bricks may be represented by UI widgets and mapped resources.

In some embodiments, a UI widget instance may be an instance of a widget exposed in the widget palette. The widget palette may contain a set of widgets that can be instantiated with a simple drag and drop operation from the widget palette to the board design panel and/or configured, potentially changing their properties from the property panel. A UI widget instance can expose one or more outputs and take one or more inputs from other widgets.

In some embodiments, widgets may be linked similar to the way illustrated in FIG. 18. Widget X can be linked to widget Y by specifying that the variable V exposed as output by X is an input variable of Y and this is only possible if the type of input and output variables is the same.

In some embodiments, the architecture may provide tools to enable exchange of input and output data that may be external to a board. Mapped resources and resource mapper widgets may allow defining the interaction with external resources like $3^{rd}$ party APIs. Interface and mapper widgets may allow easily interacting with architecture servers to potentially retrieve and/or send values for Avatar variables and Automaton states.

In some embodiments, mapped resources may be defined at a project level. This may allow the resource server exposing the API to retrieve a resource, potentially specifying needed details (e.g. host IP, port, and authentication data). One or more resources for each resource server may specify any needed details (e.g. protocol, method). In some embodiments, the request payload and response payload may use JSON format and in some cases placeholders can be added to declare the position inside the JSON of input and output variables. For each of these input and output variables aliases may be specified. These aliases may define the mapped resource "mapping" options, i.e. an interface over the resource that allows abstraction from its definitions and lets developers see the whole resource as a black box exposing input and output variables, named with their "aliases".

In some embodiments, a mapped resource may represents an entire "class" of possible calls to retrieve the resource. To use a mapped resource inside a board definition, developers would in some embodiments instantiate a resource mapper widget by specifying what is the mapped resource and potentially "mapping" the input and output variable to those variables used inside a board. This may provide an abstraction allowing a resource defined once to be used many times by several resource mapper widgets instances.

In some embodiments, a pattern of reuse may be present in the architecture between the interface and mapper widgets. The architecture interface may be an internal service offered out-of-the-box by the player in some embodiments. The architecture interface may offer a standard way to let boards interact with an architecture Server to send and retrieve Avatar variables values. In some embodiments, variables may be indirectly accessed using the architecture mapper widget.

In some embodiments an architecture mapper widget may expose a time related input (that can be a time interval or a single timestamp), that may be used as a parameter when calling the variables and/or Automatons related endpoints, to specify what is the time or time interval to retrieve values for. The architecture mapper widget may also, or alternatively expose a list of variables that the widget may produce values for. In some embodiments, once a mapper widget is defined, the mapper widget can be used inside a board to retrieve or send values of an entire set of variables.

In some embodiments, the architecture composer may implement a publisher/subscriber system, sometimes named PubSub service, for each defined board which may optimize data exchange among UI components and may contribute to more efficiently managing widget interactions. When an output variable is defined for a widget inside a board, composer may automatically define that widget as a publisher for that variable. In some embodiments, when executing the board containing that widget, when the value of an output variable changes, the architecture's player (that execute the boards developed with the composer) may publish the new value inside the board's PubSub service. When an input variable is defined for a widget inside a board, composer may define that widget as a subscriber for that variable. When executing the board containing a widget, in some embodiments, when a new value for that input variable is published inside the PubSub service, the architecture player may provide the new value to the widget that had been registered as a subscriber for that variable (i.e. the widget that has that variable as an input variable). This mechanism may allow an output variable to be automatically transmitted to all the widgets that linked that output variable as an input variable.

Some embodiments may allow an input variable to be set as a "trigger" for a UI widget. If so, when a new value is provided for that variable, the UI widget is "triggered." When an input variable is triggered, then the widget may do any/all of the following. The widget may update all other input variables values, potentially following this scheme in some embodiments: if the variable is fixed or internal, then do nothing since its last useful value is already available on the PubSub service; if the variable is external (i.e. from mapped resource), then force a resource update (not for variables of the same mapped resource) since its last useful value must be retrieved now; if the variable is an architecture variable, then force a value update) since its last useful value must be retrieved now. The widget may retrieve all the input variables' current (updated) values from PubSub service. The widget may update the widget internal state (e.g. update values of output variables) using the updated values of input variables. The widget may publish the new values of output variables on the PubSub service. The widget may refresh widget UI. This mechanism may allow frontend developers to define how and when a widget may be updated and may regulate the interactions among widgets.

In some embodiments, composer is a web application offering visual editing capability. Composer's UI may be divided in several sections.

In some embodiments, the UI may contain a Header. This UI section may contain any/all of the following. A menu may contain items to manage projects, boards, and/or settings. This may include such things as create, save, import/export, and others. A context path may contain the navigation path from the project's root to the board and widget that the user is actually editing. A preview button may allow developers to open the board that is currently being edited in a separate browser tab for preview. A simulated/real mode selector may allow specifying if the board preview will work in a real mode (eventual UI actuation actions will actually generate field actuations), simulation mode (eventual actuation actions will not generate field actuations, but the board may act as if they would), which mode may be a safer way to test board implementations in environments that are actually connected with the real field (e.g. industrial plants, smart cities, energy plants). A user profile may allow users to manage their profile (e.g. log off). A collapse icons selection may allow opening or collapsing the navigation tree and palette sections. A hidden/shown selector may allow toggling between shown widgets (i.e. that may be rendered by the player) and hidden widgets (that may not be shown by the player), which selector may allow users to choose what type of widgets to show inside the board design area.

In some embodiments, the UI may contain a navigation tree which may contain a tree representing a list of boards, containing sub-boards and contained widgets. The UI may be divided in sub-sections, including: a board section (potentially containing all the project's boards); and/or a skin section, containing all the project's skins (i.e. boards bounded to single Avatars), allowing developers to define Avatar skins that may be added in the widget palette as complex, self-contained widgets.

In some embodiments, the UI may contain a board design panel that may occupy the wider part of the page and contains all the widgets (hidden or shown) included in the current board/skin. In some embodiments, the UI may contain a property panel that may contain a property panel to edit the properties of the currently selected widget. In some embodiments, the UI may contain a widget palette that contains a list of widgets, divided per category, which the user can drag and drop inside the current board.

In some embodiments, UI widgets may be available from a widget palette (potentially grouped per category, to potentially make it easier to find them) and may be instantiated and/or inserted inside a board with a drag and drop operation, potentially becoming UI widget Instances. When clicking on a widget inside the palette, the composer may show a preview of the widget. When a widget is dragged and dropped inside the board design panel a new widget instance may be created and its properties may be shown inside one or more tabs in the property panel, or elsewhere, and may be edited by the developer in order to configure the instance by changing its properties.

In some embodiments, UI widgets may be shown inside the UI by the player as UI components, but UI widgets may also be "hidden" and in that case they will not be shown. In some embodiments, logic only related widgets may be "headless" (i.e. without a UI) by nature. In some embodiments, any UI widget can be configured to be hidden, and that may be the case for widgets used to provide data to other widgets (e.g. to provide fixed values or values that change for more complex interactions). Hidden widgets may not be shown inside the board in some embodiments, composer may offers for each board an alternate view containing all the hidden widgets, so that developers can select them, potentially via double-click, and see their properties in the property panel.

In some embodiments, after a drag and drop operation, the selected widget may be put on the board design panel. In some embodiments the selected widget may be inside the "shown widgets area" if the widget has a UI the flag "hidden" is not selected, which in some cases may be set in the look and feel tab. In some embodiments the selected widget may be inside the hidden widgets area if the widget does not have a UI or, if the widget has a UI, the "hidden" flag is selected. Users may be able to switch from one view to the other using a hidden/shown selector.

According to some embodiments, dropping a widget with a UI inside a board and setting the widget to "hidden" may be useful when developers want to use a widget to provide output values to other widgets, but do not want the final user to directly interact with the widget. This may be useful, for instance, to provide fixed values. For instance, in some embodiments, it is typical to realize boards with a hidden widget providing a time interval defined as within the last number of minutes until now. This can be done putting a time interval widget inside the board, configuring it, including for instance to set the time interval to "from 5 minutes in the past to now", and linking with the other widgets that may need that interval, and then configuring this time interval widget as "hidden" to prevent the final user from modifying the time interval at run-time.

Figure 19:
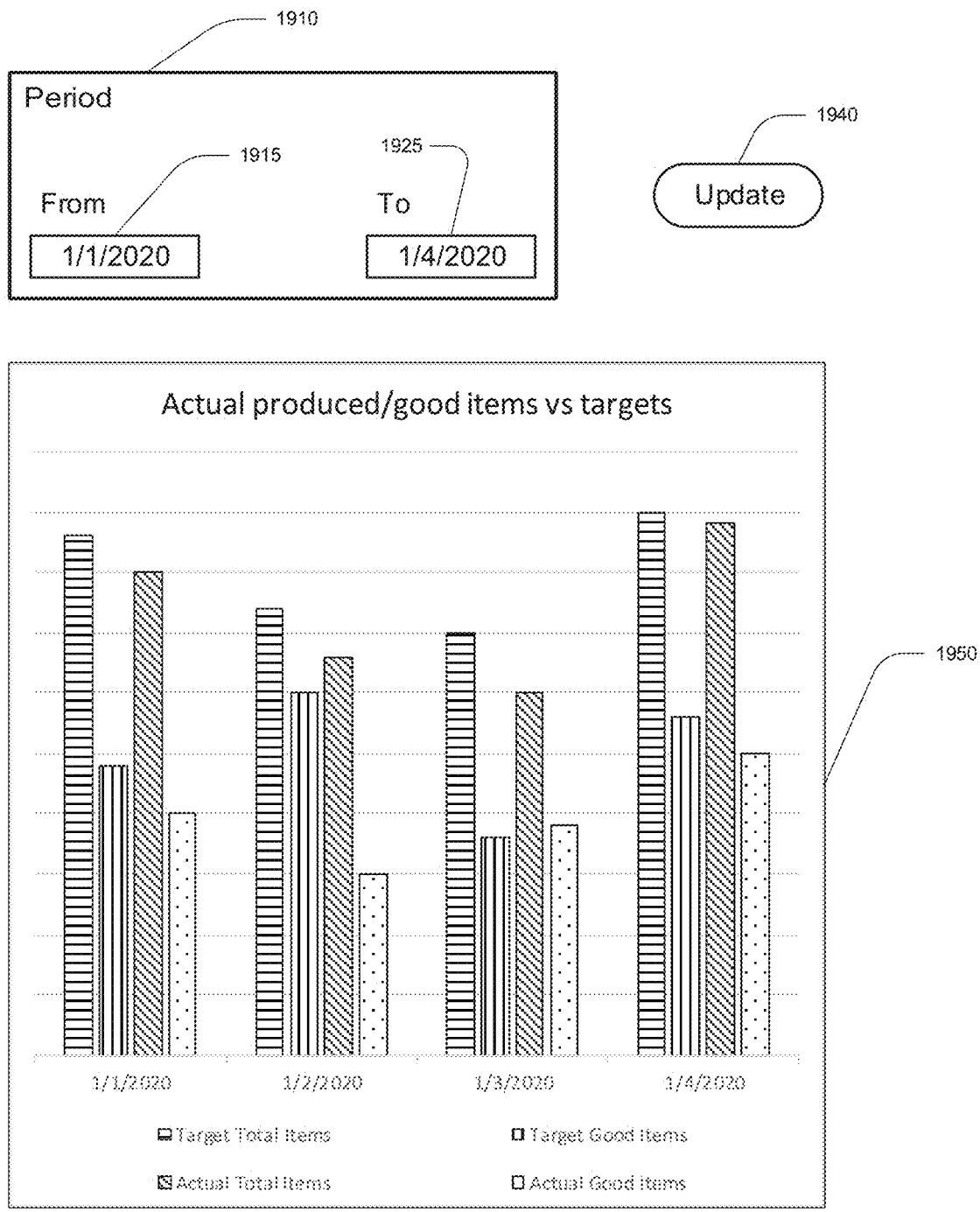
FIG. 19 illustrates a board interface in IoT integrated automation and control architectures according to some embodiments herein.

FIG. 19 illustrates a board interface depiction according to some embodiments as an example to describing the components of the architecture. As an example of some elements previously described, FIG. 19 shows a board that displays a graph 1950 of the total produced items and good items vs their targets for a specific area of a manufacturing context. The user of the interface would provide user input for the period 1910 by setting a "from time" 1915 and a "to time" 1925 and then clicking on the "update" button 1940 to update the graph. The four bars represented in the graph represent (1) target total items, (2) target good items, (3) actual total items, and (4) actual good items.

According to some embodiments, the some data used in FIG. 19 may come from an external resource server to retrieve the target of total items to be produced per day and the target of good items to be produced per day. An architecture server could retrieve the actual total items produced per day and the actual good items produced per day. An external resource server API may expose an endpoint to retrieve target data by specifying the area ID and a time interval as inputs, while an architecture server may expose an endpoint to retrieve variables specifying a time interval.

To design a board, such as the one depicted in FIG. 19, an architecture composer developer may realize a board containing: (A) a button widget, the update button 1940, allowing final users to update the graph; (B) a date time interval widget 1910, allowing final users to specify a time interval; (C) a chart widget 1950, showing the production values retrieved from servers for the specified time interval; (D) a resource mapper widget, which may create instances of mapped resources by defining their inputs and outputs that can be linked to other widgets; and (E) an architecture interface that could allow the player component to retrieve and/or send variable values to and/or from a board.

In some embodiments mapped resources may be defined at a project level in order to provide a way of "defining once and using many times" external resources that can be retrieved via calls to external APIs, which can allow developers to define a mapped resource once and generate many instances in the form of many resource mapper widgets, which may all refer to the same mapped resource. In some embodiments, resource mapper widgets may be "headless" (i.e. without UI) widgets that can be linked inside the composer to hidden widgets (that may not be rendered by the player) and/or non-hidden widgets, which may be rendered inside a board by the player. In some embodiments a board is delivered as a web page. Resource mapper widgets may also be defined at a board level. Within a single project and within a single board may be more than one resource mapper widget instance referring to the same mapped resource. An architecture interface may be an internal service of the architecture player and may simplify the interaction between the boards and external services.

Figure 20:
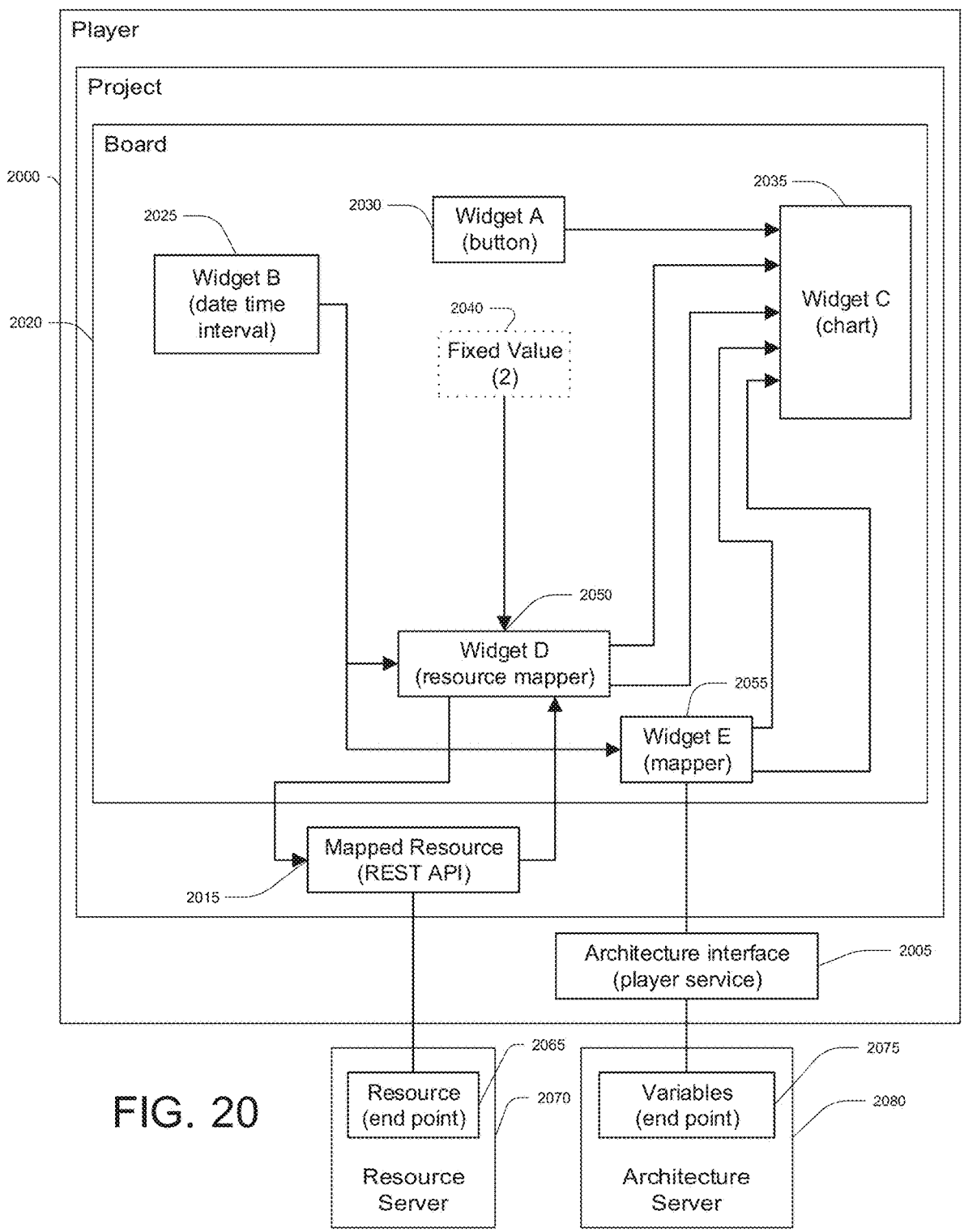
FIG. 20 illustrates the relationship between data and components which may be used in a user interface in IoT integrated automation and control architectures according to some embodiments herein.

FIG. 20 outlines the relationship between data and components which may be used in a user interface according to some embodiments. With reference to the interface of FIG. 19, the final user selects a time interval in 1910 and then clicks on the Update button 1940. In FIG. 20, widget B 2025 allows the selection of a time interval and widget A 2030 is the update button. The player 2000 recognizes that the button 2030 is a trigger for widget C 2035 and retrieves needed inputs and then visualizes the new values in the widget C chart 2035. When retrieving inputs, the architecture distinguishes between internal inputs, widget B 2025 specifying the time interval and the fixed value 2040 for the production line (2 in the example), and external inputs, including data 2065 possibly coming from the IVIES legacy system as a resource server 2070, and field data, such as variables 2075, coming from an infrastructure server 2080. This logical, summarized view may represent what the composer developer wants from the board.

Figure 21:
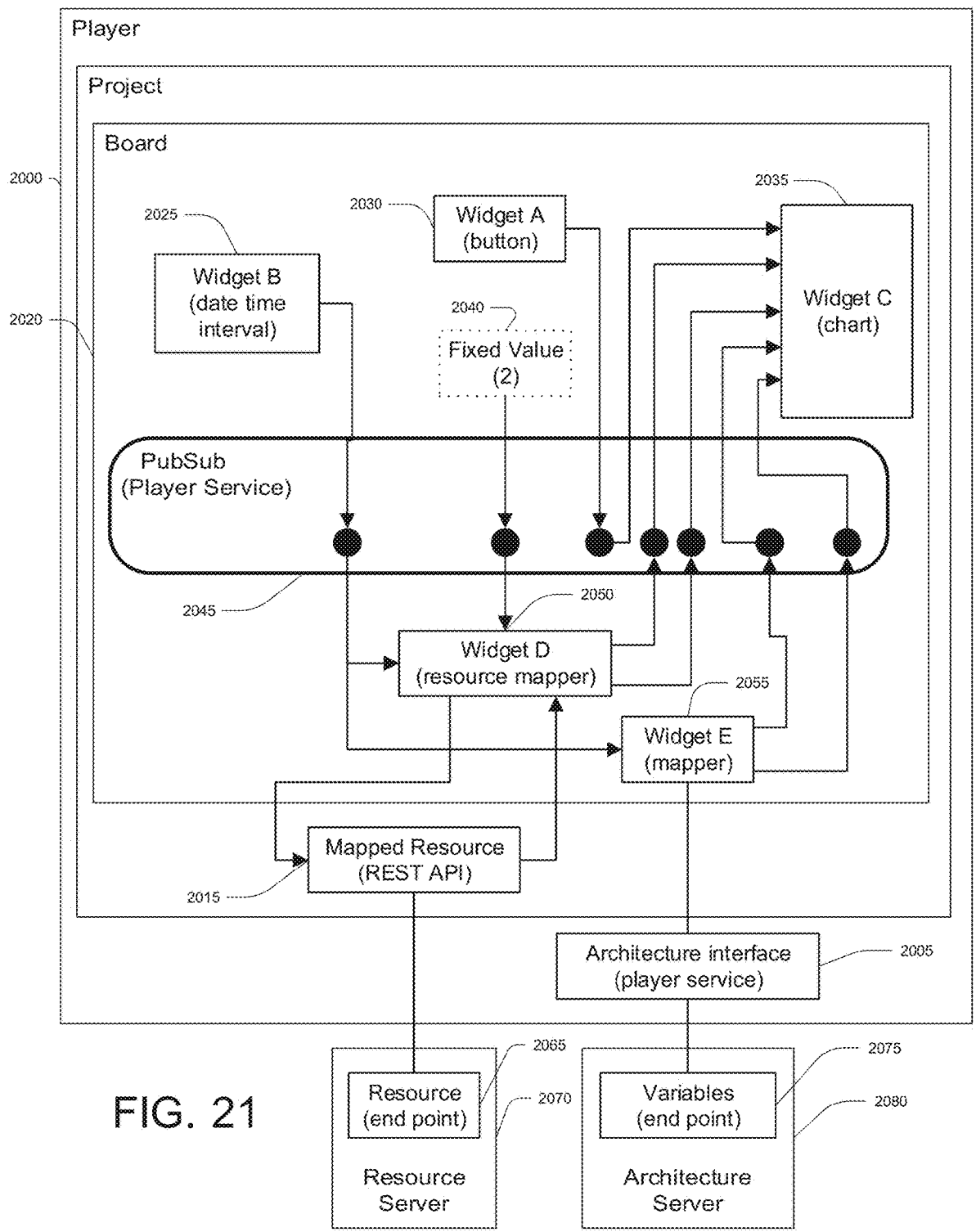
FIG. 21 illustrates the flow of data through the architecture, including a Pub Sub component, to a user interface in IoT integrated automation and control architectures according to some embodiments herein.

According to some embodiments, the underlying reality may be more complex, as depicted in FIG. 21. FIG. 21 outlines the flow of data through the architecture, including a Pub Sub 2045 component, to a user interface according to some embodiments. The user choses a time interval using the date time interval selector (widget B) 2025. This may lead the player's internal services to update the value of the time interval inside the PubSub service 2045. When the user clicks on the update button (widget A) 2030, the player recognizes that the button 2030 was clicked and that its Boolean value, which may change to TRUE, is a trigger for the chart visualizer (widget C) 2035. This may cause the following internal actions. Widget C 2035 may iterate over its inputs. Input variables #items target and #good_target may come from a resource mapper 2015, the player 2000 knows that they refer to an external resource, so the player will call the update method on that resource mapper widget D 2050. Widget D 2050 may iterate over its inputs. Since the first input, the area ID, is internal, the first input takes its value (that in this specific example has been set as fixed) directly from the PubSub 2045, which came from the fixed value 2040. Since the second input is the internal date range, the second input takes its value (which has just changed by user selection) directly from the PubSub 2045, which value originally came from widget B 2025. Now that all input values are available, widget D 2050 calls the external resource 2070 as specified by the related mapped resource 2015. Once that the external resource Server 2070 replies with the endpoint response payload 2065, the outputs are mapped as defined in the mapped resource 2015 and returned as output variables of widget D 2050. In this example, input variables #prod_items and #prod_good come from an architecture mapper 2055, the player 2000 knows that they refer to architecture variables, so the player 2000 will call the update method on that mapper widget E 2055. Widget E 2055 will iterate over its inputs. Since the input is internal the input takes its value (that has just be changed by the user selection) directly from the PubSub 2045. Now that all input values are available, the widget E 2055 makes the call to the architecture server 2005 and maps the response payload as defined in the mapper 2055 and returned as output variables of widget E 2055. Now that all the inputs of widget C 2035 are available, the UI of widget C 2035 is refreshed showing in the chart the 4 expected values for each day in the day interval defined by what has been specified in widget B 2025. The player 2000 may process all of this information on the board 2020, which may in some cases by rendered inside a web browser. These steps may exist in some embodiments.

Figure 22:
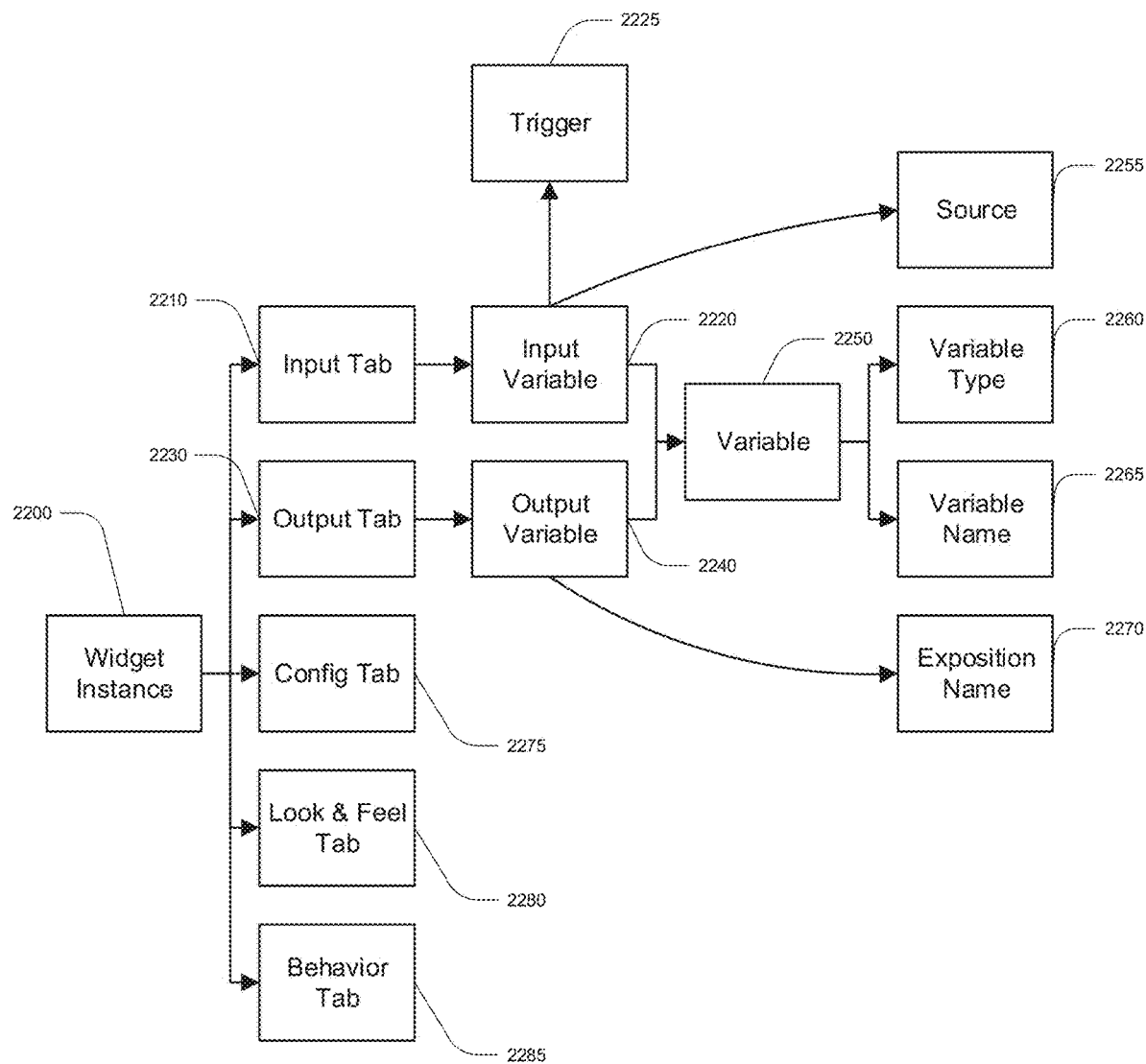
FIG. 22 shows a semantic map of concepts found in UI widget instances in IoT integrated automation and control architectures according to some embodiments herein.

FIG. 22 shows a semantic map of concepts found in UI widget instances, according to some embodiments. According to some embodiments, widgets may be in the widget panel and may have common properties that may be divided into categories that the composer may expose inside tabs, potentially one tab for each category, or in some other way.

According to some embodiments, a widget instance 2200 in a widget panel may have several tabs, an input tab 2210, an output tab 2230, a configuration tab 2275, a look and feel tab 2280, and/or a behavior tab 2285. The input tab 2210 may contain a list of input variables 2220. The output tab 2230 may contain a list of output variables 2240. Input variables 2220 may also be defined as triggers 2225, potentially initiating other action. Input variables 2220 and output variables 2240 are each variables 650, and a variable 650 may have a variable type 2260 and/or a variable name 2265. Input variables may have a source 2255. Output variables 2240 may have an exposition name 2270.

According to some embodiments, input tabs 2210 and/or output tabs 2230 may contain the definition of the widgets instance's 2200 input 2220 and/or output variables 2240. When a widget accepts an input variable of a specific type, that input variable will probably be provided by some other widget exposing an output variable of the same type. The composer UI may propose only compatible variables when the user wants to link the output variable of a widget as an input variable of another widget in some embodiments.

According to some embodiments output variables 2240 may have an exposition name 2270 that may be used together with the widget ID to be addressed inside a board. In some cases, an output variable 2240 may be identified inside a board by the combination of widget ID and variable exposition name 2370.

According to some embodiments, a configuration tab 2275 may contain widget configuration properties, which may include the widget instance name to be used as a reference in a board tree, and/or details of its input variables 2230 and/or output variables 2240.

According to some embodiments, a look and feel tab 2280 may contain widget properties concerning visual features, including for instance font type, dimension, colors, background, alignments, and potentially others. According to some embodiments, a behavior tab 2285 may contain widget properties concerning other behaviors not dealt with elsewhere. Possible examples of other behaviors may include functionality to "drill down" from a Widget, for instance from a widget representing the "Overall Equipment Efficiency (OEE) of a production line" to an explosion of OEE of the single machines composing the production line.

Figure 23:
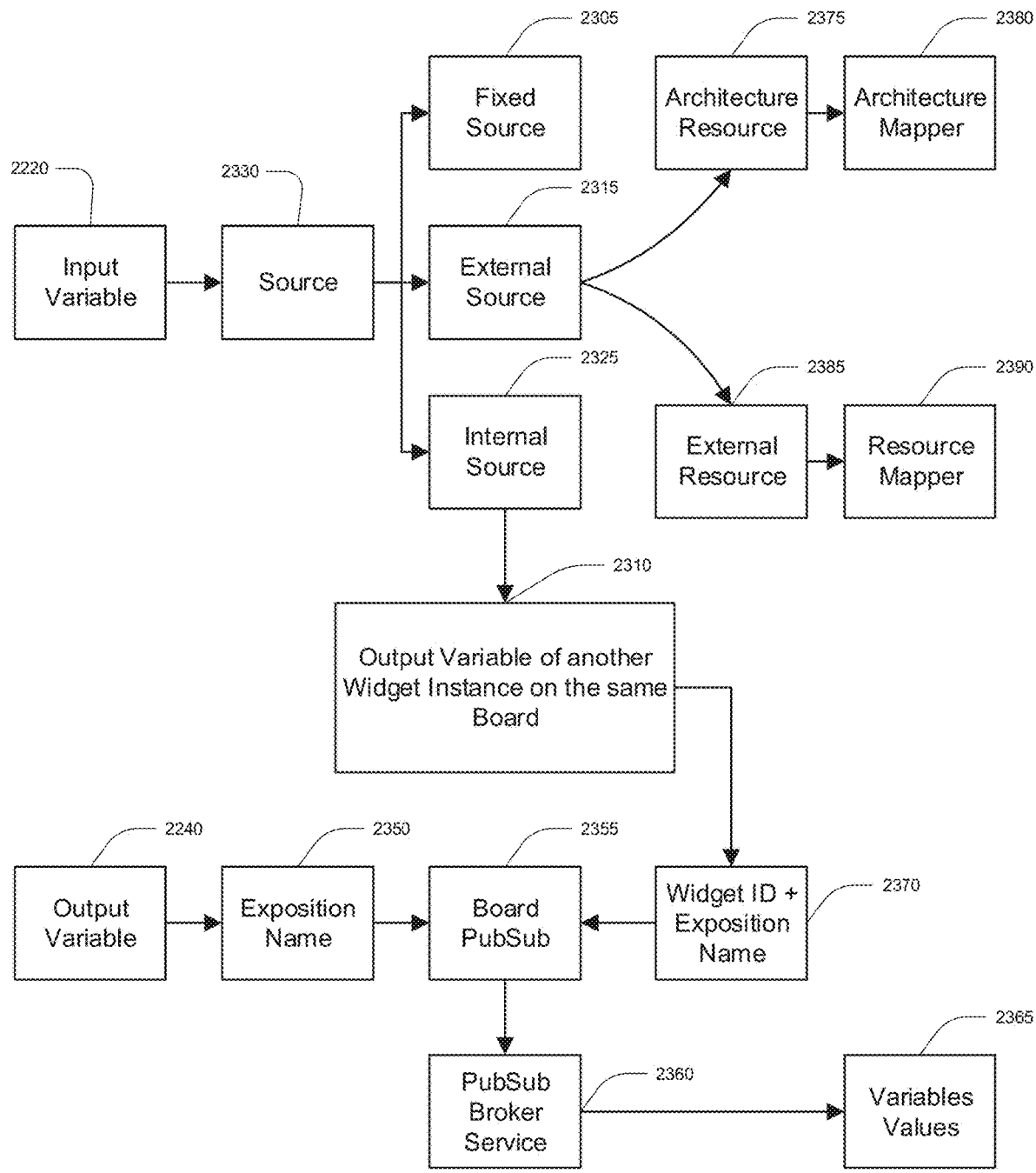
FIG. 23 illustrates the logical relations of input and output variables in IoT integrated automation and control architectures according to some embodiments herein.

FIG. 23 illustrates the logical relations of input and output variables according to some embodiments. Input variables 2220 may have a source 2330, which may be one of: fixed 2305, for instance defined as a constant; internal 2325, for instance coming from another widget in the same board 2310; external 2315, for example if the input variable 2220 refers to a resource such as third party system resources hosted by external resource servers 2385 and resources hosted on an architecture server 2375, which may include Avatar variables and/or Automaton states for instance. These external sources are exposed respectively by: resource mappers 2390, which may expose variables coming from, or going to, external resources 2385; and architecture mappers 2380, which may expose architecture entities, including for instance Avatar variables and/or Automaton states. Output variables 2240 may have an exposition name 2350 which may be used to publish a variable value on a board PubSub 2355. A board PubSub 2355 may be an instance of a publisher/subscriber broker service 2360. A publisher/subscriber broker service 2360 may be used to automatically send variable values 2365 from one widget to another.

Computer Systems

Figure 24:
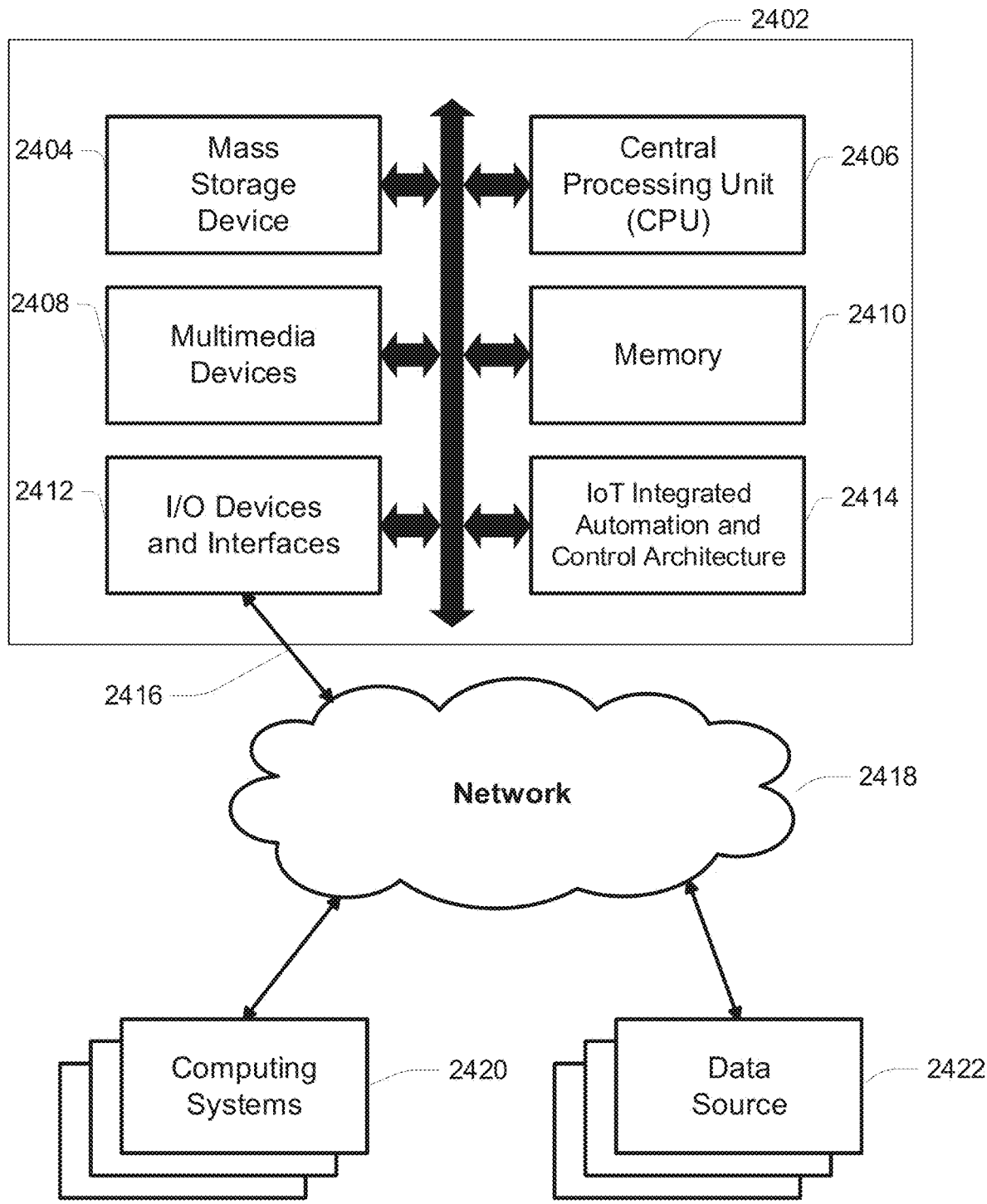
FIG. 24 is a block diagram depicting an example computer hardware system configured to run software for implementing one or more IoT integrated automation and control architectures according to some embodiments herein.

In some embodiments, the systems and methods described herein are implemented using a computing system, such as the one illustrated in FIG. 24. FIG. 24 is a block diagram illustrating a computer hardware system configured to run software for implementing one or more embodiments of a IoT Integrated Automation and Control Architecture according to some embodiments. While FIG. 24 illustrates one embodiment of a computing system 2402, it is recognized that the functionality provided for in the components and modules of computing system 2402 may be combined into fewer components and modules or further separated into additional components and modules.

IoT Integrated Automation and Control Architecture Module

In some embodiments, the computing system 2402 comprises a IoT Integrated Automation and Control Architecture module 2414 that carries out the functions described herein, including any one of techniques described above. The IoT Integrated Automation and Control Architecture module 2414 and/or other modules may be executed on the computing system 2402 by a central processing unit 2406 discussed further below.

In general, the word "module," as used herein, refers to logic embodied in hardware or firmware, or to a collection of software instructions, possibly having entry and exit points, written in a programming language, such as, for example, COBOL, CICS, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Computing System Components

In one embodiment, the computing system 2402 also comprises a mainframe computer suitable for controlling and/or communicating with large databases, performing high volume transaction processing, and generating reports from large databases. The computing system 2402 also comprises a central processing unit ("CPU") 2406, which may comprise a conventional microprocessor. The computing system 2402 further comprises a memory 2410, such as random access memory ("RAM") for temporary storage of information and/or a read only memory ("ROM") for permanent storage of information, and a mass storage device 2404, such as a hard drive, diskette, or optical media storage device. Typically, the modules of the computing system 2402 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system 2402 comprises one or more commonly available input/output (I/O) devices and interfaces 2412, such as a keyboard, mouse, touchpad, and printer. In one embodiment, the I/O devices and interfaces 2412 comprise one or more display devices, such as a monitor, that allows the visual presentation of data to a user. More particularly, a display device provides for the presentation of GUIs, application software data, and multimedia presentations, for example. In one or more embodiments, the I/O devices and interfaces 2412 comprise a microphone and/or motion sensor that allow a user to generate input to the computing system 2402 using sounds, voice, motion, gestures, or the like. In the embodiment of FIG. 24, the I/O devices and interfaces 2412 also provide a communications interface to various external devices. The computing system 2402 may also comprise one or more multimedia devices 2408, such as speakers, video cards, graphics accelerators, and microphones, for example.

Computing System Device/Operating System

The computing system 2402 may run on a variety of computing devices, such as, for example, a server, a Windows server, a Structure Query Language server, a Unix server, a personal computer, a mainframe computer, a laptop computer, a tablet computer, a cell phone, a smartphone, a personal digital assistant, a kiosk, an audio player, an e-reader device, and so forth. The computing system 2402 is generally controlled and coordinated by operating system software, such as z/OS, Windows 95, Windows 98, Windows NT, Windows 2000, Windows XP, Windows Vista, Windows 7, Windows 8, Linux, BSD, SunOS, Solaris, Android, iOS, BlackBerry OS, or other compatible operating systems. In Macintosh systems, the operating system may be any available operating system, such as MAC OS X. In other embodiments, the computing system 2402 may be controlled by a proprietary operating system. Conventional operating systems control and schedule computer processes for execution, perform memory management, provide file system, networking, and I/O services, and provide a user interface, such as a graphical user interface ("GUI"), among other things.

Network

In the embodiment of FIG. 24, the computing system 2402 is coupled to a network 2418, such as a LAN, WAN, or the Internet, for example, via a wired, wireless, or combination of wired and wireless, communication link 2416. The network 2418 communicates with various computing devices and/or other electronic devices via wired or wireless communication links. In the embodiment of FIG. 24, the network 2418 is communicating with one or more computing systems 2420 and/or one or more data sources 2422.

Access to the IoT Integrated Automation and Control Architecture module 2414 of the computer system 2402 by computing systems 2420 and/or by data sources 2422 may be through a web-enabled user access point such as the computing systems' 2420 or data source's 2422 personal computer, cellular phone, smartphone, laptop, tablet computer, e-reader device, audio player, or other device capable of connecting to the network 2418. Such a device may have a browser module that is implemented as a module that uses text, graphics, audio, video, and other media to present data and to allow interaction with data via the network 2418.

The browser module may be implemented as a combination of an all points addressable display such as a cathode-ray tube (CRT), a liquid crystal display (LCD), a plasma display, or other types and/or combinations of displays. In addition, the browser module may be implemented to communicate with input devices 2412 and may also comprise software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In some embodiments, the system 2402 may comprise a physical or logical connection established between a remote microprocessor and a mainframe host computer for the express purpose of uploading, downloading, or viewing interactive data and databases on-line in real time. The remote microprocessor may be operated by an entity operating the computer system 2402, including the client server systems or the main server system, an/or may be operated by one or more of the data sources 2422 and/or one or more of the computing systems 2420. In some embodiments, terminal emulation software may be used on the microprocessor for participating in the micro-mainframe link.

In some embodiments, computing systems 2420 who are internal to an entity operating the computing system 2402 may access the IoT Integrated Automation and Control Architecture module 2414 internally as an application or process run by the CPU 2406.

URLs and Cookies

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

Other Systems

In addition to the systems that are illustrated in FIG. 24, the network 2418 may communicate with other data sources or other computing devices. The computing system 2402 may also comprise one or more internal and/or external data sources. In some embodiments, one or more of the data repositories and the data sources may be implemented using a relational database, such as DB2, Sybase, Oracle, CodeBase and Microsoft® SQL Server as well as other types of databases such as, for example, a flat file database, an entity-relationship database, and object-oriented database, and/or a record-based database.

Additional Embodiments

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Any methods disclosed herein need not be performed in the order recited. Thus, it is intended that the scope of the invention herein disclosed should not be limited by the particular embodiments described above.

It will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will also be appreciated that conditional language used herein, such as, among others, "can," "could," "might,"

"may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Further, while the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present. The headings provided herein, if any, are for convenience only and do not necessarily affect the scope or meaning of the devices and methods disclosed herein.

Accordingly, the claims are not intended to be limited to the embodiments shown herein, but are to be accorded the widest scope consistent with this disclosure, the principles and the novel features disclosed herein.

What is claimed is:

1. A computer implemented method for managing a plurality of Internet of Things (TOT) enabled devices within a software architecture to initiate and execute at least one action, the computer implemented method comprising:

receiving, from one or more input/output data streams, one or more data values;

generating, by the software architecture, a web-based dynamic user interface configured to modify, via user input, one or more of the Avatars, field variables, computed variables, Automatons, and Shareables, wherein the web-based dynamic user interface comprises one or more user interface widgets comprising an input/output data stream of the one or more input/output data streams;

analyzing, by the software architecture, the one or more data values to determine at least one action to be initiated, wherein the software architecture is configured to:

model one or more entities of a system, wherein the system comprises a plurality of devices, wherein each of the one or more entities comprises a part of a device, a device, one or more devices of the system, or the system, wherein each of the one or more entities is modelled as an Avatar, and wherein each Avatar comprises a logical representation of an entity of the one or more entities;

set one or more field variables corresponding to the one or more data values, wherein the one or more input/output data streams transmit the one or more data values received from hardware coupled to the one or more entities, internal software of the software architecture, or external service installations;

define one or more computed variables, wherein each of the one or more computed variables is defined by the one or more field variables, one or more other computed variables, and/or one or more other data variables received from the one or more input/output data streams;

define one or more Automatons corresponding to one or more Avatars, wherein each Automaton of the one or more Automatons delineates a state, behavior, or status of at least one of the one or more Avatars, wherein the state, behavior, or status are determined by at least one field variable or computed variable; and define one or more Shareables, wherein the one or more Shareables comprise one or more Avatars or Automatons to be shared between one or more peers of the specialized software architecture;

initiating the at least one action by transmitting instructions, via the one or more input/output data streams, to hardware coupled to at least one entity, the internal software of the specialized software architecture, or at least one external service installation, and executing the at least one action via one or more field actuations of the hardware, wherein the computer comprises a computer processor and a memory.

2. The computer implemented method of claim 1, wherein the one or more peers comprise an architecture host, wherein the architecture host exposes the Shareable to one or more architecture clients.

3. The computer implemented method of claim 2, wherein the contents of the Shareable are defined by a digital contract within the specialized software architecture, the digital contract comprising configurable terms between the architecture host and the architecture client.

4. The computer implemented method of claim 3, wherein the digital contract is sealed with a distributed ledger by a document sealer of the specialized software architecture.

5. The computer implemented method of claim 1, wherein the instructions are transmitted to an architecture data adapter located on an edge node, fog node, or IoT gateway.

6. The computer implemented method of claim 5, wherein the fog node is configured to initiate the at least one action autonomously from other nodes, a central server, or a global server.

7. The computer implemented method of claim 5, wherein the architecture data adapter comprises a software adapter of one of the following types: Modbus TCP/RTU adapter, OPC UA/DA adapter, S7 adapter, Profinet adapter, ADS adapter, EtherCAT adapter, JDBC adapter, Ethernet/IP adapter, hostLink adapter, REST adapter, or a custom adapter.

8. The computer implemented method of claim 5, wherein the hardware and the architecture data adaptor interact based on one or more of the following protocols: Modbus TCP/RTU, OPC UA/DA, S7, Profinet bus, ADS, EtherCAT, Ethernet/IP, hostLink, JDBC, REST APIs, or a custom protocol.

9. The computer implemented method of claim 1, wherein the hardware comprises one or more of: remote I/O cards, digital acquisition cards (DAQ), PLCs/SCADAs, smart sensors or actuators, sensors, actuators, machine data, machine statuses, or custom interface cards.

10. The computer implemented method of claim 1, wherein at least one of the one or more field variables comprises a logical representation of a measurement received from hardware coupled to the one or more entities.

11. The computer implemented method of claim 1, wherein at least one Automaton delineates a state, behavior, or status representing the relationship between two or more Avatars.

12. The computer implemented method of claim 1, wherein the external service installations comprise functional plug-ins configured to call internal or external libraries, interact with one or more databases, employ artificial intelligence (AI) or machine learning (ML) algorithms, transmit notifications, or provide cloud-computing services.

13. The computer implemented method of claim 1, wherein the one or more Shareables further comprise one or more Avatars or Automatons to be shared with a computer system of an external software architecture.

14. The computer implemented method of claim 1, wherein the specialized software architecture is further configured to connect to one or more additional specialized software architectures.

15. The computer implemented method of claim 14, wherein each of the one or more additional specialized software architectures models one or more entities of an additional system.

16. The computer implemented method of claim 15, wherein at least one Shareable of the one or more Shareables is shared between the specialized software architecture and at least one additional specialized software architecture.

17. The computer implemented method of claim 1, wherein each installation of the specialized software architecture comprises a local installation, a central installation, or a global installation.

18. The computer implemented method of claim 17, wherein each local installation comprises a local library comprising at least one Avatar or Automaton.

19. The computer implemented method of claim 18, wherein each central installation comprises a central library comprising all of the Avatars and Automatons of one or more corresponding local installations.

20. The computer implemented method of claim 19, wherein each global installation comprises a global library comprising all of the Avatars and Automatons of one or more corresponding central installations.

* * * * *

UNITED STATES PATENT AND TRADEMARK OFFICE
CERTIFICATE OF CORRECTION

PATENT NO. : 11,888,675 B2
APPLICATION NO. : 17/650228
DATED : January 30, 2024
INVENTOR(S) : Vincenzo Lombardi It is certified that error appears in the above-identified patent and that said Letters Patent is hereby corrected as shown below:

In the Specification

Column 17, Line 55, delete "miniPC" and insert -- mini PC --.

Column 20, Line 55, delete "(DTL)" and insert -- (DLT) --.

Column 20, Line 60, delete "DTL." and insert -- DLT. --.

Column 21, Line 59, delete "Bn." and insert -- $B_n$. --.

Column 21, Line 61, delete "Cn." and insert -- $C_n$. --.

Column 22, Line 28, delete "may" and insert -- may be --.

Column 30, Line 26, delete "a a" and insert -- a --.

Column 35, Line 1, delete "X," and insert -- $X_i$ --.

Column 35, Line 4, delete "Xi" and insert -- $X_1$ --.

Column 35, Line 30, delete "deviation" and insert -- deviation $\partial$ --.

Column 46, Line 6, delete "and or" and insert -- and/or --.

Column 47, Line 67, delete "processes" and insert -- processes. --.

Column 48, Line 1, delete "by" and insert -- be --.

Column 49, Line 21, delete "IVIES," and insert -- MES, --.

Signed and Sealed this
Thirtieth Day of April, 2024

Katherine Kelly Vidal
*Director of the United States Patent and Trademark Office*

CERTIFICATE OF CORRECTION (continued)
U.S. Pat. No. 11,888,675 B2

Column 53, Line 1, delete "Xl." and insert -- X1. --.

Column 53, Line 6, delete "(PullyRPM);" and insert -- (PulleyRPM); --.

Column 58, Line 2, delete "and or" and insert -- and/or --.

Column 62, Line 63, delete "IVIES" and insert -- MES --.

Column 67, Line 11. delete "an/or" and insert -- and/or --.

In the Claims

Column 70, Line 34, Claim 1, delete "(TOT)" and insert -- (IoT) --.